United States Patent
Gordon et al.

(10) Patent No.: US 10,140,753 B2
(45) Date of Patent: Nov. 27, 2018

(54) 3D GEOMETRIC MODELING AND 3D VIDEO CONTENT CREATION

(71) Applicant: MANTISVISION LTD., Petach Tikva (IL)

(72) Inventors: Eyal Gordon, Haifa (IL); Gur Arie Bittan, Shoham (IL)

(73) Assignee: MANTIS VISION LTD., Petach Tikva (IL)

( * ) Notice: Subject to any disclaimer, the term of this patent is extended or adjusted under 35 U.S.C. 154(b) by 0 days.

(21) Appl. No.: 15/180,116

(22) Filed: Jun. 13, 2016

(65) Prior Publication Data

US 2016/0364903 A1    Dec. 15, 2016

Related U.S. Application Data

(63) Continuation of application No. 14/717,487, filed on May 20, 2015, now Pat. No. 9,367,952, which is a (Continued)

(51) Int. Cl.
*G06T 7/521* (2017.01)
*G06T 15/20* (2011.01)
(Continued)

(52) U.S. Cl.
CPC ............ *G06T 15/205* (2013.01); *G01B 11/25* (2013.01); *G01C 11/025* (2013.01);
(Continued)

(58) Field of Classification Search
CPC ....... G06T 7/0057; G06T 7/521; G06T 7/593; G06T 2207/10028; G01B 11/2513; G01B 11/2545; G01B 11/25; H04N 13/271
See application file for complete search history.

(56) References Cited

U.S. PATENT DOCUMENTS 3,866,052 A    2/1975    Di Matteo et al.
4,070,683 A    1/1978    Altschuler et al.
(Continued)

FOREIGN PATENT DOCUMENTS

DE    196 38 727 A1    3/1998
WO    WO 93/03579 A1    2/1993
WO    WO 02/40940 A1    5/2002

OTHER PUBLICATIONS de Bruijn, "A combinatorial problem," *Proceedings of the Koninklijke Nederlandse Akademie van Wetenschappen, Series A*, vol. 49, No. 7, pp. 758-764, 1946, http://repository.tue.nl.597473.
(Continued)

*Primary Examiner* — Dennis Rosario
(74) *Attorney, Agent, or Firm* — Vladimir Sherman; Professional Patent Solutions Ltd.

(57) ABSTRACT

A system, apparatus and method of obtaining data from a 2D image in order to determine the 3D shape of objects appearing in said 2D image, said 2D image having distinguishable epipolar lines, said method comprising: (a) providing a predefined set of types of features, giving rise to feature types, each feature type being distinguishable according to a unique bi-dimensional formation; (b) providing a coded light pattern comprising multiple appearances of said feature types; (c) projecting said coded light pattern on said objects such that the distance between epipolar lines associated with substantially identical features is less than the distance between corresponding locations of two neighboring features; (d) capturing a 2D image of said objects having said projected coded light pattern projected thereupon, said 2D image comprising reflected said feature types; and (e) extracting: (i) said reflected feature types according to the unique bi-dimensional formations; and (ii) locations of said
(Continued)

reflected feature types on respective epipolar lines in said 2D image.

23 Claims, 39 Drawing Sheets

Related U.S. Application Data continuation of application No. 13/968,961, filed on Aug. 16, 2013, which is a continuation of application No. 12/515,715, filed as application No. PCT/IL2007/001432 on Nov. 20, 2007, now Pat. No. 8,538,166.

(60) Provisional application No. 60/935,427, filed on Aug. 13, 2007, provisional application No. 60/929,835, filed on Jul. 13, 2007, provisional application No. 60/924,206, filed on May 3, 2007, provisional application No. 60/907,495, filed on Apr. 4, 2007, provisional application No. 60/860,209, filed on Nov. 21, 2006.

(51) Int. Cl.
  G01B 11/25 (2006.01)
  G06K 9/20 (2006.01)
  G01C 11/02 (2006.01)
  G06T 7/536 (2017.01)

(52) U.S. Cl.
  CPC ............ *G06K 9/2036* (2013.01); *G06T 7/521* (2017.01); *G06T 7/536* (2017.01); *G06T 2200/04* (2013.01); *G06T 2207/20228* (2013.01)

(56) References Cited

U.S. PATENT DOCUMENTS

| | | | |
|---|---|---|---|
| 4,146,926 A | 3/1979 | Clerget et al. | |
| 4,175,862 A | 11/1979 | DiMatteo et al. | |
| 4,523,809 A | 6/1985 | Taboada et al. | |
| 4,668,094 A | 5/1987 | Matsumoto et al. | |
| 4,807,759 A | 2/1989 | Castner | |
| 4,825,263 A | 4/1989 | Desjardins et al. | |
| 4,842,411 A | 6/1989 | Wood | |
| 4,864,395 A | 9/1989 | Tajima | |
| 4,867,570 A | 9/1989 | Sorimachi et al. | |
| 4,948,258 A | 8/1990 | Caimi | |
| 5,003,166 A | 3/1991 | Girod | |
| 5,200,792 A | 4/1993 | Tajima et al. | |
| 5,231,678 A | 7/1993 | Takatori et al. | |
| 5,548,418 A | 8/1996 | Gaynor et al. | |
| 5,589,942 A | 12/1996 | Gordon | |
| 5,604,817 A | 2/1997 | Massen et al. | |
| 5,615,003 A | 3/1997 | Hermary et al. | |
| 5,680,216 A | 10/1997 | Hierholzer et al. | |
| 5,825,933 A | 10/1998 | Hecht | |
| 6,049,747 A | 4/2000 | Nakajima et al. | |
| 6,133,921 A | 10/2000 | Turkiyyah et al. | |
| 6,147,760 A | 11/2000 | Geng | |
| 6,252,623 B1 | 6/2001 | Lu et al. | |
| 6,285,778 B1 | 9/2001 | Nakajima et al. | |
| 6,341,016 B1 | 1/2002 | Malione | |
| 6,370,335 B1 | 4/2002 | Niblett et al. | |
| 6,377,353 B1 | 4/2002 | Ellis | |
| 6,438,263 B2 | 8/2002 | Albeck et al. | |
| 6,441,888 B1 | 8/2002 | Azuma et al. | |
| 6,495,848 B1 | 12/2002 | Rubbert | |
| 6,503,195 B1 | 1/2003 | Keller et al. | |
| 6,510,244 B2 | 1/2003 | Proesmans et al. | |
| 6,549,288 B1 | 4/2003 | Migdal et al. | |
| 6,553,133 B1 | 4/2003 | Sari-Sarraf et al. | |
| 6,578,961 B2 | 6/2003 | Vaez-Iravani | |
| 6,739,516 B2 | 5/2004 | Iwaki | |
| 6,751,344 B1 | 6/2004 | Grumbine | |
| 6,754,370 B1 | 6/2004 | Hall-Holt et al. | |
| 6,762,427 B1 | 7/2004 | Kong et al. | |
| 6,771,809 B1 | 8/2004 | Rubbert et al. | |
| 6,813,035 B2 | 11/2004 | Hoffmann | |
| 6,853,458 B2 | 2/2005 | Yahashi et al. | |
| 6,876,458 B2 | 4/2005 | Kraus | |
| 6,897,946 B2 | 5/2005 | Uomori et al. | |
| 6,937,348 B2 | 8/2005 | Geng | |
| 6,965,690 B2 | 11/2005 | Matsumoto | |
| 6,996,339 B2 | 2/2006 | Miyoshi et al. | |
| 7,002,699 B2 | 2/2006 | Kong et al. | |
| 7,013,040 B2 | 3/2006 | Shiratani | |
| 7,068,825 B2 | 6/2006 | Rubbert et al. | |
| 7,075,625 B2 | 7/2006 | Abe | |
| 7,075,661 B2 | 7/2006 | Petty et al. | |
| 7,103,212 B2 | 9/2006 | Hager et al. | |
| 7,164,789 B2 | 1/2007 | Chen et al. | |
| 7,230,694 B2 | 6/2007 | Forster et al. | |
| 7,236,256 B2 | 6/2007 | Yamaguchi | |
| 7,385,708 B2 | 6/2008 | Ackerman et al. | |
| 7,388,678 B2 | 6/2008 | Forster et al. | |
| 7,415,151 B2 | 8/2008 | Yeh et al. | |
| 7,428,468 B2 | 9/2008 | Takemura et al. | |
| 7,433,024 B2 | 10/2008 | Garcia et al. | |
| 7,440,590 B1 | 10/2008 | Hassebrook et al. | |
| 7,489,393 B2 | 2/2009 | Biellak et al. | |
| 7,492,451 B2 | 2/2009 | Vaez-Iravani et al. | |
| 7,525,114 B2 | 4/2009 | Metcalfe et al. | |
| 7,589,825 B2 | 9/2009 | Orchard et al. | |
| 7,620,209 B2 | 11/2009 | Stevick et al. | |
| 7,747,067 B2 | 6/2010 | Popescu et al. | |
| 7,756,323 B2 | 7/2010 | Kimmel | |
| 7,768,656 B2 | 8/2010 | Lapa et al. | |
| 8,090,194 B2 * | 1/2012 | Golrdon | G01B 11/2513 382/154 |
| 8,208,719 B2 * | 6/2012 | Gordon | G01B 11/2513 382/154 |
| 9,367,952 B2 * | 6/2016 | Gordon | G01B 11/25 |
| 2003/0133130 A1 | 7/2003 | Takahashi | |
| 2004/0005092 A1 | 1/2004 | Tomasi | |
| 2006/0210145 A1 | 9/2006 | Lee et al. | |
| 2007/0057946 A1 | 3/2007 | Albeck et al. | |
| 2008/0118143 A1 | 5/2008 | Gordon et al. | |
| 2009/0102840 A1 | 4/2009 | Li | |
| 2010/0118123 A1 | 5/2010 | Freedman et al. | |
| 2016/0163031 A1 * | 6/2016 | Gordon | G06K 9/2036 348/46 |

OTHER PUBLICATIONS

Horn, "Focusing," *Artificial Intelligence Memo*. No. 160, Project MAC, Massachusetts Institute of Technology (MIT), Cambridge, Massachusetts, USA, May 1968, http://hdl.handle.net/1721.1./5863.

Takasaki, "Moiré topography," *Applied Optics*, vol. 9, Issue 6, pp. 1467-1472, Jun. 1, 1970.

Horn, "Shape From Shading: A Method for Obtaining the Shape of a Smooth Opaque Object From One View," *Technical Report* 79, Project MAC, Massachusetts Institute of Technology (MIT), Cambridge, Massachusetts, USA, Nov. 1970, http://hdl.handle.net/1721.1/6885.

Will et al., "Grid coding: A novel technique for image processing," *Proceedings of the IEEE*, vol. 60, Issue 6, pp. 669-680, Jun. 1972.

Shirai, "Recognition of polyhedrons with a range finder," *Pattern Recognition*, vol. 4, Issue 3, pp. 243-250, Oct. 1972.

Röcker et al., "Methods for analyzing three dimensional scenes," *Proceedings of the 4th International Joint Conference on Artificial Intelligence (IJCAI)*, vol. 2, pp. 669-673, Tblisi, Georgia, Sep. 3-8, 1975, http://ijcai.org/Past%20Proceedings/IJCAI-75-VOL-1&2/CONTENT/content.htm.

Balasubramanian, "Comparison of Optical Contouring Methods," *Photogrammetric Engineering and Remote Sensing*, vol. 42, No. 1, pp. 115-120, Jan. 1976.

Taboada et al., "Rectangular grid fringe pattern for topographic applications," *Applied Optics*, vol. 15, issue 3, pp. 597-599, Mar. 1,

(56) References Cited

OTHER PUBLICATIONS 1976, http://www.opticsinfobase.org/abstract.cfm/URI=ao-15-3-597.
MacWilliams et al., "Pseudo-random sequences and arrays," *Proceedings of the IEEE*, vol. 64, No. 12, pp. 1715-1729, Dec. 1976.
Nitzan et al., "The Measurement and Use of Registered Reflectance and Range Data in Scene Analysis," *Proceedings of the IEEE*, vol. 65, No. 2, pp. 206-220, Feb. 1977.
Renner, "A photogrammetric technique for use in radiation therapy," *Photogrammetric Engineering and Remote Sensing*, vol. 43, No. 5, pp. 581-591, May 1977, ISSN: 0099-1112, http://www.asprs.org/publications/pers/scans/1977journal/may/1977_may_581-591.pdf.
Lewis et al., "A Scanning Laser Rangefinder for a Robotic Vehicle," *Proceedings of the 5th international joint conference on Artificial intelligence (IJCAI)*, vol. 2, pp. 762-768, Cambridge, Massachusetts, USA, Aug. 22-25, 1977, http://ijcai.org/Past%20Proceedings/IJCAI-77-VOL2/CONTENT/content.htm.
Woodham, "Photometric stereo," *Artificial Intelligence Memo*, No. 479, Artificial Intelligence Laboratory, Massachusetts Institute of Technology (MIT), Cambridge, Massachusetts, Jun. 1978, http://hdl.handle.net/1721.1/6301.
Indebetouw, "Profile measurement using projection of running fringes," *Applied Optics*, vol. 17, No. 18, pp. 2930-2933, Sep. 15, 1978.
Sakata, "General theory of doubly periodic arrays over an arbitrary finite field and its applications," *IEEE Transactions on Information Theory*, vol. 24, Issue 6, pp. 719-730; Nov. 1978.
Potmesil, "Generation of 3D surface descriptions from images of pattern-illuminated objects," *Proceedings of the IEEE Computer Society Conference on Pattern Recognition and Image Processing (PRIP)*, pp. 553-559, Chicago, Illinois, USA, Aug. 6-8, 1979.
de Bruijn, "Sequences of zeros and ones generated by special production rules," Indagationes Mathematicae, *Proceedings of the Koninklijke Nederlandse Akademie van Wetenschappen, Series A*, vol. 84, No. 1, pp. 27-37, Mar. 20, 1981.
Frobin et al., "Rasterstereography: a Photogrammetric Method for Measurement of Body Surfaces," *Photogrammetric Engineering and Remote Sensing*, vol. 47, No. 12, pp. 1717-1724, Dec. 1981.
Jarvis, "A Perspective on Range Finding Techniques for Computer Vision," *IEEE Transactions on Pattern Analysis and Machine Intelligence*, vol. PAMI-5, No. 2, pp. 122-139, Mar. 1983.
Nishihara, "PRISM: A practical realtime imaging stereo matches," *Proceedings of SPIE*, vol. 449, pp. 121-129, 3rd *International Conference on Robot Vision and Sensory Controls*, Cambridge, Massachusetts, USA, Nov. 6-10, 1983.
Chiang et al., "Robot Vision Using a Projection Method," *Proceedings of SPIE*, vol. 449, pp. 113-120, 3rd *International Conference on Robot Vision and Sensory Controls*, Cambridge, Massachusetts, USA, Nov. 6-10, 1983.
Baj et al., "Automatic Measurement of Plate Coordinates in order to Obtain Automatic Plotting," *ISPRS Archives*, vol. XXV, Part A2, Commission II, pp. 28-37, XVth Congress, Rio de Janeiro, Brazil, Jun. 17-29, 1984.
Sugihara et al., "Regular pattern projection for surface measurement," *Proceedings of the 2nd International Symposium on Robotics Research*, MIT Press, pp. 17-24, Kyoto, Japan, Aug. 20-23, 1984.
Strand, "Optical three-dimensional sensing for machine vision," *Optical Engineering*, vol. 24, Issue 1, pp. 33-40, Jan./Feb. 1985.
Echigo et al., "A Fast Method for Extraction of 3-D Information Using Multiple Stripes and Two Cameras," *Proceedings of the 9th International Joint Conference on Artificial Intelligence (IJCAI)*, vol. 2, pp. 1127-1130, Los Angeles, California, USA, Aug. 18-23, 1985.
Lewis et al., "Three-dimensional surface measurement by microcomputer," *Image and Vision Computing*, vol. 4, No. 3, pp. 159-166, Aug. 1986.
Rioux et al., "Compact three-dimensional camera for robotic applications," *Journal of the Optical Society of America(JOSA) A: Optics, Image Science, and Vision*, vol. 3, issue 9, pp. 1518-1521, Sep. 1986.
Boyer et al., "Color Encoded Structured Light for Rapid Active Ranging," *IEEE Transactions on Pattern Analysis and Machine Intelligence*, vol. PAMII-9, Issue 1, pp. 14-28, Jan. 1987.
Asada et al., "Shape From Projecting a Stripe Pattern," *Proceedings of the IEEE International Conference on Robotics and Automation (ICRA)*, vol. 4, pp. 787-792, Raleigh, North Carolina, USA, Mar. 31-Apr. 3, 1987.
Wang et al., "Computation of surface orientation and structure of objects using grid coding," *IEEE Transactions on Pattern Analysis and Machine Intelligence (PAMI)*, vol. 9, No. 1, pp. 129-137, Jan. 1987.
Stokes et al., "Measurement of the shape of the surface of the back in patients with scoliosis. The standing and forward bending Positions," *The Journal of Bone and Joint Surgery*, American Volume, vol. 69-A(2), pp. 203-211, Feb. 1987, ISSN: 0021-9355 1535-1386, http://www.ejbjs.org/content/vol69/issue2/.
Nakazawa et al., "Development of 3-D shape measurement system using fiber grating," *Systems and Computers in Japan*, vol. 18, No. 12, pp. 11-17, 1987.
Warnicki et al., "Corneal topography using computer analyzed rasterstereographic images," *Applied Optics*, vol. 27, Issue 6, pp. 1135-1140, Mar. 15, 1988.
Labuz, "Triangulation of Surface Points with Cameras and Projectors," *Proceedings of the Twentieth Southeastern Symposium on System Theory*, pp. 342-348, Charlotte, North Carolina, USA, Mar. 20-22, 1988.
Besl, "Active, Optical Range Imaging Sensors," *Machine Vision and Applications*, vol. 1, No. 2, pp. 127-152, Jun. 1988.
Wang et al., "An Overview of Geometric Modeling Using Active Sensing," *IEEE Control Systems Magazine*, vol. 8, No. 3, pp. 5-13, Jun. 1988.
Hügli et al., "Generation and Use of Color Pseudo Random Sequences for Coding Structured Light in Active Ranging," *Proceedings of SPIE*, vol. 1010, pp. 75-82, Industrial Inspection: ECOI, Hamburg, Germany, Sep. 19-20, 1988.
Etzion, "Constructions for Perfect Maps and Pseudorandom Arrays," *IEEE Transactions on Information Theory*, vol. 34, No. 5, pp. 1308-1316, Sep. 1988.
Le Moigne et al., "Structured Light Patterns for Robot Mobility," *IEEE Journal of Robotics and Automation*, vol. 4, No. 5, pp. 541-548, Oct. 1988.
Harding et al., "Color Encoded Moire Contouring," *Proceedings of SPIE*, vol. 1005, pp. 169-178, Optics, Illumination, and Image Sensing for Machine Vision III, Cambridge, Massachusetts, USA, Nov. 8-9, 1988.
Morita et al., "Reconstruction of Surfaces of 3-D Objects by M-array Pattern Projection Method," *Proceedings of the 2nd International Conference on Computer Vision (ICCV)*, pp. 468-473, Tampa, Florida, USA, Dec. 5-8, 1988.
Poussart et al., "3-D Sensing for Industrial Computer Vision," *Advances in Machine Vision*, pp. 122-159, Springer-Verlag, New York, NY, 1988.
Aggarwal et al., "3-D Structures from 2-D Images," *Advances in Machine Vision*, pp. 64-121, Springer-Verlag, New York, 1988.
Hu et al., "3-D Surface, Solution Using Structured Light and Constraint Propagation," *IEEE Transactions on Pattern Analysis and Machine Intelligence*, vol. 11, No. 4, pp. 390-402, Apr. 1989.
Maruyama et al., "Range Sensing by Projecting Multi-Slits with Random Cuts," *International Workshop on Industrial Applications of Machine Intelligence and Vision (MIV-89)*, pp. 163-168, Tokyo, Japan, Apr. 10-12, 1989.
Pentland et al., "A Simple, Real-Time Range Camera," *Proceedings of the IEEE Computer Society Conference on Computer Vision and Pattern Recognition (CVPR)*, pp. 256-261, San Diego, California, USA, Jun. 4-8, 1989.
Shrikhande et al., "Surface Orientation from a Projected Grid," *IEEE Transactions on Pattern Analysis and Machine Intelligence (PAMI)*, vol. 11, Issue 6, pp. 650-655, Jun. 1989.

(56) References Cited

OTHER PUBLICATIONS

Keizer et al., "Marked Grid Labeling," *Proceedings of the IEEE Computer Society Conference on Computer Vision and Pattern Recognition (CVPR)*, pp. 612-617, San Diego, California, USA, Jun. 4-8, 1989.
Xu et al., "A Region-Based Stereo Algorithm," *Proceedings of the 11th International Joint Conference on Artificial Intelligence (IJCAI)*, vol. 2, pp. 1661-1666, Detroit, Michigan, USA, Aug. 20-25, 1989.
Vuylsteke et al., "Range Image Acquisition with a Single Binary-Encoded Light Pattern," *IEEE Tansactions on Pattern Analysis and Machine Intelligence (PAMI)* vol. 12, Issue 2, pp. 48-164, Feb. 1990.
Tajima et al., "3-D Data Acquisition by Rainbow Range Finder," *Proceedings of the 10th International Conference on Pattern Recognition (ICPR)*, vol. 1, pp. 309-313, Atlantic City, New Jersey, USA, Jun. 16-21, 1990.
Elad et al., "Three-dimensional measurement of biological surfaces," *ISPRS Journal of Photogrammetry and Remote Sensing*, vol. 45, No. 4, pp. 247-266, Aug. 1990.
Vuylsteke et al., "Image Sensors for Real-Time 3D Acquisition: Part 1," *Traditional and Non-Traditional Robotic Sensors*, Nato Asi Series, vol. F63, Computer and Systems Sciences, Springer-Verlag New York, New York, pp. 187-210, 1990.
Wust et al., "Surface Profile Measurement Using Color Fringe Protection," *Machine Vision and Applications*, vol. 4, No. 3, pp. 193-203, Jun. 1991.
Ethrog, "Rasterstereography and double rasterstereography: two methods for measuring fast dynamic changes of laboratory model surfaces," *ISPRS Journal of Photogrammetry and Remote Sensing*, vol. 46, No. 5, pp. 269-282, Oct. 1991.
Guisser et al., "A New 3-D Surface Measurement System Using a Structured Light," *Proceedings of the IEEE Conference on Computer Vision and Pattern Recognition (CVPR)*, pp. 784-786, Champaign, Illinois, USA, Jun. 15-18, 1992.
Petriu et al., "Visual Object Recognition Using Pseudo-Random Grid Encoding," *Proceedings of IEEE/RSJ International Conference on Intelligent Robots and Systems (IROS)*, pp. 1617-1624, Raleigh, North Carolina, USA, Jul. 7-10, 1992.
Maas, "Robust Automatic Surface Reconstruction with Structured Light," ISPR Archives, vol. XXIX, Part B5, Commission V, pp. 709-713, XVIIth Congress on Close-Range Photogrammetry and Machine Vision, Washington, USA, Aug. 2-14, 1992.
Blake et al., "Trinocular Active Range-Sensing," *IEEE Transactions on Pattern Analysis and Machine Intelligence*, vol. 15, No. 5, pp. 477-483. May 1993.
Chen et al., "Polyhedral Face Reconstruction and Modeling from a Single Image with Structured Light," *IEEE Transactions on Systems, Man and Cybernetics*, vol. 23, No. 3, pp. 864-872, May/Jun. 1993.
Monks et al., "Improved Stripe Matching for Colour Encoded Structured Light," Lecture Notes in Computer Science (LNCS), vol. 719, pp. 176-485, *Proceedings of the 5th International Conference on Computer Analysis of Images and Patterns (CAIP)*, Budapest, Hungary, Sep. 13-15, 1993.
Thieling et al., "An active triangulation based method for fast 3-D industrial measurement," *Proceedings of SPIE*, vol. 2252, pp. 394-401, Optical 3D Measurement Techniques II: Applications in Inspection, Quality Control, and Robotics, Zurich, Switzerland, Oct. 4-7, 1993.
Jarvis, "Range Sensing for Computer Vision," *Three-Dimensional Object Recognition Systems, Advances in Image Communications*, pp. 17-56, Elsevier, 1993.
Hoshino et al., "Measurement of the 3-D Shape of Specular Polyhedrons using an M-array Coded Light Source," *Proceedings of the IEEE Instrumentation and Measurement Technology Conference (IMTC)*, pp. 1329-1332, Hamamatsu, Japan, May 10-12, 1994.
Yee et al., "Three-dimensional imaging system," *Optical Engineering*, vol. 33, No. 6, pp. 2070-2075, Jun. 1, 1994.

Ito et al., "A Three-Level Checkerboard Pattern (TCP) Projection Method for Curved Surface Measurement," *Pattern Recognition*, vol. 28, No. 1, pp. 27-40, Jan. 1995.
Pajdla, "BCRF—Binary Illumination Coded Range Finder: Reimplementation," *Technical report KUI/ESAT/MT2/9502*, Katholieke Universiteit Leuven, Belgium, Apr. 1995, http://cmp.felk.cvut.cz/ftp/articles/pajdla/bcrf.ps.Z.
Kang et al., "A Multibaseline Stereo System with Active Illumination and Real-Time Image Acquisition," *Proceedings of the 5th International Conference on Computer Vision (ICCV)*, pp. 88-93, Cambridge, Massachusetts, USA, Jun. 20-23, 1995.
Liu et al., "Three Dimensional Reconstruction of Trunk Surface Using Structured Light," *IEEE International Conference on Systems, Man and Cybernetics: Intelligent Systems for the 21st Century*, vol. 2, pp. 1085-1090, Vancouver, Canada, Oct. 22-25, 1995.
Geng, "Rainbow three-dimensional camera: new concept of high-speed three-dimensional vision systems," *Optical Engineering*, vol. 35, No. 2, pp. 376-383, Feb. 1996.
Smutny et al., "Rainbow Range Finder and its Implementation at the CVL," Technical Report K335-96-130, Czech Technical University; Prague, Mar. 5, 1996, http://cmp.felk.cvut.cz/ftp/article/smutny/rrf.ps.gz.
Salvi et al., "Contribution on the mobile navigation in structured indoor environments using laser beam patterns," *Proceedings of SPIE*, vol. 2785, pp. 193-203, Vision Systems: New Image Processing Techniques, Besancon, France, Jun. 11-12, 1996.
Lavoie et al., "3-D Object Model Recovery From 2-D Images Using Structured Light," *Proceedings of the IEEE Instrumentation and Measurement Technology (IMTC)*, pp. 377-382, Brussel, Belgium, Jun. 4-6, 1996.
Koschan et al., "Color Stereo Vision Using Hierarchical Block Matching and Active Color Illumination," *Proceedings of the 13th International Conference on Pattern Recognition (ICPR)*, vol. 1, pp. 835-839. Vienna, Austria, Aug. 25-29, 1996.
Proesmans et al., "One-Shot Active 3D Shape Acquisition," *Proceedings of the 13th International Conference on Pattern Recognition (ICPR)*,vol. 3, pp. 336-340, Vienna, Austria, Aug. 25-29, 1996.
Chia et al., "Curved Surface Reconstruction Using a Simple Structured Light Method," *Proceedings of the 13th International Conference on Pattern Recognition (ICPR)*, vol. 1, pp. 844-848, Vienna, Austria, Aug. 25-29, 1996.
Knoll et al., "Generation of Dense Range Maps by Data Fusion from Active and Passive Colour Stereo Vision," *IEEE/SICE/RSJ International Conference on Multisensor Fusion and Integration for Intelligent Systems (MFI)*, pp. 410-415, Washington, D.C., USA, Dec. 8-11, 1996.
Schubert, "Fast 3D Object Recognition Using Multiple Color Coded Illumination," *Proceedings of the IEEE International Conference on Acoustics, Speech, and Signal Processing (ICASSP)*, vol. 4, pp. 3057-3060, Munich, Germany, Apr. 21-24, 1997.
Chen et al., "Range data acquisition using color structured lighting and stereo vision," *Image and Vision Computing*, vol. 15, No. 6, pp. 445-456, Jun. 1997.
Huynh, "Calibration of a Structured Light System: a Projective Approach," *Proceedings of the IEEE Computer Society Conference on Computer Vision and Pattern Recognition (CVPR)*, pp. 225-230, San Juan, Puerto Rico, Jun. 17-19, 1997.
Davies et al., "A Hough Transform for Detecting the Location and Orientation of Three-Dimensional Surfaces Via Color Encoded Spots," *IEEE Transactions on Systems, Man, and Cybernetics—Part B: Cybernetics*, vol. 28, No. 1, pp. 90-95, Feb. 1998.
Morano et al., "Structured Light Using Pseudorandom Codes," *IEEE Transactions art Pattern Analysis and Machine Intelligence*, vol. 20, No. 3, pp. 322-327, Mar. 1998.
Batlle et al., "Recent Progress in Coded Structured Light as a Technique to Solve the Correspondence Problem: A Survey," *Pattern Recognition*, vol. 31, No. 7, pp. 961-982 Jul. 31, 1998.
Spoelder et al., "A Study of the Robustness of Pseudorandom Binary-Array-Based Surface Characterization," *IEEE Transactions on Instrumentation and Measurement*, vol. 47, No. 4, pp. 833-838, Aug. 1998.

(56) References Cited

OTHER PUBLICATIONS

Salvi et al., "A robust-coded pattern projection for dynamic 3D scene measurement," *Pattern Recognition Letters*, vol. 19, No. 11, pp. 1055-1065, Sep. 1998.
Huang et al., "Color-encoded fringe projection and phase shifting for 3-D surface contouring," *Optical Engineering*, vol. 38, No. 6, pp. 1065-1071, Jun. 1999.
Lange et al., "Time-of-flight range imaging with a custom solid-state image sensor," *Laser Metrology and Inspection*, Proceedings of SPIE, vol. 3823, pp. 180-191, Munich, Germany, Jun. 14-15, 1999.
Lavoie et al., "A High Precision 3D Object Reconstruction Method Using a Color Coded Grid and NURBS," *Proceedings of the International Conference on Image Analysis and Processing*, pp. 370-375, Venice, Italy, Sep. 27-29, 1999.
Chen et al., "Overview of three-dimensional shape measurement using optical methods," *Optical Engineering*, vol. 39, No. 1, pp. 10-22, Jan. 2000.
Hioki, "Adaptive Light Projection and Highlight Analysis Method for Measuring Three-Dimensional Scenes," *Proceedings of the International Conference on Image Processing*, vol. 1, pp. 565-568, Vancouver, BC, Canada, Sep. 10-13, 2000.
Mada et al., "An Overview of Passive and Active Vision Techniques for Hand-Held 3D Data Acquisition," *Proceedings of SPIE*, vol. 4877, pp. 16-27, Opto-Ireland 2002: Optical Metrology, Imaging, and Machine Vision, Galway, Ireland, Sep. 5-6, 2002.
Tsubouchi et al., "A straight pipe observation from the inside by laser spot array and a TV camera," *Proceedings of the IEEE/RSJ International Conference on intelligent Robots and Systems (IROS)*, vol. 1, pp. 82-87, Takamatsu, Japan, Oct. 31-Nov. 5, 2000.
Hsieh, "Decoding structured light patterns for three-dimensional imaging systems," *Pattern Recognition*, vol. 34, No. 2, pp. 343-349, Feb. 2001.
Hall-Holt et al., "Stripe Boundary Codes for Real-Time Structured Light Range Scanning of Moving Objects," *Proceedings of the 8th IEEE International Conference on Computer Vision (ICCV)*, vol. 2, pp. 359-366, Vancouver, BC, Canada, Jul. 7-14, 2001.
Forster et al., "The Hiscore Camera—A Real Time Three Dimensional and Color Camera," *Proceedings of the International Conference on Image Processing (ICIP)*, vol. 2, pp. 598-601, Thessaloniki, Greece, Oct. 7-10, 2001.
Zhang et al., "Rapid Shape Acquisition Using Color Structured Light and Multi-pass Dynamic Programming," *Proceedings of 1st International Symposium on 3D Data Processing Visualization and Transmission (3DPVT)*, Padova, Italy, pp. 24-36, Jun. 2002.
Winkelbach et al., "Shape from Single Stripe Pattern Illumination," *Lecture Notes in Computer Science (LNCS)*, vol. 2449, pp. 240-247, Proceedings of the 24th DAGM Symposium on Pattern Recognition, Zurich, Switzerland, Sep. 16-18, 2002.
Naftel et al., "Acquiring Dense 3D Facial Models Using Structured-Light Assisted Stereo Correspondence," *International Conference on Computer Vision and Graphics (ICCVG)*, pp. 568-576, Zakopane, Poland, Sep. 25-29, 2002, http://www.co.umist.ac.uk/research/tech_reports/trs_2002_004_ajn.pdf.
Sinlapeecheewa et al., "3D Profile Measurement by Color Pattern Projection and System Calibration," *Proceedings of the IEEE International Conference on Industrial Technology (ICIT)*, pp. 405-410, Bangkok, Thailand, Dec. 11-14, 2002.
Sá et al., "Coded Structured Light for 3D-Photography: An Overview," *RITA*, vol. 4, No. 2, pp. 110-124, Jul. 1999, http://www.visgraf.impa.br/Data/RefBib/PS_PDF/rita-survey/survey.pdf.
Huang et al., "High-speed 3-D shape measurement based on digital fringe projection," *Optical Engineering*, vol. 42, No. 1, pp. 163-168, Jan. 2003.
Guan et al., "Composite structured light pattern for three-dimensional video," *Optics Express*, vol. 11, No. 5, pp. 406-417, Mar. 10, 2003.
Kapusta, "Scene reconstruction using structured licht," *Proceedings of the Central European Seminar on Computer Graphics (CESCG)*, 6 unnumbered pages, Budmerice castle, Slovakia, Apr. 22-24, 2003.
Davis et al., "Spacetime Stereo: A Unifying Framework for Depth from Triangulation," *Proceedings of the 2003 IEEE Computer Society Conference on Computer Vision and Pattern Recognition*, vol. 2, pp. 359-366, Madison, Wisconsin, USA, Jun. 18-20, 2003.
Zhang et al., "Spacetime Stereo: Shape Recovery for Dynamic Scenes," *Proceedings of IEEE Computer Society Conference on Computer Vision and Pattern Recognition (CVPR)*, vol. 2, pp. 367-374, Madison, Wisconsin, Jun. 18-20, 2003.
Lu et al., "Optimal intensity modulation projection technique for three-dimensional shape measurement," *Applied Optics*, vol. 42. No. 23, pp. 4649-4657, Aug. 10, 2003.
Saji et al., "Fusion of Color Photometric Stereo Method and Slit Pattern Projection Method to Measure Three-Dimensional Shapes of a Human Face," *Proc. VIIth Digital Image Computing: Techniques and Applications*, Dec. 2003, pp. 731-740; Sydney.
Strat et al., "A Point-and-Shoot Color 3D Camera," *Proceedings of the 4th International Conference on 3-D Digital Imaging and Modeling (3DIM)*, pp. 483-490, Banff, Canada, Oct. 6-10, 2003.
Koninckx et al., "Real-time Range Scanning of Deformable Surfaces by Adaptively Coded Structured Light," *Fourth International Conference on 3-D Digital Imaging and Modeling (3DIM)*, pp. 293-300, Banff, Canada, Oct. 6-10, 2003.
Boverie et al., "Comparison of structured light and stereovision sensors for new airbag generations," *Control Engineering Practice*, vol. 11, No. 12, pp. 1413-1421, Dec. 2003.
Ababsa et al., "Structured Light 3D Free Form Recovering With Sub-pixel Precision," *Machine Graphics & Vision International Journal*, vol. 12, No. 4, pp. 453-476, 2003.
Blais, "Review of 20 Years of Range Sensor Development," *Journal of Electronic Imaging*, vol. 13, No. 1, pp. 231-240, Jan. 2004.
Salvi et al., "Pattern codification strategies in structured light systems," *Pattern Recognition*, vol. 37, Issue 4, pp. 1-26, Apr. 2004.
Umeda, "A compact range image sensor suitable for robots," *IEEE International Conference on Robotics and Automation (ICRA)*, vol. 3, pp. 3167-3172, New Orleans, Louisiana, USA, Apr. 26-May 1, 2004.
Adán et al., "Disordered Patterns Projections for 3D Motion Recovering," *Proceedings of the 2nd International Symposium on 3D Data Processing, Visualization, and Transmission (3DPVT)*, pp. 262-269, Thessaloniki, Greece, Sep. 6-9, 2004.
Popescu et al., "Interactive Modeling from Dense Color and Sparse, Depth," *Proceedings of the 2nd International Symposium on 3D Data Processing. Visualization, and Transmission (3DPVT)*, pp. 430-437, Thessaloniki, Greece, Sep. 6-9, 2004.
Reiss et al., "A Low Cost Structured Light System," *Poster Proceedings of the 13th International Conference in Central Europe on Computer Graphics, Visualisation and Computer Vision (WSCG)*, pp. 53-54, Pilsen, Czech Republic, Jan. 31-Feb. 4, 2005, http://wscg.zeu.cz/WSCG2005/wscg_program.htm.
Kong et al., "Spatial Encoding of Structured Light for Ranging with Single Camera," *SAE Technical Paper Series*, Paper No. 2005-01-0739, Detroit, Michigan, USA, Apr. 11-14, 2005.
Vieira et al., "A camera-projector system for real-time 3D video," *IEEE Computer Society Conference on Computer Vision and Pattern Recognition (CVPR)*, Workshop on Projector-Camera Systems (PROCAMS), San Diego, California, USA, Jun. 25, 2005.
Wong et al., "Fast acquisition of dense depth data by a new structured light scheme," *Computer Vision and Image Understanding (CVIU)*, vol. 98, No. 3, pp. 398-422, Jun. 2005.
Sazbon et al., "Qualitative real-time range extraction for preplanned scene partitioning using laser beam coding," *Pattern Recognition letters*, vol. 26, No. 11, pp. 1772-1781, Aug. 2005.
Pagès et al., "Optimised De Bruijn patterns for one-shot shape acquisition," *Image and Vision Computing*, vol. 23, No. 8, pp. 707-720, Aug. 1, 2005.
Dipanda et al., "Towards a real-time 3D shape reconstruction using a structured light system," *Pattern Recognition*, vol. 38, No. 10, pp. 1632-1650, Oct. 2005.
Pagès et al., "An approach to visual servoing based on coded light," *Proceedings of the IEEE International Conference on Robotics and Automation*, pp. 4118-4123, Orlando, Florida, USA, May 15-19, 2006.

(56) References Cited

OTHER PUBLICATIONS

Beumier, "3D Face Recognition," *IEEE International Conference on Industrial Technology (ICIT)* 2006, pp. 369-374, Mumbai, India, Dec. 15-17, 2006.

Li et al., "Toward Dynamic calibration and three-dimensional reconstruction in a structured light system," *Journal of the Optical Society of America (JOSA) A: Optics, Image Science and Vision*, vol. 24, No. 3, pp. 785-793, Mar. 2007.

Hernández et al., "Non-rigid Photometric Stereo with Colored Lights," *Proceedings of the 11th IEEE International Conference on Computer Vision (ICCV)*, pp. 1-8, Rio de Janeiro, Brazil, Oct. 14-21, 2007.

Albitar et al., "Robust Structured Light Coding for 3D Reconstruction." *Proceedings of the 11th IEEE International Conference on Computer Vision (ICCV)*, pp. 1-6, Rio de Janeiro, Brazil, Oct. 14-21, 2007.

Song et al., "3D Shape Recovery by the Use of Single Image Plus Simple Pattern Illumination," Lecture Notes in Computer Science (LNCS), vol. 4841, pp. 268-277, *Proceedings of the 3rd International Symposium on Advances in Visual Computing (ISVC)*, Lake Tahoe, Nevada, USA, Nov. 26-28, 2007.

Written Opinion issued in PCT/IL2007/001432 dated May 28, 2008.

International Search Report in PCT/IL2007/001432 dated May 28, 2008.

L. Lucchese "Geometric calibration of digital cameras through multi-view rectification", Image Vis. Comput., 2005, vol. 23, No. 5, pp. 517-539, Jan. 14, 2005.

L. Lucchese, S. K. Mitra, "Using Saddle Points for Subpixei Feature Detection in Camera Calibration Targets.", Proceedings of the 2002 Asia Pacific Conference on Circuits and Systems (pp. 191-195), Dec. 2002.

U.S. Appl. No. 13/968,961, filed Aug. 16, 2013 in the name of Gordon et al.

\* cited by examiner

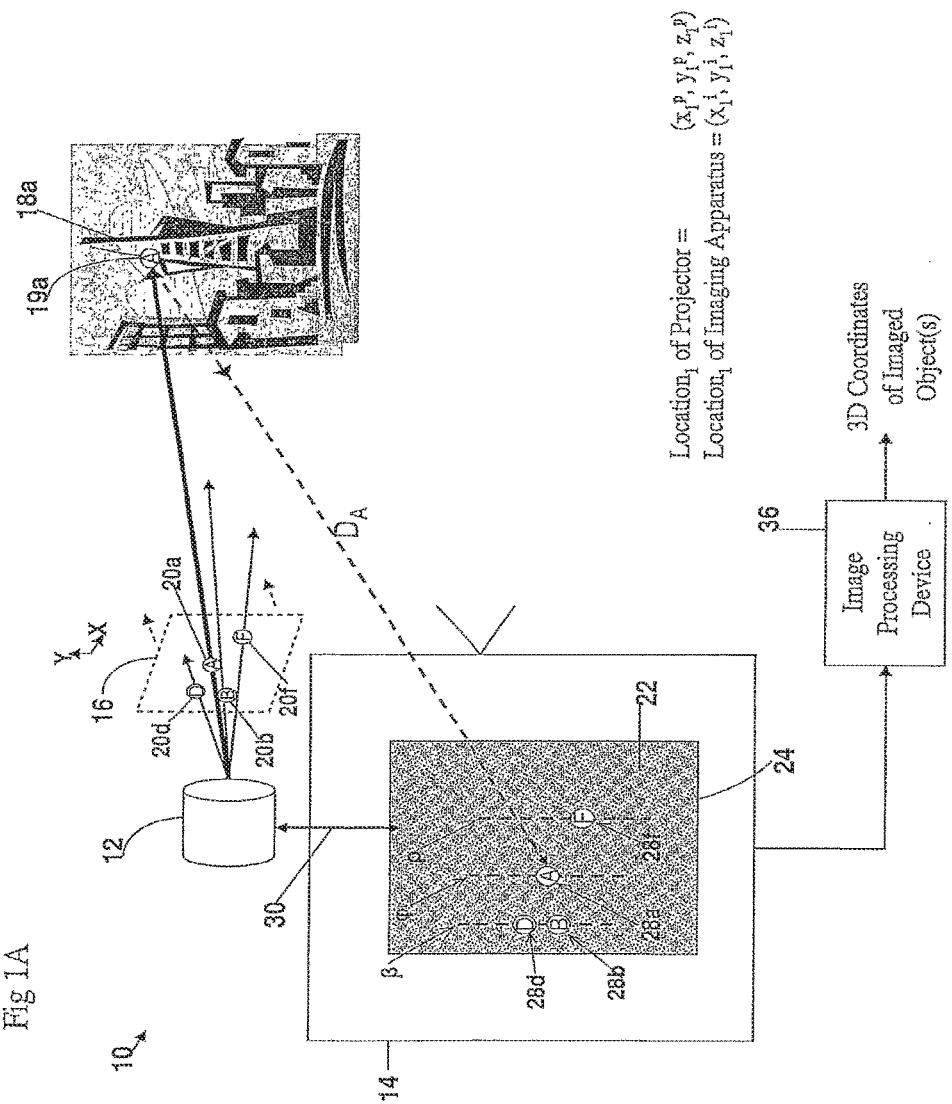

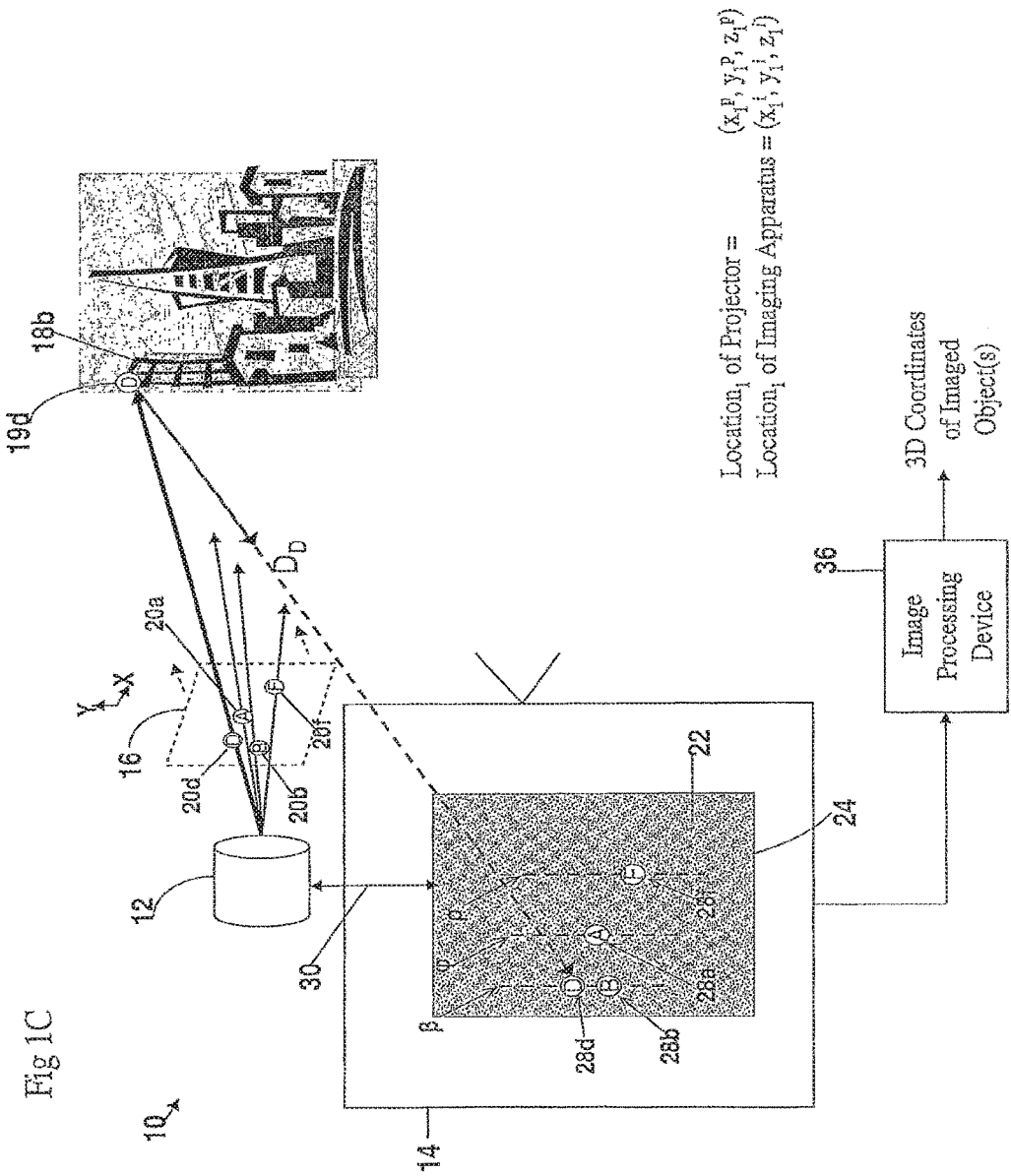

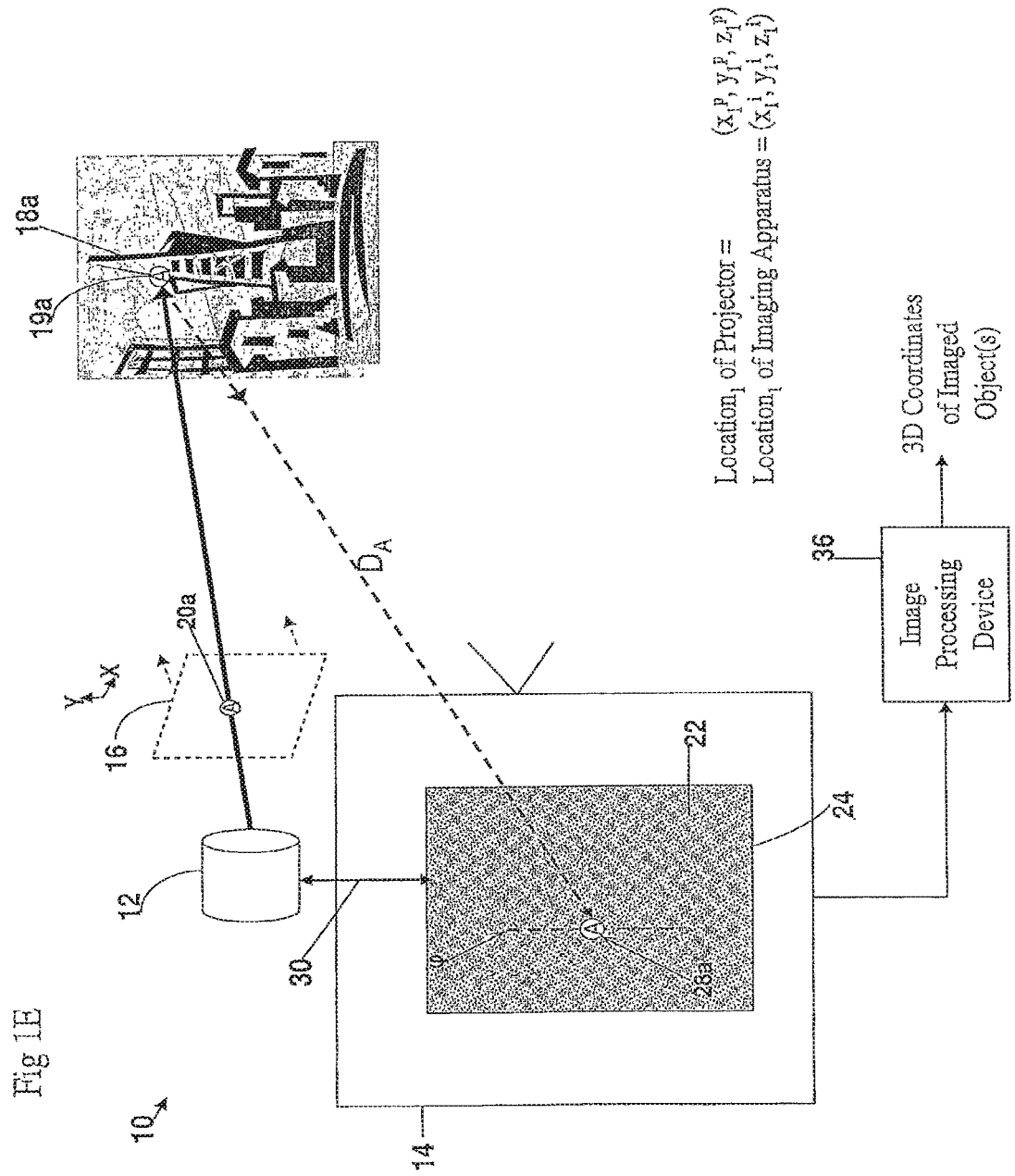

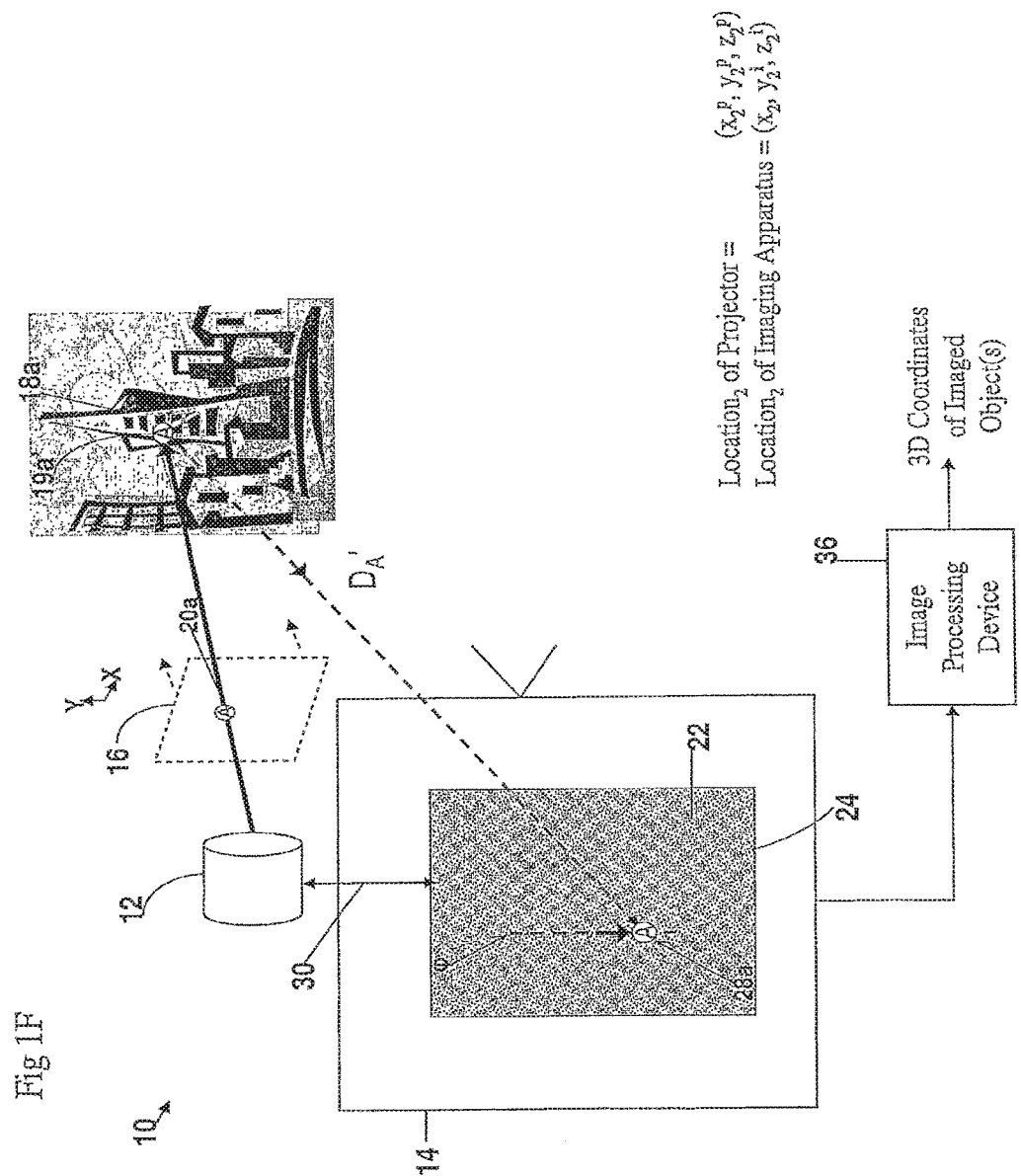

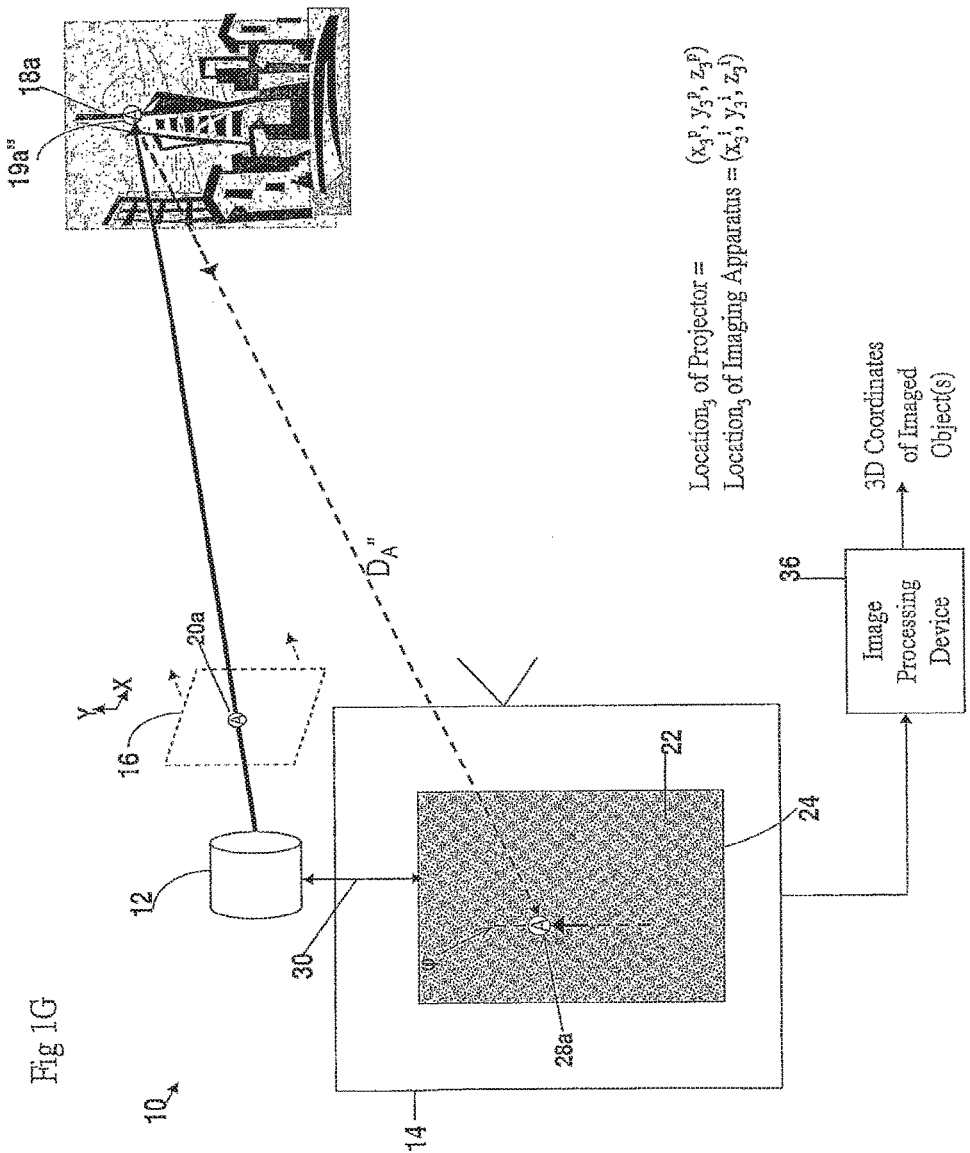

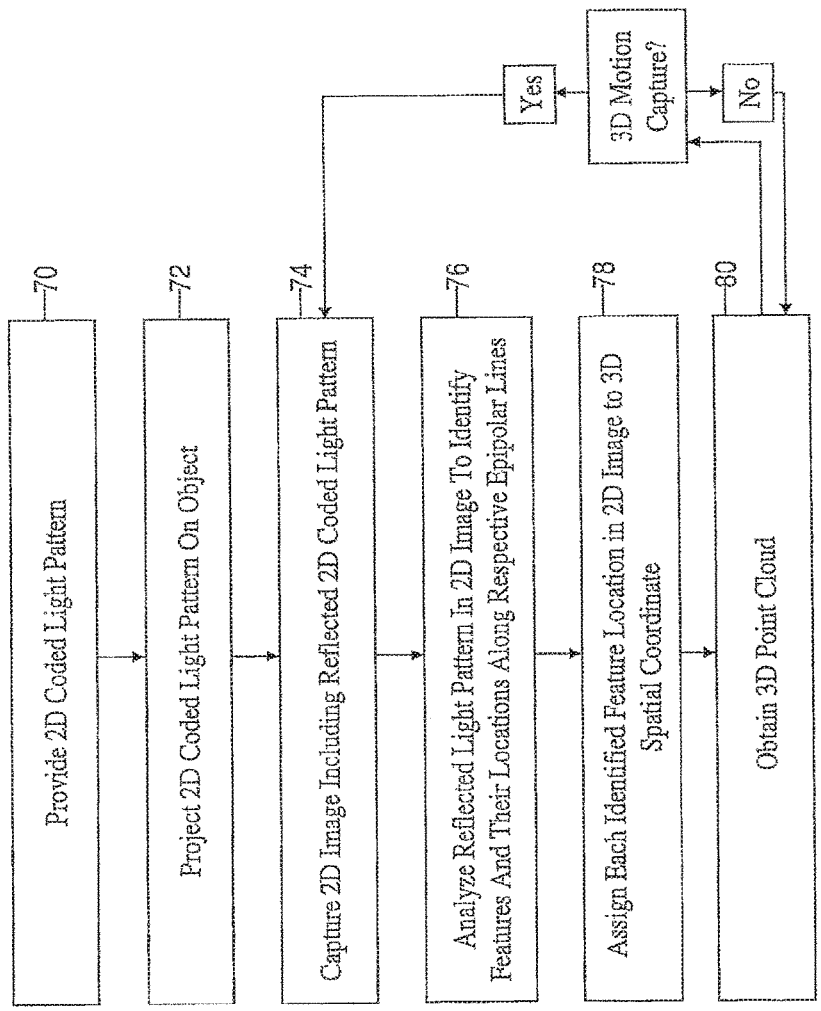

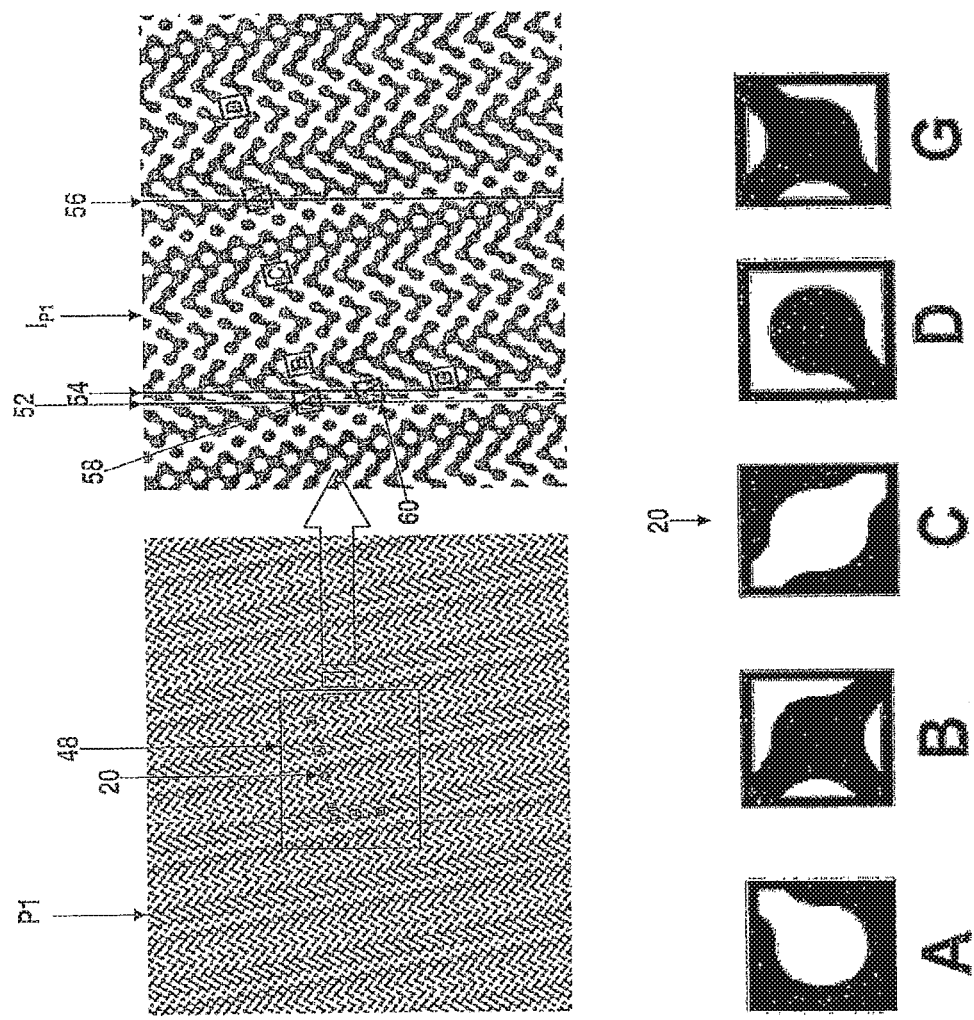

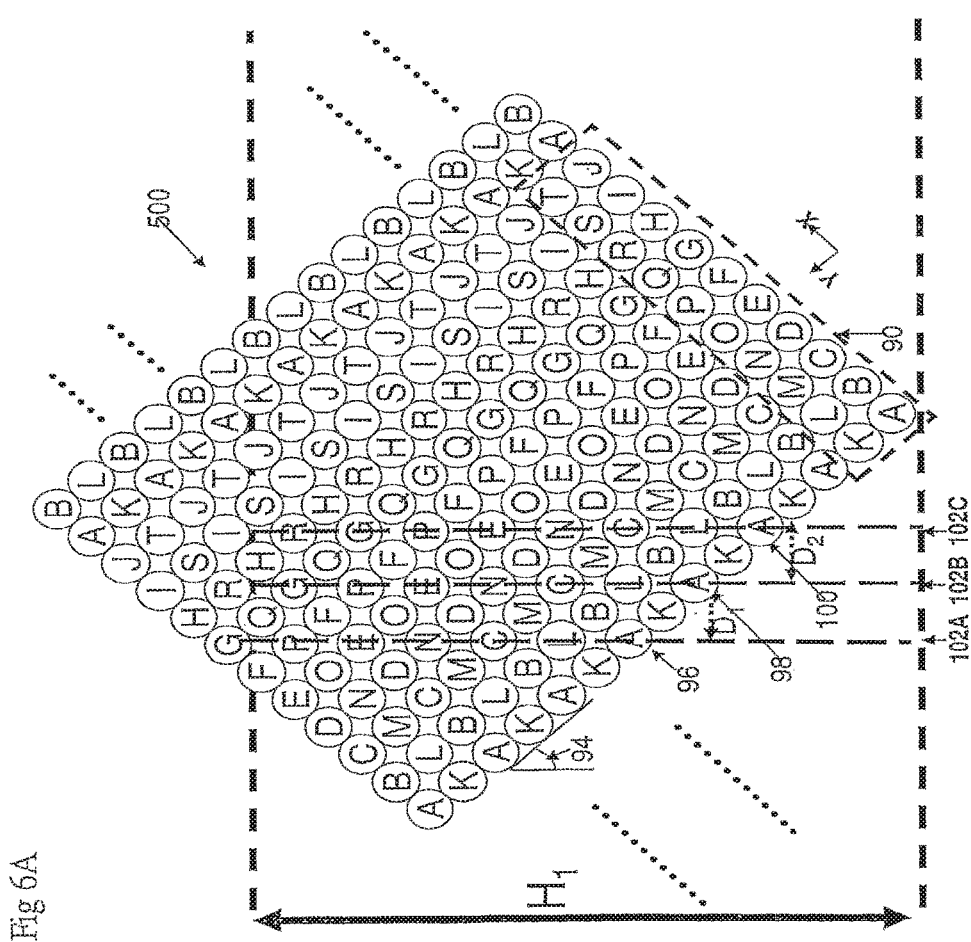

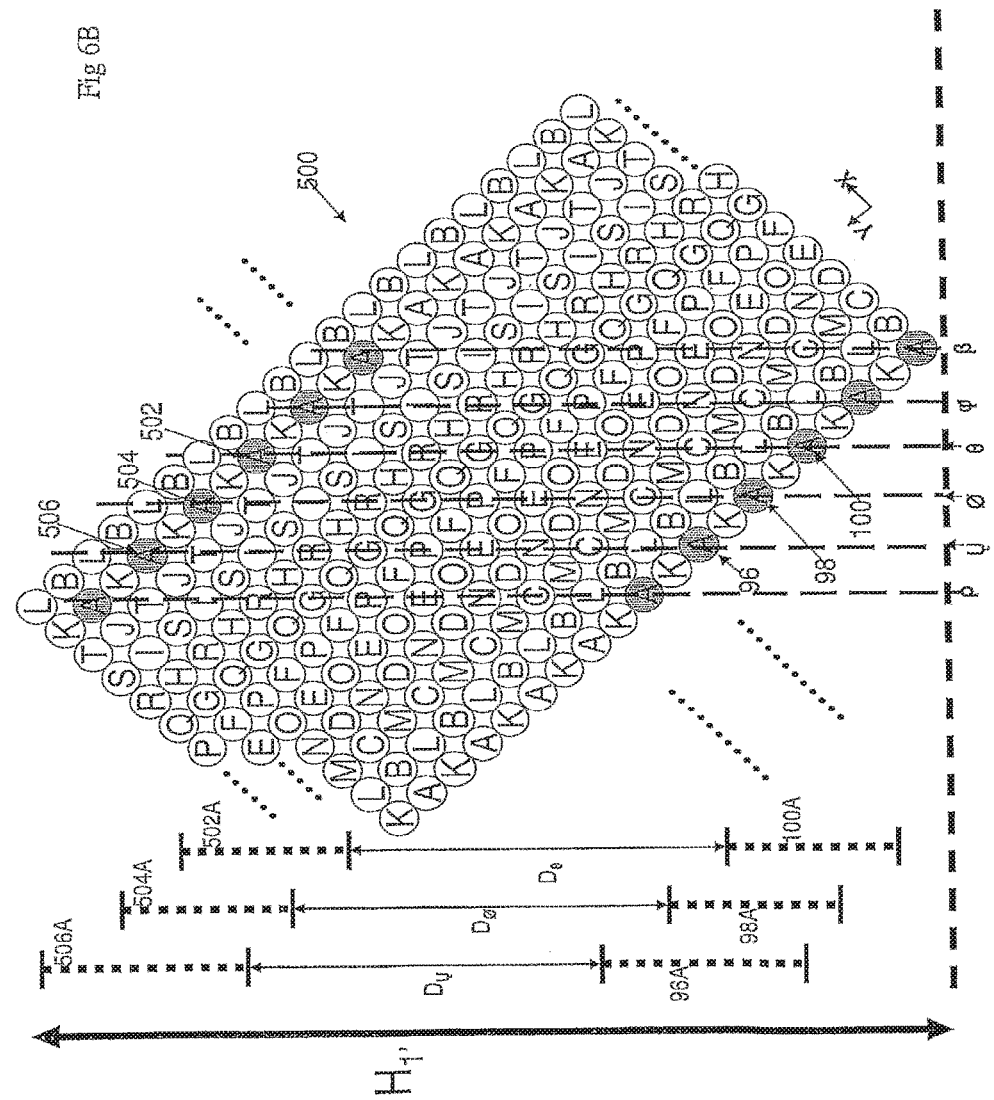

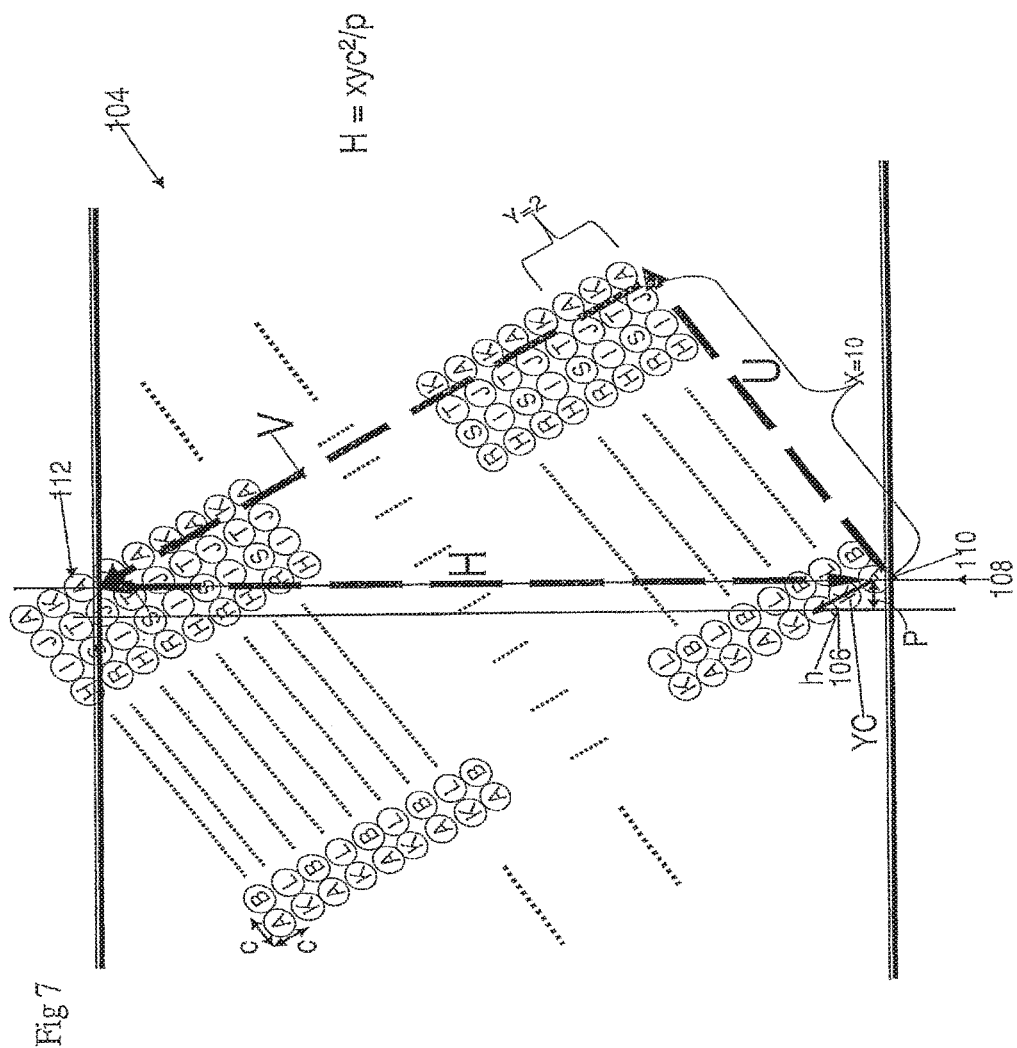

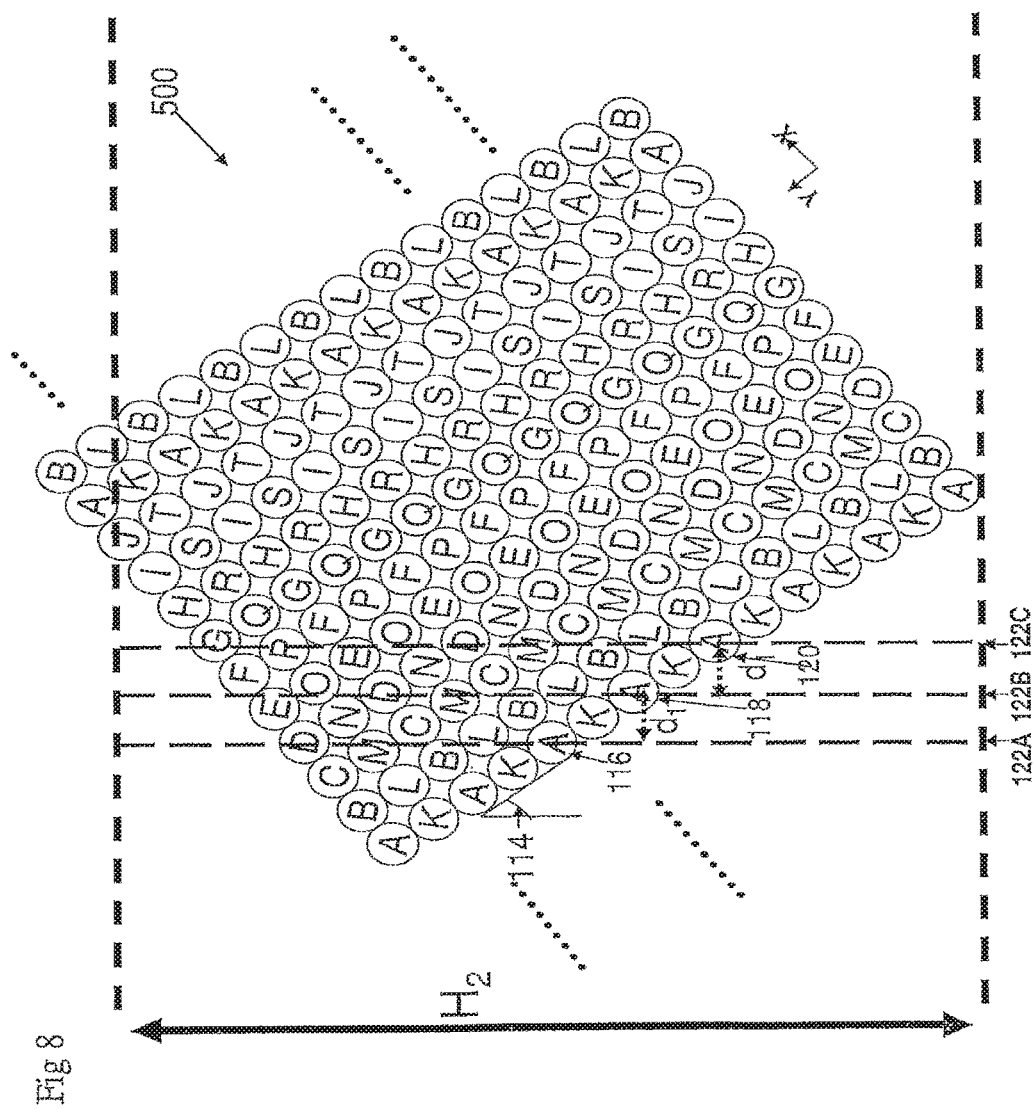

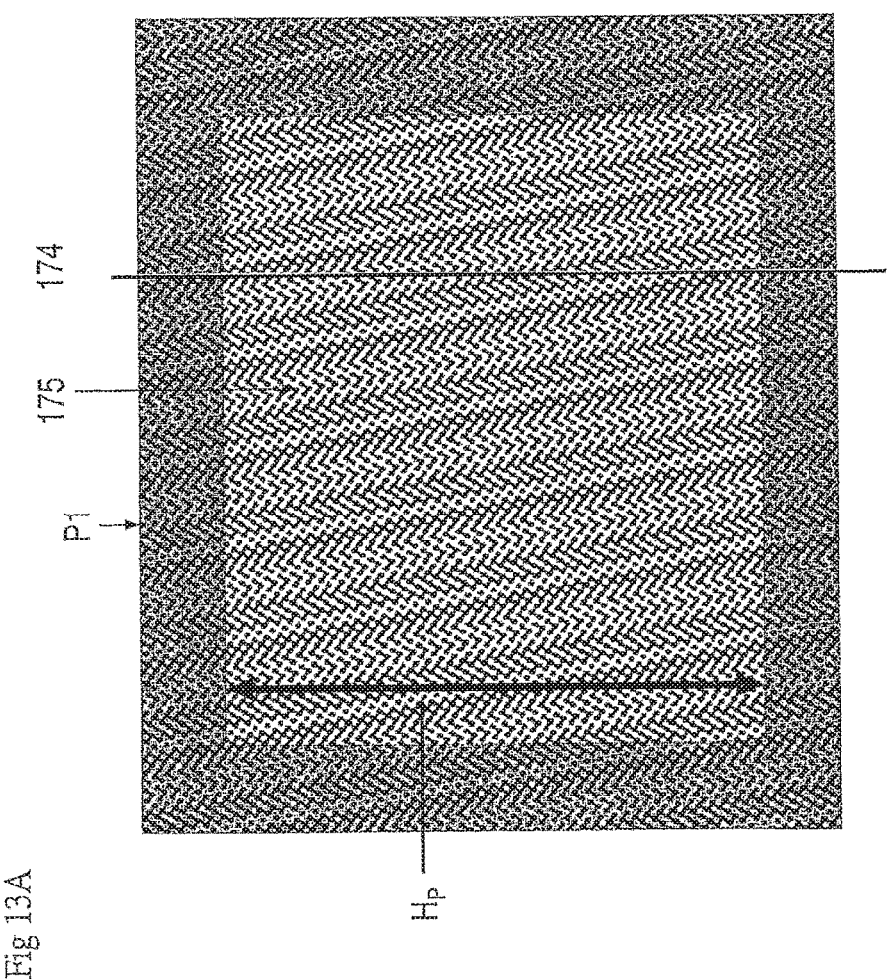

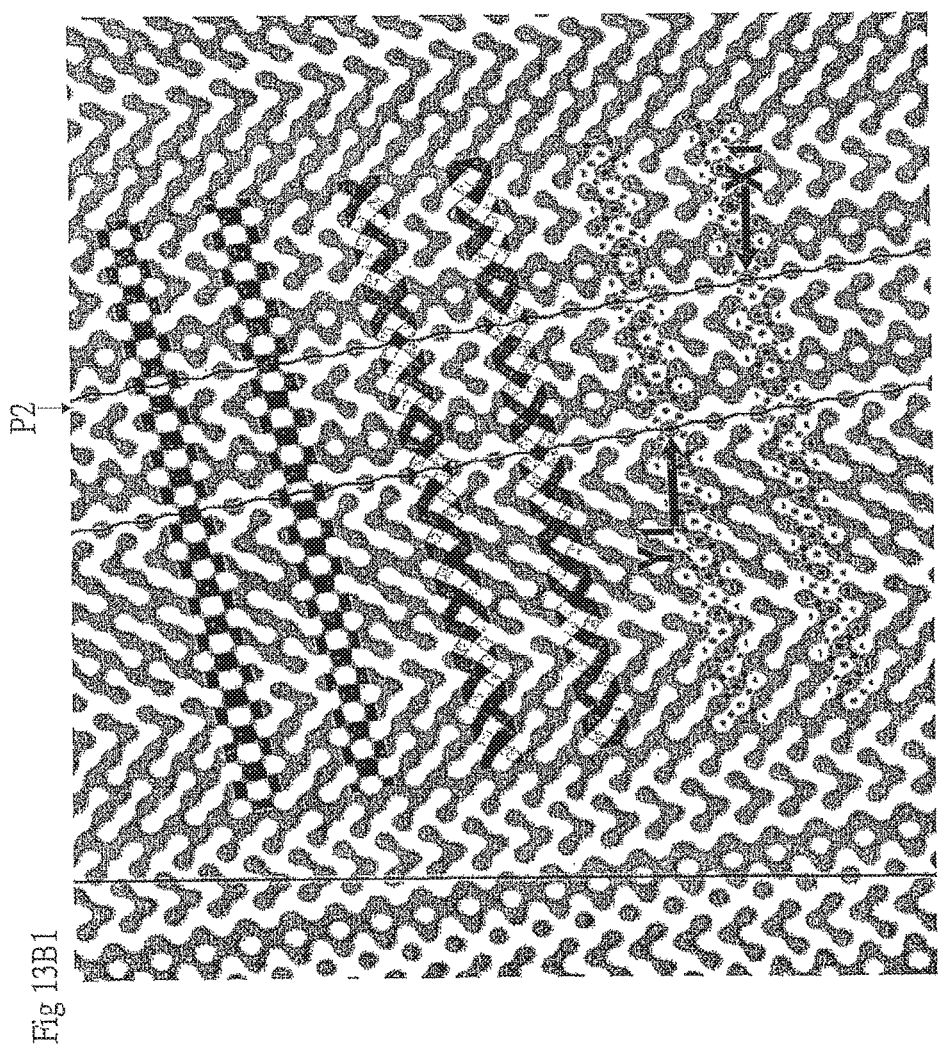

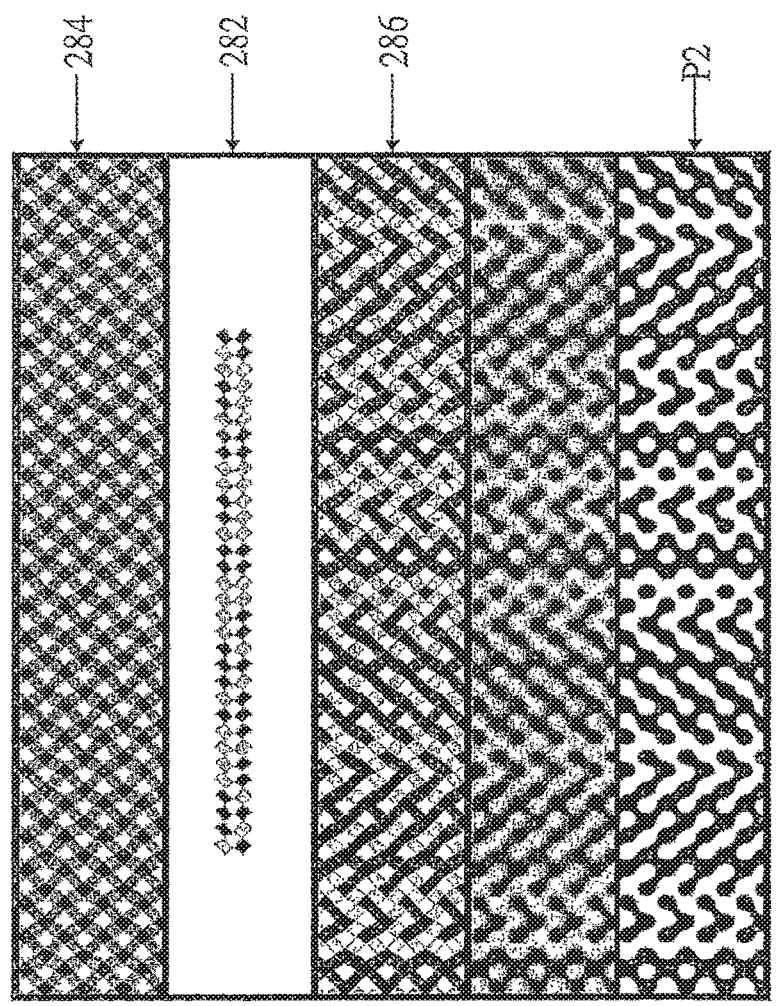
Fig 13B2

3D GEOMETRIC MODELING AND 3D VIDEO CONTENT CREATION

RELATIONSHIP TO EXISTING APPLICATIONS

The present application is a Continuation of U.S. patent application Ser. No. 14/717,487, filed May 20, 2015, which is a Continuation of U.S. patent application Ser. No. 13/968,961, filed Aug. 16, 2013, which is a Continuation of U.S. patent application Ser. No. 12/515,715, filed May 20, 2009, which is the U.S. National Phase of PCT/IL2007/001432, filed Nov. 20, 2007. The contents of the aforementioned applications are hereby incorporated by reference.

The present application claims priority from U.S. provisional patent 60/860,209, filed on Nov. 21, 2006, the contents of which are hereby incorporated by reference.

The present application also claims priority from U.S. provisional patent 60/907,495, filed on Apr. 4, 2007, the contents of which are hereby incorporated by reference.

The present application also claims priority from U.S. provisional patent 60/924,206, filed on May 3, 2007, the contents of which are hereby incorporated by reference.

The present application also claims priority from U.S. provisional patent 60/929,835, filed on Jul. 13, 2007, the contents of which are hereby incorporated by reference.

The present application also claims priority from U.S. provisional patent 60/935,427 filed on Aug. 13, 2007, the contents of which are hereby incorporated by reference.

FIELD AND BACKGROUND OF THE INVENTION

The present invention relates to a system and a method for three dimensional imaging and depth measurement of objects using active triangulation methods, and, more particularly, but not exclusively, to three dimensional imaging of both objects at rest and in motion.

Three dimensional sensor systems are used in a wide array of applications. These sensor systems determine the shape and or surface features of an object positioned in a scene of the sensor system's view. In recent years, many methods have been proposed for implementing 3D modeling systems that are capable of rapid acquisition of accurate high resolution 3D images of objects for various applications.

The precise configuration of such 3D imaging systems may be varied. Many current triangulation-based systems use an array of at least two or more cameras to determine the depth values by what is known as passive stereo correspondence. Such a method is dependent on the imaged surfaces being highly textured and therefore error prone and non-robust. Furthermore, automatic correspondence algorithms often contain an abundance of errors in matching between shots from different cameras.

Other methods utilize LIDAR (Light Imaging Detection and Ranging) systems to determine range to and/or other information relating to a distant target. By way of light pulses, the distance to an object is determined by measuring the time delay between transmission of the light pulse and detection of the reflected signal. Such methods, referred to as time-of-flight methods, are generally immune to occlusions typical of triangulation methods, but the accuracy and resolution are inherently inferior to that obtained in triangulation methods.

Active triangulation-based 3D sensor systems and methods typically have one or more projectors as a light source for projecting onto a surface and one or more cameras at a defined, typically rectified, relative position from the projector for imaging the lighted surface. The camera and the projector therefore have different optical paths and the distance between them is referred to as the baseline. Through knowledge of the baseline distance, as well as projection and imaging angles, known geometric/triangulation equations are utilized to determine distance to the imaged object. The main differences among the various triangulation methods known in the art lie in the method of projection as well as the type of light projected, typically structured light, and in the process of image decoding to obtain three dimensional data.

Methods of light projection vary from temporal methods to spatial coded structured light. Examples in the art of various forms of projected light include "laser fans" and line coded light.

Once a 2D image of the object is captured upon which a light source is projected as described above, image processing software generally analyzes the image to extract the three dimensional geometry of the object and possibly the three dimensional movement of the object through space. This is generally done by comparison of features in the captured image with previously captured images and/or with known characteristics and features of the projected light. The implementation of this step varies widely among currently known methods, typically a function of the method used to project light onto the object. Whatever the method used, the outcome of the process is generally a type of disparity/displacement map of identified features in the captured image. The final step of 3D spatial location and/or 3D motion capture involves the translation of the above mentioned disparity map into depth data, according to well known geometric equations, particularly triangulation equations.

The very fact that hundreds of methods and systems exist today hints at the underlying problem of a lack of a sufficiently effective and reliable method for 3D imaging. Furthermore, most of the systems that utilize active triangulation methods today are restricted to non dynamic imaging of objects. That is to say, even at high frame rates and shutter speeds, the imaged object must remain static during image acquisition. For example, a building may be imaged, but not a person riding a bike or cars moving on the street. This limitation on three dimensional imaging is a direct result of the need in most triangulation based 3D imaging systems to obtain a series of images while changing the characteristics of the light source over time. For example, many methods utilize a number of light patterns projected over a time interval, known as temporal coding.

Nonetheless, many methods have been introduced over the years for the three dimensional imaging of moving objects, most of which are based on the projection of a single pattern of light on the imaged object, thus enabling reconstruction of the depth measurements from one or more simultaneous images rather than multiple images over a time interval. These single pattern methods can be broken down into two main classes. The first is assisted stereo methods wherein a single pattern is projected and a comparison is made between two or more images from two or more imaging systems to compute depth data.

The second is structured light methods and, in particular, coded structured light methods. These methods often use only one imaging system or camera. Coded structured light methods can further be broken down into several encoding types. One such type using coded structured light is spatial coding, which suffers from a wide range of problems of precision and reliability, particularly regarding feature identification, and other serious performance limitations. As a result, spatial single pattern systems have been implemented commercially only in a very limited manner. A further structured coding technique in the art is spectral, or color coding, which requires a color neutral surface and usually requires expensive imaging systems.

Therefore, there is an unmet need for, and it would be highly useful to have, a system and a method that overcomes the above drawbacks.

SUMMARY OF THE INVENTION

According to an embodiment of the present invention, a method of obtaining data from a 2D (two-dimensional) image in order to determine the 3D (three-dimensional) shape of objects appearing in the 2D image, said 2D image having distinguishable epipolar lines, may comprise:

providing a predefined set of types of features, giving rise to feature types, each feature type being distinguishable according to a unique bi-dimensional formation, providing a coded light pattern comprising multiple appearances of said feature types;

projecting said coded light pattern on said objects such that the distance between epipolar lines associated with substantially identical features is less than the distance between corresponding locations of two neighboring features;

capturing a 2D image of said objects having said projected coded light pattern projected thereupon, said 2D image comprising reflections of said feature types; and extracting:
a) said reflected feature types according to the unique bi-dimensional formations; and
b) locations of said reflected feature types on respective epipolar lines in said 2D image.

According to another embodiment of the present invention, a method of obtaining data from a 2D image in order to determine the 3D (three-dimensional) shape of objects appearing in said 2D image, said 2D image having distinguishable epipolar lines, may comprise:

providing a predefined set of types of features, giving rise to feature types, each feature type being distinguishable according to a unique bi-dimensional formation;

providing a coded light pattern comprising multiple appearances of said feature types;

projecting said coded light pattern on said objects at an angle in relation to said epipolar lines, said angle being in accordance with a determined limiting distance between said distinguishable epipolar lines;

capturing a 2D image of said objects having said projected coded light pattern projected thereupon, said 2D image comprising reflections of said feature types; and extracting:
a) said reflected feature types according to the unique bi-dimensional formations; and
b) locations of said reflected feature types on respective said epipolar lines in said 2D image.

According to still another embodiment of the present invention, the method further comprises determining corresponding 3D spatial coordinates of the objects by means of the locations of the reflected feature types on the respective epipolar lines.

According to still another embodiment of the present invention, the method further comprises providing a 3D point cloud by a compilation of the 3D spatial coordinates.

According to still another embodiment of the present invention, the method further comprises processing the 3D point cloud to form a 3D surface.

According to still another embodiment of the present invention, the method further comprises adding texture data of the objects.

According to a further embodiment of the present invention, the method further comprises providing the coded light pattern as one or more of the following:
a) a repeating periodic pattern; and
b) a non-periodic pattern.

According to still a further embodiment of the present invention, the method further comprises projecting the coded light pattern such that each of the feature types appears at most once on one or more predefined sections of the distinguishable epipolar lines.

According to still a further embodiment of the present invention, the method further comprises providing the entire length of epipolar lines in the 2D image within the predefined sections of the epipolar lines.

According to still a further embodiment of the present invention, the method further comprises providing the predefined sections as sections of the length of the epipolar lines in the 2D image.

According to an embodiment of the present invention, the method further comprises projecting the coded light pattern at an angle in relation to the epipolar lines, in accordance with the parameters of a $\sin^{-1}$ (P/YC) equation.

According to an embodiment of the present invention, extracting the reflected feature types according to the unique bi-dimensional formations comprises determining:
a) elements that comprise said reflected feature types; and
b) epipolar distances between said elements of said reflected feature types.

According to another embodiment of the present invention, the method further comprises providing the elements of the reflected feature types as bi-dimensional light intensity formations on a pixel area of a sensor.

According to still another embodiment of the present invention, the method further comprises identifying the bi-dimensional light intensity formations by locating critical points of light intensity among adjacent sampled pixel values.

According to still another embodiment of the present invention, the method further comprises providing the elements as predefined values.

According to still another embodiment of the present invention, the method further comprises expressing locations of the elements as two-dimensional coordinates in the 2D image.

According to still another embodiment of the present invention, the method further comprises providing the epipolar distances between the elements as one or more of the following:
a) constant distances; and
b) varying distances.

According to still another embodiment of the present invention, the method further comprises providing a spectral encoding within the unique bi-dimensional formation.

According to still another embodiment of the present invention, the method further comprises capturing the 2D image at each of successive time frames.

According to a further embodiment of the present invention, the method further comprises determining, for each of the 2D images, corresponding 3D spatial coordinates of the objects by means of the locations of the reflected feature types on the respective epipolar lines for each of the 2D images.

According to still a further embodiment of the present invention, the method further comprises forming a video stream providing 3D motion capture by means of the 3D spatial coordinates.

According to still a further embodiment of the present invention, the method further comprises computing the 3D spatial coordinates substantially in real-time to provide a substantially real-time video stream of the 3D motion capture.

According to still a further embodiment of the present invention, the method further comprises generating the bi-dimensional coded light pattern by superimposing a plurality of values on a predefined pattern, said values derived from one or more of the following:
  a) Debruijn sequences;
  b) Perfect Maps;
  c) M-Arrays; and
  d) Pseudo-random codes.

According to an embodiment of the present invention, an apparatus configured to obtain data from a 2D image in order to determine the 3D shape of objects appearing in said 2D image, said 2D image having distinguishable epipolar lines may comprise:
  a predefined set of types of features, giving rise to feature types, each feature type being distinguishable according to a unique bi-dimensional formation;
  a coded light pattern comprising multiple appearances of said feature types;
  a projector configured to project said coded light pattern on said objects such that the distance between epipolar lines associated with substantially identical features is less than the distance between corresponding locations of two neighboring features;
  an imaging device configured to capture a 2D image of said objects having said projected coded light pattern projected thereupon, said 2D image comprising reflected said feature types; and
  an image processing device configured to extract:
    a) said reflected feature types according to the unique bi-dimensional formations; and
    b) locations of said reflected feature types on respective said epipolar lines in said 2D image.

According to an embodiment of the present invention, the locations on the respective epipolar lines of the reflected feature types determine corresponding 3D spatial coordinates of the objects.

According to another embodiment of the present invention, the projector is further configured such that the projecting of the coded light pattern is at an angle in relation to the epipolar lines in accordance with the parameters of a $Sin^{-1}$ (P/YC) equation.

According to still another embodiment of the present invention, the apparatus is further configured to move in three-dimensions in relation to the objects during the imaging of said objects.

According to still another embodiment of the present invention, the apparatus is further configured to capture the images of the objects that are moving in three dimensions in relation to said apparatus.

According to still another embodiment of the present invention, a method of obtaining data from a 2D video sequence, comprising two or more frames, each frame being a 2D image, in order to determine the 3D shape of moving objects appearing in said 2D video sequence, each frame having distinguishable epipolar lines may comprise:
  providing a bi-dimensional coded light pattern having a plurality of types of features, giving rise to feature types, each feature type being distinguishable according to a unique bi-dimensional formation,
  projecting said coded light pattern on said moving objects such that the distance between epipolar lines associated with substantially identical features is less than the distance between corresponding locations of two neighboring features;
  capturing said 2D video sequence having said moving objects having said projected coded light pattern projected thereupon, said 2D video sequence comprising reflected said feature types, and extracting:
    a) said reflected feature types according to the unique bi-dimensional formations; and
    b) locations of said feature types on respective said epipolar lines.

According to another embodiment of the present invention, an apparatus configured to obtain data from 2D video sequence, comprising two or more frames, each frame being a 2D image, in order to determine the 3D shape of moving objects appearing in said 2D video sequence, each frame having distinguishable epipolar lines may comprise:
  a bi-dimensional coded light pattern having a plurality of types of features, giving rise to feature types, each feature type being distinguishable according to a unique bi-dimensional formation;
  a projector configured to project said coded light pattern on said moving objects such that the distance between epipolar lines associated with substantially identical features is less than the distance between corresponding locations of two neighboring features;
  an imaging device configured to capture said 2D video sequence having said moving object having said projected coded light pattern projected thereupon, said 2D video sequence comprising reflected feature types; and
  an image processing device configured to extract:
    a) said reflected feature types according to the unique bi-dimensional formations; and
    b) locations of said reflected feature types on respective said epipolar lines.

According to still another embodiment of the present invention, a method of obtaining distance data from a scene comprising one or more objects may comprise:
  projecting a bi-dimensional coded light pattern having a plurality of feature types onto said scene such that each feature of said light pattern is reflected from a different respective reflection location in said scene, giving rise to a reflected feature, said feature types being distinguishable according to a unique bi-dimensional formation, said projecting performed such that the distance between epipolar lines associated with substantially identical features is less than the distance between corresponding locations of two neighboring features;
  capturing a 2D image of said scene comprising the reflected features;
  determining for each said reflected feature appearing in said 2D image:
    a) a respective feature type according to said unique bi-dimensional formation; and
    b) a location of said each reflected feature on the respective epipolar line; and
  deriving for said each reflected feature, in accordance with the respective determined feature type and with the respective determined location on said respective epipolar line, a respective distance of a respective associated reflection location.

According to an embodiment of the present invention, the method further comprises providing a 3D geometric shape of the one or more objects by a compilation of the respective distances.

According to another embodiment of the present invention, determining of the respective feature type and the respective epipolar line comprises effecting a correspondence between the respective determined feature type in the 2D image and the location of the same feature type in a projected pattern.

According to an embodiment of the present invention, a system configured to obtain scene data from a target scene may comprise:

a pattern-projecting apparatus operative to project a bi-dimensional coded light pattern having a plurality of feature types onto said scene such that each feature reflects from a respective reflection location, giving rise to a reflected feature, said feature types being distinguishable according to a unique bi-dimensional formation, wherein said coded light pattern are projected such that the distance between epipolar lines associated with substantially identical features is less than the distance between corresponding locations of two neighboring features;

an image capture apparatus operative to capture a 2D image of said scene comprising the reflected features; and an image processing element operative, for each said reflected feature of said 2D image, to:
  i) determine, for said each reflected feature:
     A. a feature type according to said unique bi-dimensional formation; and
     B. a location of said each reflected feature on the respective epipolar line; and
  ii) derive, for each said reflected feature, in accordance with the respective determined feature type and with the respective determined location on the respective epipolar line, a respective distance of a respective associated reflection location.

According to still another embodiment of the present invention, a method of determining the 3D shape of imaged objects appearing in at least two obtained 2D images, said obtained images related to each other by defined epipolar fields may comprise:

providing a bi-dimensional coded light pattern having a plurality of types of features, giving rise to feature types, each feature type being distinguishable according to a unique bi-dimensional formation;

projecting said coded light pattern on said imaged objects such that the distance between epipolar lines associated with substantially identical features is less than the distance between corresponding locations of two neighboring features;

capturing a first 2D image of said imaged objects;

capturing a second 2D image of said imaged objects;

selecting a pixel area PX1 of said first 2D image, the content appearing on PX1 being constrained to appear on a specific epipolar line EPm in said second 2D image;

finding said content of said pixel area PX1 in said second 2D image along said epipolar line EPm; and determining locations of appearances of said content of said pixel area PX1 between said first and second 2D images.

According to still another embodiment of the present invention, a method of determining the 3D shape of imaged objects appearing in at least two obtained 2D images, said obtained images related to each other by defined epipolar fields, each epipolar field comprising one or more epipolar lines may comprise:

providing a bi-dimensional coded light pattern having a plurality of types of features, giving rise to feature types, each feature type being distinguishable according to a unique bi-dimensional formation;

projecting said coded light pattern on said imaged objects at an angle in relation to at least one of said epipolar fields, said angle being in accordance with a determined limiting distance between distinguishable epipolar lines;

capturing a first 2D image of said imaged objects;

capturing a second 2D image of said imaged objects;

selecting a pixel area PX1 of said first 2D image, the content appearing on PX1 being constrained to appear on a specific epipolar line EPm in said second 2D image;

finding said content of said pixel area PX1 in said second 2D image along said epipolar line EPm; and determining locations of appearances of said content of said pixel area PX1 between said first and second 2D images.

According to an embodiment of the present invention, the method further comprises determining corresponding 3D spatial coordinates of the imaged objects by means of the locations of the appearances of the content of the pixel area PX1.

According to an embodiment of the present invention, the method further comprises extracting for each of said 2D images, independently, reflected feature types, said feature types being reflected from the imaged objects, according to the unique bi-dimensional formations and the feature type locations on the respective epipolar lines.

According to still another embodiment of the present invention, an apparatus configured to determine the 3D shape of imaged objects appearing in two or more obtained 2D images, said two or more 2D images being obtained from at least two imaging devices, said two or more 2D images being related to each other by defined epipolar fields may comprise:

a bi-dimensional coded light pattern having a plurality of types of features, giving rise to feature types, each feature type being distinguishable according to a unique bi-dimensional formation;

a projector configured to project said coded light pattern on said imaged objects such that the distance between epipolar lines associated with substantially identical features is less than the distance between corresponding locations of two neighboring features;

a first imaging device configured to capture a first 2D image of said imaged objects;

a second imaging device configured to capture a second 2D image of said imaged objects;

an image processing configured to:
  a) select a pixel area PX1 of said first 2D image, the content appearing on said pixel area PX1 being constrained to appear on a specific epipolar line EPm in the second 2D image;
  b) find said content of said pixel area PX1 in said second 2D image along said epipolar line EPm; and
  c) determine locations of appearances of said content of said pixel area PX1 between said first and second 2D images.

According to an embodiment of the present invention, the locations of the appearances of the content of the pixel area PX1 determine corresponding 3D spatial coordinates of the imaged objects.

According to another embodiment of the present invention, the image processing device is further configured to extract in each image, independently, the reflected feature types, said feature types being reflected from the imaged objects, according to the unique bi-dimensional formations and the feature type locations on the respective epipolar lines.

According to still another embodiment of the present invention, a method of obtaining data from a 2D image in order to determine the 3D shape of objects appearing in said 2D image, said 2D image having distinguishable epipolar lines may comprise:
providing a bi-dimensional coded light pattern having a plurality of feature types, each of said feature types being distinguishable according to a unique bi-dimensional formation;
providing the inverse of said bi-dimensional coded light pattern, giving rise to an inverse coded light pattern;
projecting said coded light pattern and said inverse coded light pattern on said objects;
capturing:
   i) a first 2D image of said objects, having said projected coded light pattern projected thereupon, said first 2D image comprising reflected said feature types; and
   ii) a second 2D image of said objects, having said inverse coded light pattern projected thereupon, said second 2D image comprising reflected said feature types;
obtaining a resultant image from the subtraction of said second 2D image from said first 2D image; and
extracting said reflected feature types according to the unique bi-dimensional formations and the feature type locations on respective epipolar lines in said resultant image.

According to an embodiment of the present invention, the method further comprises projecting the light patterns by one or more of the following:
a) temporally;
b) with differing spectral values of light; and
c) with differing polarization.

According to another embodiment of the present invention, the method further comprises capturing the first 2D image and second 2D images temporally, giving rise to temporal imaging.

According to still another embodiment of the present invention, the method further comprises carrying out the temporal imaging over non-uniform time intervals.

According to still another embodiment of the present invention, the method further comprises capturing the first and second 2D images simultaneously by using spectral differentiation.

According to a further embodiment of the present invention, the method further comprises carrying out the extraction of the feature types in the resultant image by determining intensity values of sample points.

According to still another embodiment of the present invention, an apparatus configured to obtain data from a 2D image in order to determine the 3D shape of objects appearing in said 2D image, said 2D image having distinguishable epipolar lines may comprise:
a predefined set of feature types, each feature type being distinguishable according to a unique bi-dimensional formation;
a bi-dimensional coded light pattern comprising multiple appearances of the feature types;
an inverse bi-dimensional coded light pattern comprising multiple appearances of the inversed feature types;
a projector configured to project said bi-dimensional coded light pattern and said inverse bi-dimensional light pattern on said objects;
a first imaging device configured to capture a first 2D image of said objects, having said projected coded light pattern projected thereupon, said first 2D image comprising reflections of said feature types;
a second imaging device configured to capture a second 2D image of said objects, having said inverse coded light pattern projected thereupon, said second 2D image comprising reflections of said feature types; and
an image processing device configured to:
   i) obtain a resultant image from the subtraction of said second 2D image from said first 2D image; and
   ii) extract said reflected feature types according to the unique bi-dimensional formations and the feature type locations on respective said epipolar lines in said resultant image.

According to a further embodiment of the present invention, a method of obtaining texture data from two 2D images, each of said images containing a reflected code used to obtain depth data of imaged objects independently for each image may comprise:
providing a bi-dimensional coded light pattern having a plurality of feature types, each feature type being distinguishable according to a unique bi-dimensional formation, providing the inverse of said bi-dimensional coded light pattern, giving rise to an inverse coded light pattern;
projecting said coded light pattern and said inverse coded light pattern on said objects;
capturing:
   i) a first 2D image of said objects, having said projected coded light pattern projected thereupon, said first 2D image comprising reflected said feature types,
   ii) a second 2D image of said objects, having said inverse coded light pattern projected thereupon, said second 2D image comprising reflected said feature types, obtaining a resultant image from the addition of said second 2D image with said first 2D image, said resultant image providing texture information of said imaged objects.

According to still a further embodiment of the present invention, a method of obtaining data from a 2D image in order to determine the 3D shape of objects appearing in said 2D image, said 2D image having distinguishable epipolar lines may comprise:
providing a bi-dimensional coded light pattern having a plurality of feature types, each feature type being distinguishable according to a unique bi-dimensional formation;
providing the inverse of said bi-dimensional coded light pattern, giving rise to an inverse coded light pattern;
projecting said coded light pattern and said inverse coded light pattern on said objects;
capturing:
   i) a first 2D image of said objects, having said projected coded light pattern projected thereupon, said first 2D image comprising reflected said feature types; and
   ii) a second 2D image of said objects, having said inverse coded light pattern projected thereupon, said second 2D image comprising reflected said feature types;
obtaining a resultant image from the absolute value of the subtraction of said second 2D image from said first 2D image, said resultant image comprising outlines of said reflected feature types; and
extracting said outlines and outline locations on respective said epipolar lines in said resultant image.

According to an embodiment of the present invention, the method further comprises determining corresponding 3D spatial coordinates of the objects by means of the outline locations on the respective epipolar lines.

According to still a further embodiment of the present invention, a method of obtaining data from a 2D image in order to determine the 3D shape of objects appearing in said 2D image, said 2D image having distinguishable epipolar lines may comprise:

providing a first bi-dimensional coded light pattern having a plurality of feature types, each feature type being distinguishable according to a unique bi-dimensional formation and each feature type comprising a plurality of elements having varying light intensity, wherein said plurality of elements comprises non-maximum and non-minimum elements and comprises one or more of the following:
  a) at least one maximum element;
  b) at least one minimum element; and
  c) at least one saddle element;

providing a second bi-dimensional coded light pattern comprising said first bi-dimensional coded light pattern having the one or more maximum and/or minimum inverted elements;

projecting said first bi-dimensional coded light pattern and said second bi-dimensional coded light pattern on said objects;

capturing:
  i) a first 2D image of said objects, having said first projected bi-dimensional coded light pattern projected thereupon, said first 2D image comprising reflected said feature types; and
  ii) a second 2D image of said objects, having said second bi-dimensional coded light pattern projected thereupon, said second 2D image comprising reflected said feature types;

obtaining a resultant image from the subtraction of said second 2D image from said first 2D image; and extracting from said resultant image one or more of the following: at least one maximum element, at least one minimum element and at least one saddle element, and extracting their locations respective to said epipolar lines in said resultant image.

According to an embodiment of the present invention, the method further comprises determining the corresponding feature types by determining their locations and/or by determining values of the one or more of the following: at least one maximum element, at least one minimum element, at least one non-maximum element, at least one non-minimum element and at least one saddle element.

According to another embodiment of the present invention, the method further comprises determining corresponding 3D spatial coordinates of the objects by determining locations of the one or more of the following: at least one maximum element, at least one minimum element, and at least one saddle element and/or by determining locations of the non-maximum and non-minimum elements on the respective epipolar lines.

According to still a further embodiment of the present invention, a method of obtaining data from a 2D image in order to determine the 3D shape of objects appearing in said 2D image, said 2D image having distinguishable epipolar lines may comprise:

providing a first bi-dimensional coded light pattern having a plurality of feature types, each feature type being distinguishable according to a unique bi-dimensional formation and each feature type comprising a plurality of elements having varying light intensity, wherein said plurality of elements comprising non-maximum and non-minimum elements comprising one or more of the following:
  a) at least one maximum element;
  b) at least one minimum element; and
  c) at least one saddle element;

providing a second bi-dimensional coded light pattern comprising said first bi-dimensional coded light pattern having the one or more maximum and/or minimum inverted elements;

projecting said first bi-dimensional coded light pattern and said second bi-dimensional coded light pattern on said objects;

capturing:
  i) a first 2D image of said objects, having said first projected coded light pattern projected thereupon, said first 2D image comprising reflected said feature types; and
  ii) a second 2D image of said objects, having said second coded light pattern projected thereupon, said second 2D image comprising reflected said feature types;

obtaining a resultant image from the addition of said second 2D image with said first 2D image; and extracting, from said resultant image, one or more of said non-maximum and non-minimum elements and locations of said non-maximum and non-minimum elements on one or more respective epipolar lines in said resultant image.

According to still a further embodiment of the present invention, a method of obtaining data from a 2D image in order to determine the 3D shape of objects appearing in said 2D image, said 2D image having distinguishable epipolar lines may comprise:

providing a first bi-dimensional coded light pattern having a plurality of feature types, each feature type being distinguishable according to a unique bi-dimensional formation and each feature type comprising a plurality of elements having varying light intensity, wherein said plurality of elements comprises non-maximum and non-minimum elements and comprises one or more of the following:
  a) at least one maximum element;
  b) at least one minimum element; and
  c) at least one saddle element;

providing a second bi-dimensional coded light pattern comprising said first bi-dimensional coded light pattern having the one or more maximum and/or minimum inverted elements;

projecting said first bi-dimensional coded light pattern and said second bi-dimensional coded light pattern on said objects;

capturing:
  i) a first 2D image of said objects, having said first projected bi-dimensional coded light pattern projected thereupon, said first 2D image comprising reflected said feature types; and
  ii) a second 2D image of said objects, having said second bi-dimensional coded light pattern projected thereupon, said second 2D image comprising reflected said feature types;

obtaining a resultant image from the absolute value of the subtraction of said second 2D image from said first 2D image, said resultant image comprising borderlines of said reflected feature types; and extracting said borderlines and borderline locations on respective said epipolar lines in said resultant image.

According to an embodiment of the present invention, the method further comprises determining corresponding 3D spatial coordinates of the objects by means of the borderline locations on the respective epipolar lines.

According to still a further embodiment of the present invention, a method of obtaining data from a 2D image in order to determine the 3D shape of objects appearing in said 2D image, said 2D image having distinguishable epipolar lines may comprise:

providing a first bi-dimensional coded light pattern having a plurality of feature types, each feature type being distinguishable according to a unique bi-dimensional formation;

providing a second bi-dimensional coded light pattern, different from said first pattern, having a plurality of feature types, each feature type being distinguishable according to a unique bi-dimensional formation;

projecting said first coded light pattern and said second coded light pattern on said objects; capturing:

i) a first 2D image of said objects having said first projected coded light pattern projected thereupon, said first 2D image comprising reflected said feature types; and

[0224] ii) a second 2D image of said objects having said second coded light pattern projected thereupon, said second 2D image comprising reflected said feature types;

extracting, in each image independently, said reflected feature types according to the unique bi-dimensional formations and the feature type locations on respective epipolar lines; and comparing regions of epipolar lines in said second 2D image to similar regions along same epipolar lines in said first 2D image to verify feature identities in said first 2D image.

According to still a further embodiment of the present invention, a method of obtaining data from a 2D image in order to determine the 3D shape of objects appearing in said 2D image, said 2D image having distinguishable epipolar lines may comprise:

providing a bi-dimensional coded light pattern having a plurality of feature types, each feature type being distinguishable according to a unique bi-dimensional formation;

projecting said bi-dimensional coded light pattern on said objects;

capturing:

i) a first 2D image of said objects, having said projected coded light pattern projected thereupon, said first 2D image comprising reflections of said feature types; and ii) a second 2D image of said objects, having ambient light projected thereupon;

obtaining a resultant image from the subtraction of said second 2D image from said first 2D image; and extracting said reflected feature types and locations of said reflected feature types on respective said epipolar lines in said resultant image.

According to still a further embodiment of the present invention, a method of obtaining data from a 2D image in order to determine the 3D shape of objects appearing in said 2D image, said 2D image having distinguishable epipolar lines may comprise:

providing a bi-dimensional coded light pattern having a plurality of feature types, each feature type being distinguishable according to a unique bi-dimensional formation;

projecting said coded light pattern on said objects;

capturing:

i) a first 2D image of said objects, having said projected coded light pattern projected thereupon, said first 2D image comprising reflected said feature types; and ii) a second 2D image of said objects, having uniform light projected thereupon;

obtaining a resultant image from the division of said first 2D image by said second 2D image; and extracting said reflected feature types and the locations of said reflected feature types on respective epipolar lines in said resultant image.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing, or completing, certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected stages of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A-1G are simplified diagrams illustrating one embodiment of the present invention showing how bi-dimensional light pattern imaging is used together with the principles of epipolar geometry.

FIG. 2 is a simplified flow chart showing the steps in the process of three dimensional image and/or motion-image capture of the present embodiments.

FIG. 3 illustrates an exemplary spatially-periodic 2D pattern P1 projected to obtain epipolar separation and corresponding image 'P1 of the reflected pattern.

FIG. 6A is a simplified schematic representation of a reflected pattern after being projected in accordance with the epipolar separation principle.

FIG. 6B again shows a simplified schematic representation of a reflected pattern, but now includes multiple appearances of the same feature on a given epipolar line in the image.

FIG. 7 is a simplified illustration of a captured image of a preferred light pattern projected in accordance with a particular embodiment of the present invention.

FIG. 8 is a simplified schematic representation of a pattern now projected at a smaller rotation angle with respect to the direction of the epipolar field.

FIG. 13A illustrates a preferred projection and imaging method using pattern P1 that enable epipolar separation techniques.

FIG. 13B1 illustrates a preferred pattern P2 that provides an increased number of sample points.

FIG. 13B2 illustrate the construction process and the encoding scheme inherent in pattern P2.

DESCRIPTION OF THE PREFERRED EMBODIMENTS

Figure 1B:
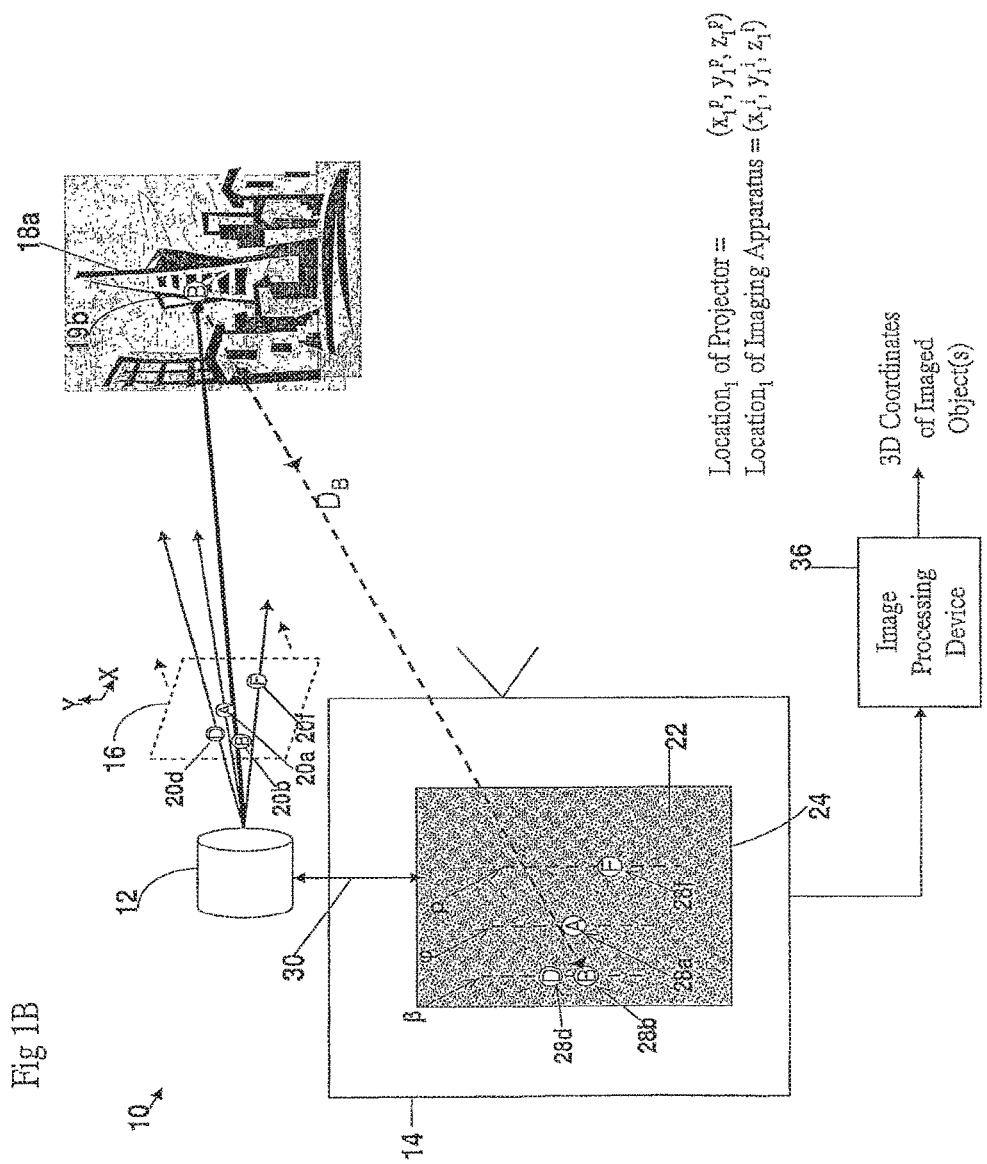
Figure 1D:
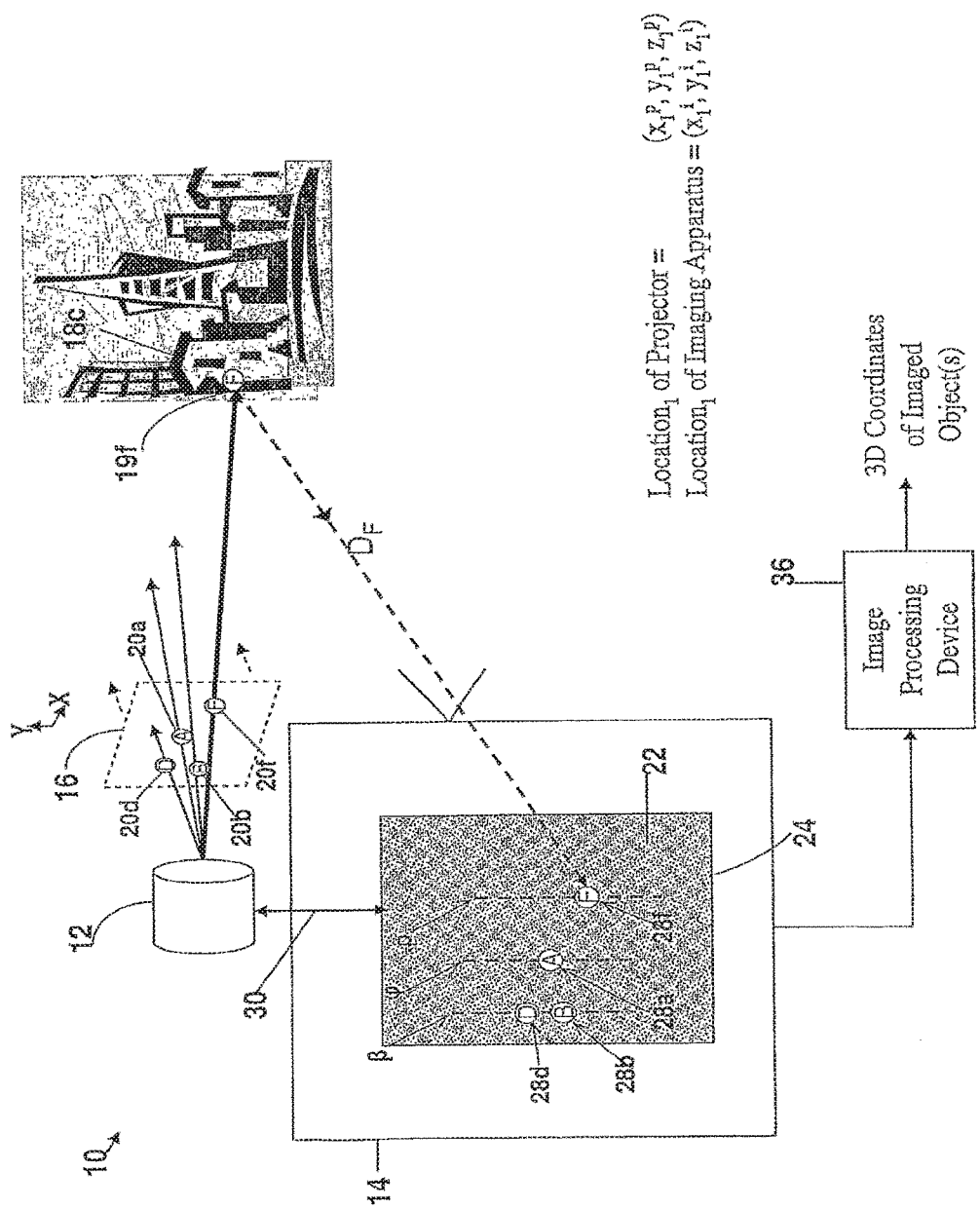

The present embodiments provide an apparatus and a method for three dimensional imaging of static and moving objects. In particular, it is possible to determine three-dimensional spatial shape data of a given object(s) by (a) projecting an encoded bi-dimensional light pattern on the object(s); and (b) analyzing a 2D image of the reflected bi-dimensional light pattern utilizing the optical constraints and principles associated with epipolar geometry and triangulation.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIGS. 1A-1G: Determining a 3D Depth Map of an Object or Objects

Reference is now made to FIG. 1A-1D, which are simplified diagrams illustrating one embodiment of the present invention. In the particular example of FIGS. 1A-1D, system 10 comprises projector 12 and imaging apparatus 14 found at respective locations ($x_1^P$, $y_1^P$, $z_1^P$) and ($x_1^i$, $z_1^i$). An encoded bi-dimensional light pattern 16, comprising a predefined array of a finite set of identifiable feature types, is projected by the projector 12 onto surfaces in a scene containing imaged objects 18a, 18b, and 18c. Exemplary features in the projected pattern are denoted as 20a, 20b, 20d, and 20f. In this particular example, the projected pattern takes the form of an array of monochromatic light beams of varying intensity, wherein combinations of adjacent light beams comprise encoded features or letters having bi-dimensional spatial formations. These features intersect the imaged objects' surfaces at various reflection points 19a, 19b, 19d, and 19f and are then observed in 2D image 22 and captured on sensor 24 of imaging apparatus 14. The projected features 20a, 20b, 20d, and 20f thus appear as reflected features 28a, 28b, 28d, and 28f in the captured image 22. Imaging apparatus 14 may be, for example, a CCD or CMOS digital video camera, or any other type of array of photo-detector elements.

The relative position 30 between projector 12 and sensor 24 is fixed, thus imparting a geometric constraint to system 10. This constraint restricts the location of any given reflected feature 28a, 28b, 28d, and 28f in the captured image 22 to a unique set of points in the image called an epipolar line. Epipolar lines β, φ, and ρ are shown in the figure. That is to say, for a system 10 with a given light pattern and fixed relative position between projector and sensor, for any object or group of objects upon which the pattern is projected, each feature of the projected pattern is always observed on a particular, singular epipolar line in the captured image 22. Moreover, as will be explained below, the above holds true whether the imaged objects are fixed or in relative motion to the projector/imaging apparatus. The relationship between each feature in the pattern and a constant epipolar line is thus irrespective of the reflection point in 3D space from which the feature is reflected.

The reflection points of the exemplary projected features are denoted as 19a, 19b, 19d, and 19f and have associated respective reflection distances DA, DB, DD, and DF. The reflection distance is the distance from the sensor 24 of the imaging apparatus to the reflection point location in 3D space on the imaged object 18a, 18b, 18c upon which a given feature is reflected. Reflection distance is sometimes referred to as depth.

Thus, as illustrated in FIGS. 1A-1D, each reflected feature 28a, 28b, 28d, and 28f found in image 22 is constrained to a respective specific epipolar line, independent of the point in space from which the feature was reflected. Feature 28a is thus constrained to epipolar line φ, and independent of the 3D location of 19a, or alternatively independent of reflection distance $D_A$. Features 28b and 28d are two reflected features from the pattern that share the same epipolar line β. Features 28b and 28d are always found on this epipolar line irrespective of reflection distances $D_B$ and $D_D$. Similarly, feature 28f is always reflected onto epipolar line ρ, independent of the reflection distance DF.

However, the reflection distance, or alternatively the point in 3D space from which the feature is reflected, does indeed determine where along that epipolar line the feature appears. Thus, the reflection distance does not affect the particular epipolar line upon which a given reflected feature appears, but rather only the precise location along that line.

To illustrate the change in position of a feature along the epipolar line as a function of reflection distance, we now turn to FIGS. 1E-1G. In each of FIGS. 1E, 1F, and 1G, the projector and imaging apparatus, although always at a fixed relative distance to one another, move in relation to the object 18a. In FIG. 1E, projector 12 and imaging apparatus 14 are at locations $(x_1^P, y_1^P, z_1^P)$ and $(x_1^i, y_1^i, z_1^i)$ respectively. The reflection distance of reflected feature 28a (projected feature 20a) on epipolar line φ is seen as $D_A$, after being reflected from reflection point 19a on object 18a. In FIG. 1F, the projector and imaging apparatus move to respective points in space $(x_2^P, y_2^P, z_2^P)$ and $(x_2^i, y_2^i, z_2^i)$. The reflection distance of reflected feature 28a is now $D_A'$ after being reflected from a different reflection point 19a' on object 18a. As a result, feature 28a is now reflected onto a lower part of epipolar line φ. In FIG. 1G, the projector and imaging apparatus move to a third set of respective coordinates in space $(x_3^i, y_3^i, z_3^i)$ and $(x_3^i, y_3^i, z_3^i)$. The reflection distance of reflected feature 28a is now $D_A''$ after being reflected from a still third reflection point 19a'' on object 18a. As a result, feature 28a is now reflected onto a higher part of epipolar line φ. However, no matter what the reflection distance, reflected feature 28a (projected feature 20a) must always appear on epipolar line φ and only on φ. For purposes of clarity, each feature is associated with only one epipolar line in the present embodiment. It is understood that, as features comprise spatial formations of light intensities in the captured image, elements of each feature may lie on separately distinguishable epipolar lines.

It is understood that any relative motion between the system 10 and an imaged object causes the reflection distance of a particular feature to change. This relative motion may result from motion of the imaged object, from motion of the projector/imaging system, or from motion of both the imaged object and projector/imaging system. Any change in the reflection distance causes a change in the precise location of a given reflected feature along that feature's associated epipolar line. However, the particular epipolar line upon which that feature appears remains constant.

Therefore, we can conclude that the principles of epipolar geometry dictate a mapping between a set of 2D coordinates in the image and three dimensional coordinates in space that are viewed by the imaging apparatus. Again, the precise point at which a given captured feature appears along a particular epipolar line is a function of the feature's reflection distance, or alternatively stated, the point in 3D space from which the feature is reflected.

For each image, or frame, each reflected feature is identified according to feature type and the reflected feature's location is determined along the feature's associated epipolar line in the image, preferably by an image processing device 36. The precise position of an identified feature along the feature's epipolar line is then corresponded to that feature's position in the original projected pattern. This correspondence of features between the image and projected pattern allows for triangulation based computations to determine the 3D spatial coordinate from which the feature was reflected. Pre-computed triangulation tables may be utilized to determine the three dimensional spatial location of the point on the object from which the feature is reflected. In some embodiments, these triangulation based calculations are carried out by the image processing device 36.

This process may be repeated for a plurality of features of the 2D image, where each feature is reflected off of a different respective location on the surface of the 3D imaged object(s). For any given image frame, each such identified feature in the captured 2D image leads to a three dimensional spatial location; the compilation of all such spatial locations comprising a point cloud of locations in 3D space. This 3D point cloud gives a three dimensional mapping of the imaged object(s). Further processing of the point cloud may yield a 3D mesh, which essentially fuses the points of the 3D cloud into 3D surfaces. This mesh may also be given graphics texture based on additional texture capture of the objects in the scene. For 3D mapping of objects in motion, the above process described for a single image is carried out over a series of images leading to 3D video.

FIG. 2: Simplified Flow Chart of 3D Image Capture

Reference is made to FIG. 2, which is a simplified flow chart showing the steps in the process of three dimensional image and/or motion-image capture of the present embodiments. Each step of the flow chart is discussed in further detail in the following figures. The flow chart, together with diagrams 1A-1G, gives the reader a simplified and overall intuitive understanding of the three dimensional imaging process described herein.

Step 70 is the provision of a predefined coded light pattern. This coded light pattern, as exemplified in FIGS. 1A-1D and denoted there as 16, is an array of a finite set of feature types in the form of spatial formations of varying intensity light beams. Preferred embodiments of patterns and their characteristics are presented in the figures and discussed below. Step 72 is the projection of that pattern on an object(s). Several preferred projection methods are presented in the figures and discussed below as well. In step 74, a 2D image is captured that contains features reflected off of the object(s) upon which the pattern was projected. The image is analyzed to identify features and their locations along respective epipolar lines, step 76. The locations of the features along their epipolar lines are then associated with 3D coordinates in space from which the features were reflected, step 78. This process of correlating between feature locations along epipolar lines and 3D spatial coordinates, carried out through triangulation techniques, is discussed below. For each identified feature in the 2D image, a corresponding 3D coordinate is thus derived indicating the point in space at which that feature reflected off of an imaged object. Through a compilation of all such 3D coordinates, a 3D point cloud is derived that gives a three dimensional mapping of the imaged object(s), step 80. Further processing of the point cloud may yield a 3D mesh which essentially fuses the points of the 3D cloud into 3D surfaces. This mesh may also be given graphics texture based on additional texture capture of the objects in the scene.

In the case where objects or the camera are in motion, steps 74-80 may be continuously repeated to obtain 3D motion capture. In such a case of 3D motion capture, a series of 2D captured images of the reflected light pattern off of the moving object(s) comprises frames in a video sequence. This 2D video sequence can be processed frame by frame in the manner discussed in the flow chart to derive the 3D spatial coordinates for each frame. The result is a series of point clouds, one for each frame of the video sequence, that together comprise a dynamic 3D mapping over time.

FIG. 3: Pattern Projection and Epipolar Separation

FIG. 3 provides an exemplary spatially-periodic 2D pattern P1 which may be projected onto the object. The 2D pattern includes a plurality of different feature types 20, which appear within the pattern at various locations. For clarity, in the present figure, each unique feature type is arbitrarily assigned an alphabetic character. As will be explained in further detail below in FIG. 10, each pattern feature is composed of a codified spatial formation of black and white points. Features are repeated in a cyclical fashion in the code. Specifically, identical feature types repeat themselves every other row in the vertical direction of the pattern and every sixteen columns in the horizontal direction of the pattern. The black and white points of the pattern features correspond to projections of either a high or low illumination intensity of monochromatic light on an imaged object. Each character in the code is thus a bidimensional spatial formation of projected light intensities. In the pattern of the present embodiment, P1, the formations are continuous. Other patterns having non-continuous formations may also be implemented.

After reflection off of the 3D objects, subsection 48 of the projected periodic pattern P1 generates image $I_{P1}$, containing the reflected pattern. Epipolar lines 52, 54, and 56 are shown. Thus image $I_{P1}$ is a simplified illustration of the reflected pattern being viewed through an imaging apparatus upon being reflected off of an imaged object. For simplicity, only the reflected pattern is shown and not any reflected imaged objects appearing in $I_{P1}$ as well. In this particular embodiment, the projector and imaging apparatus are positioned vertically from one another, thus causing the epipolar lines in the captured image to be in a substantially vertical direction. In another possible embodiment, the projector and imaging apparatus may be positioned horizontally from each other, in which case the epipolar lines in the captured image would be substantially horizontal.

As seen and mentioned above, any given feature type repeats itself cyclically many times in the vertical direction of the pattern, and, were the pattern to be projected without rotation, many features of the same type would be observed in the captured image on the same vertical epipolar line. However, through slight rotation of the projected pattern, features of the same type are reflected onto separate epipolar lines in image $I_{P1}$. For example, features 58 and 60, both of type (A), are now reflected onto two adjacent but distinguishably separate epipolar lines 52 and 54. As will be explained further below, the separation of all identical pattern feature types onto separate epipolar lines in the captured image, called epipolar separation herein, enables identification of each feature without ambiguity. To understand why this is so, a brief discussion of system calibration follows to understand the relationship between features in the original projected pattern and epipolar lines in the captured image.

As explained above, given a particular pattern such as that described in the current embodiment, and assuming the geometric constraint of a fixed relative position between the projector and imaging apparatus, any given pattern feature appears on a constant pre-determined epipolar line in an image containing the reflected pattern. This pre-determined relationship between each feature in the projected pattern and an associated epipolar line in an image of the reflected pattern may be determined in many ways, including brute force. The process of determining this relationship may be referred to as the epipolar field calibration process, and is carried out a single time for a given pattern and given configuration of the imaging device and projector. The result of such a mapping is an epipolar-field table as seen below.

| Feature Type and Location in Pattern | Epipolar Line In Captured Iinage |
|---|---|
| $(A_1)$ at $X_1, Y_1$ | $E_1$ |
| $(A_2)$ at $X_2, Y_2$ | $E_2$ |
| ... | ... |
| $(A_N)$ at $X_3, Y_3$ | $E_N$ |
| $(B_1)$ at $X_4, Y_4$ | $E_1$ |
| $(B_2)$ at $X_5, Y_5$ | $E_2$ |
| ... | ... |
| $(B_M)$ at $X_6, Y_6$ | $E_N$ ... |

As seen from the table, each occurrence of a feature type in the pattern is associated with a different epipolar line: $(A_1)$ with $E_1$, $(A_2)$ with $E_2$, and so on for as many (A) type appearances in the projected pattern that appear in the image. Of course features of different types, such as $(A_1)$ and $(B_1)$, can fall on the same epipolar line, such as $E_1$. Thus, all epipolar line locations and the specific features in the original pattern that fall on these epipolar lines are known from the calibration process.

As mentioned, any given image containing the reflected pattern, contains feature types of a set of a certain size. In the pattern of the current embodiment this set contains 32 types. The decoding engine used to decode the captured image decodes each feature according to feature type and location coordinate in the image, including epipolar line. This decoded image feature is then corresponded with a particular feature in the original projected pattern. For instance, if a feature type (A) is found on epipolar line $E_2$, then from the epipolar field calibration table we know that this image feature uniquely corresponds to feature $(A_2)$ in the original pattern, and not any other feature in the pattern. Again, were the cyclical pattern to be projected without rotation, many features of the same type would be observed in the captured image on the same epipolar line. Since reflected features are identified based on feature type, there would be no way of corresponding on a one-to-one basis between identical image feature types and their corresponding features in the original pattern. In other words, there would be no indication of which identified (A) feature type in the image corresponds to which (A) type feature in the projected pattern.

By limiting each feature type to a singular appearance on a particular epipolar line in the captured image, however, the association of that particular image feature and the feature's appearance in the pattern can be made. Therefore each epipolar line has at most one feature of a given feature type. So each (A) type feature in the pattern P1 falls on a different epipolar line in the image, each (B) type feature falls on an independent epipolar line, and so on for all pattern features. Similarly, each epipolar line preferably has multiple features so long as they are of distinguishable types. For instance, with reference to FIGS. 1A-1D, it is noted that features 28b and 28d are both found on the same epipolar line β, yet may be compared to respective pattern appearances since they are of different, distinguishable feature types.

The unambiguous matching between a particular image feature and that feature's appearance in the pattern leads to a correct triangulation that determines a precise 3D location in space from which the feature is reflected.

It is appreciated that the present embodiments utilize a rectified imaging system, meaning that the plane of the imaging apparatus and the plane of the projector lie on the same spatial plane. As such, only a vertical or horizontal shift exists between the projector and the imaging apparatus. In such a rectified system, the epipolar lines in the captured image together comprise a unidirectional epipolar field. Since the epipolar lines in the image are thus parallel to each other, the rotation of the repeating pattern places repeating feature types onto separate epipolar lines.

So in summation, as a result of the internal structure of the code and the projection approach, each epipolar line has at most one feature of a given feature type. Again, although the pattern is cyclical and therefore feature types appear many times in the pattern, the above described placement of same feature types onto separate epipolar lines means there is no confusion between multiple appearances of that feature type in the image. For each image in a stream of images, the location of each feature determines a new set of 3D spatial coordinates that provide a 3D map of the currently imaged object location.

With reference to FIGS. 1A-1G, image processing device 36 preferably contains at least the image processing engine used to identify (1) features and their associated epipolar lines in the captured 2D image and (2) feature locations upon their epipolar lines. The image processing device typically also has a database containing the coordinates for all features in the projected pattern. The processing device matches each identified feature in the image to that feature's corresponding feature in the pattern. Triangulation-based computations then are used to assign three dimensional coordinates in space to each identified feature to derive a 3D point cloud of the imaged object. These triangulations-based computations are preferably stored in a table in memory to aid in fast processing of 3D spatial coordinates. Further processing of the point cloud may be optionally desired. Such processing may include determining a 3D surface or mesh from the 3D point cloud for a richer, life-like 3D image/ video. Texture data may be added as well. Such processing of the point cloud may utilize known processing engines for three dimensional point cloud processing.

As such, through novel techniques described herein combining the above principles of epipolar geometry together with structured light projection and encoding/decoding schemes, the present embodiments provide for high resolution, high accuracy 3D imaging, such as that prescribed for HDTV, 4CIF, mega-pixel imaging and similar applications. In preferred embodiments, for short distances, accuracy is obtained of less than one millimeter. That is to say, the triangulation error is +−1 millimeter.

As stated, this system and method may be preferably implemented even where the object(s) is (are) in motion, as preferred embodiments of the invention utilize the projection of a single coded pattern. At each time interval determined by the imaging apparatus, only a single projection of the encoded light pattern is needed to capture surface points of objects, thus enabling successive images to capture changing surface points of objects in motion. That is to say, objects in the scene and/or the camera and projector system may move in a three dimensional space relative to each other, thus enabling the dynamic depth capture of three dimensional objects in motion. As the object moves, the three dimensional coordinates of the object in a Euclidian space dynamically change Thus, depth change over a series of captured images is reflected in the movement or displacement of features along their respective epipolar lines for each captured image. As a result, different point clouds are derived for each image frame.

In preferred embodiments, the imaging apparatus and the projector are typically contained in a single device housing. The projected two dimensional light pattern may be projected by any light source, including but not limited to a video projector, a slide projector in the case of a printed pattern, or laser/LED projectors. The use of single pattern projectors in preferred embodiments allows for the straightforward use of diffractive projection, which leads to low power consumption, compactness, noise filtering due to narrowband type signals and strong suitability to invisible NIR radiation applications. The imaging apparatus may be a proprietary, or off the shelf, video or still camera typically with CCD or CMOS sensor. It is further understood that the epipolar lines in a captured image may be of nonlinear shape and the linear lines in FIGS. 1A-1G and FIG. 3 are for illustration purposes only.

Figure 4:
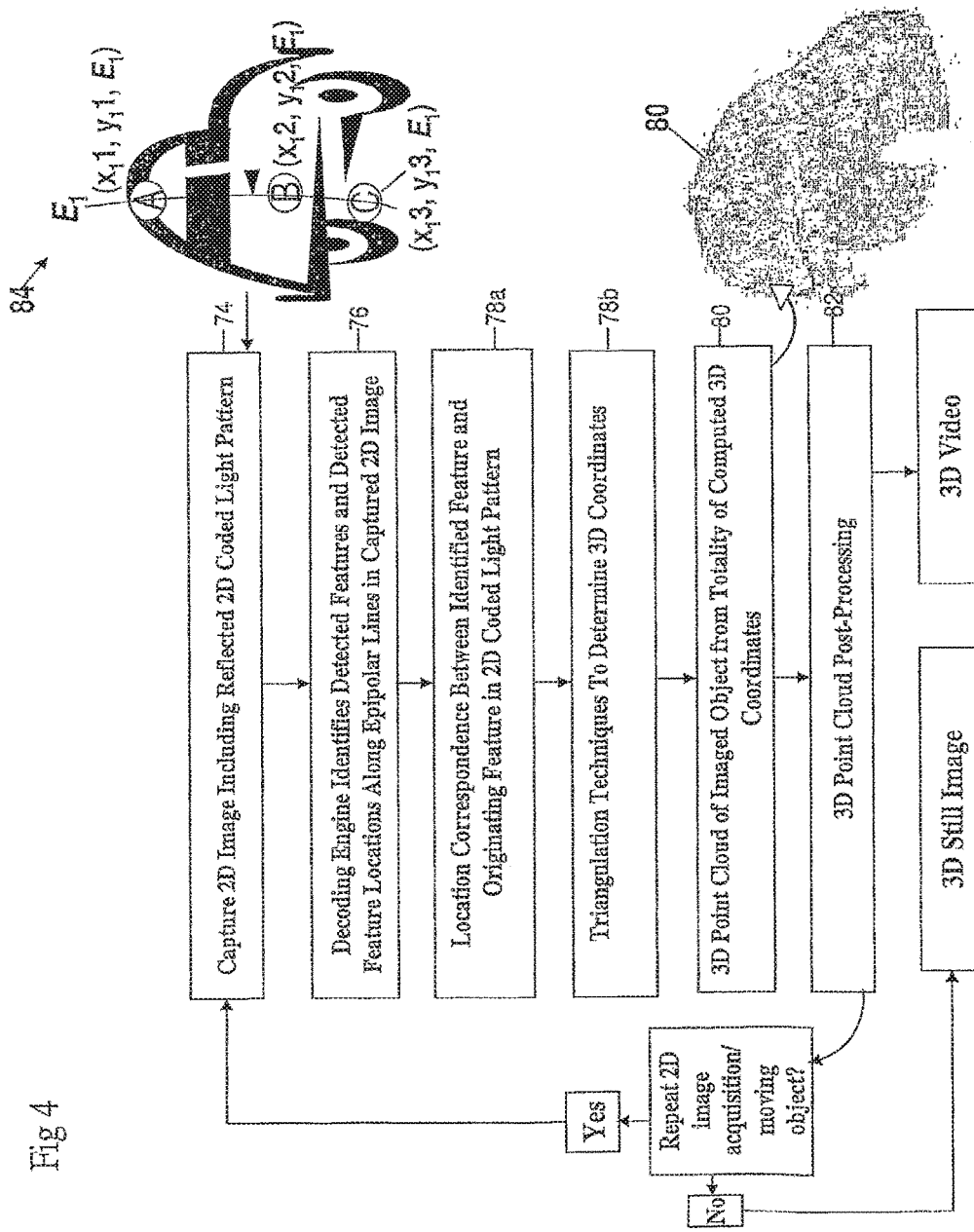
FIG. 4 is a simplified flow chart and diagram illustrating how the corresponding 3D spatial locations of identified features in the captured 2D image are derived.

Reference is made to FIG. 4, which is a simplified flow chart and diagram illustrating how the corresponding 3D spatial locations of identified features in the captured 2D image are derived. The flow chart of FIG. 4 begins from the 2D image capture stage, stage 74, also seen in FIG. 2. Three different exemplary feature types, (A), (B), and (C), share an epipolar line in the captured 2D image 84 which includes both the imaged object in 2D and the reflected pattern. The exemplary feature types in the coded pattern are projected onto an imaged object and all are subsequently observed along a single epipolar line $E_1$ in 2D image 84, seen as step 76. The next step involves corresponding between each identified feature along the epipolar line and the originating feature in the projected 2D coded light pattern (step 78a). This correspondence is used to calculate, through triangulation methods, the 3D point in space, or depth coordinate, from which the feature was reflected (step 78b). Notably, steps 78a and 78b are combined and seen as step 78 in the flow chart of FIG. 2. The sum of all such triangulated features gives rise to a 3D point cloud (step 80) of the imaged object. In preferred embodiments, the point cloud 80 is further processed to obtain texture and surface for the 3D image/video image, step 82.

Since the feature types shown are distinct, all three may be readily corresponded to respective features in the projected pattern. If there were more than a single appearance of say (B) on the epipolar line, then ambiguity would result when attempting to associate each appearance of (B) to the corresponding appearance in the projected pattern. Ambiguity as a result of multiple appearances of feature types on a single epipolar line would perforce lead to triangulation errors and false measurements of spatial locations on the imaged object. The embodiments of the present invention therefore ensure at most a singular appearance of any given feature type on an epipolar line, herein referred to as epipolar separation, to ensure a one to one matching process between an observed feature and the feature's appearance in the pattern.

Again, in the present embodiments, the imaged object may be still or in motion. If the imaged object is in motion, then the steps 74-82 are repeated to provide 3D video. Alternatively, the imaging and projector apparatus may be in motion relative to the object. In dynamic applications, triangulation equations are computed at video frame rates to give real time three dimensional coordinates of the object(s) in motion.

Furthermore, as shown in the figures and described below, as the total number of distinguishable epipolar lines in the captured image increases, the encoded light may be projected in a manner that allows for more appearances of features in the captured image. The total number of distinguishable epipolar lines may increase due to many factors, including but not limited to: feature structure or shape, a low noise level as a result of a high resolution sensor, optical characteristics of the system or more accurate coordinate detection algorithms.

Figure 5:
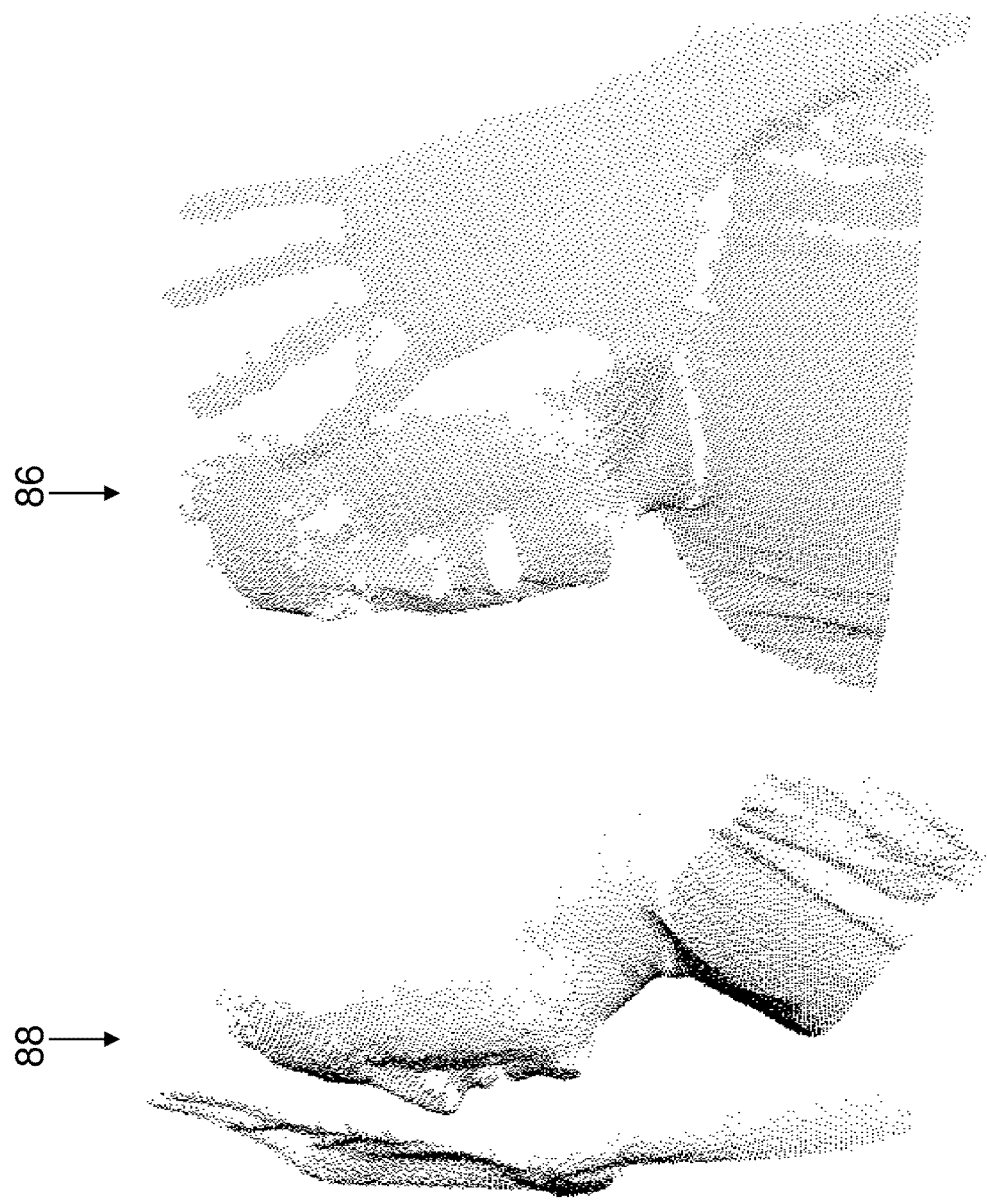
FIG. 5 shows further exemplary point clouds derived through the methods of embodiments of the present invention.

FIG. 5 shows further exemplary point clouds derived through the methods of embodiments of the present invention. Illustration 86 shows a frontal view of a point cloud of person waving. Each point in the cloud has a three dimensional (x, y, z) coordinate in space. Illustration 88 shows a side view that provides another depth perspective.

Reference is made to FIG. 6A. FIG. 6A now, showing a schematic representation 500 of the appearance in an image of a reflected spatially encoded pattern after being projected in accordance with the epipolar separation principle discussed above. That is, a light pattern is constructed and projected in such a manner that any given feature type appears at most once on any given epipolar line in the captured image.

In the present embodiment, the singular appearance of any given feature type on an epipolar line is achieved through the orientation of the projected periodic light code at a suitable tilt angle with respect to the direction of the epipolar field. The epipolar field is vertical in this example and denoted by epipolar lines 102A, 102B, and 102C. The schematic diagram 500 of the reflected light pattern shows a periodical or cyclic tiling of identical 10×2 matrices 90. Each matrix has twenty feature types A-T. The matrix pattern repeats itself over the length and width of the image.

Now, when the pattern projection is rotated at an angle specified as 94 in the figure, the periodic pattern of feature types in the image repeats itself on any given epipolar line over length $H_1$. Thus, for each distinguishable epipolar line over the imaging apparatus vertical field of view $H_1$, any feature type appears at most once. By tilting the projection angle of the pattern, the separation of same feature types onto distinguishable epipolar lines is achieved. For example, features 96, 98, and 100, which repeat in the y-direction of the pattern every other feature, are separated onto separate distinguishable epipolar lines 102A, 102B, and 102C, in the captured image. Resultantly a significant number of features can be identified over the entire image area. The total number of identified features in a captured image is referred to as image capacity or coverage.

Thus, epipolar separation of the tight periodic code allows for a large number of identifiable features to be captured in the image leading to high resolution. Furthermore, the periodic nature of the pattern allows for a coded pattern containing a small number of repeating features types, thereby enabling each feature to remain small in size and further contributing to high resolution images. As an example, on a typical sensor with 640×480 pixel resolution, each feature may have an approximate area of 10 pixels. This translates into an image capacity of approximately 31 thousand features for every frame, and thus 31 thousand 3D spatial coordinates.

In the above and current embodiments, for simplicity and clarity of explanation, width of pattern features in the 2D image is not considered. As such, each feature is associated with an epipolar line as if the feature has infinitely small size, and each feature is only distinguishable by one epipolar line. In actual practice, rather than a single epipolar line being associated with an individual feature, the spatial formations that comprise the feature lie on distinguishable, substantially adjacent epipolar lines.

Returning to the FIG. 6A, distances denoted as $D_1$ and $D_2$ are equidistant distances between distinguishable epipolar lines. The known horizontal distance between distinguishable epipolar lines is a function of the imaging apparatus and image processing device and aids in the definitive identification and verification of reflected features in the image. For example, a reflected feature type (A) 98 is detected in the captured image at a certain y coordinate along epipolar line 102B. Thus, the nearest feature type (A), if indeed captured in the obtained image, can only be found on the nearest distinguishable epipolar lines to the right and left of epipolar line 102B, namely 102A and 102C. Although all epipolar lines are precisely vertical in the figure for illustration purposes, other embodiments are possible wherein the epipolar lines may be lines or curves with varying x and/or y coordinates.

The limiting epipolar line separation factor is the minimum horizontal distance necessary to distinguish between separate epipolar lines in the captured image. The ability to differentiate between features on separate epipolar lines is based on several factors. Firstly, a feature's shape often determines whether the feature has a detectable coordinate location after reflection from an imaged object. A code having features that can be assigned coordinates with greater exactitude, allows for differentiation between features on ever closer epipolar lines. The object surface type also may have an effect, as features from metallic surfaces, glass, and other transparent or very dark surfaces, for example, are reflected with less exactitude. Low projector SNR and inferior sensor optics may limit the distance between distinguishable epipolar lines.

Reference is now made to FIG. 6B. As has been explained until now, as long as identical feature types fall on separate distinguishable epipolar lines, each feature type may be identified in the captured image without concern of confusion between them. However, under certain circumstances now to be discussed, where reflected features are known to be found only on pre-defined sections of an epipolar line, then separation of same feature types is even possible along the same epipolar line. Two individual features of the same type on the same epipolar line may appear on only limited sections thereupon, in the case where the imaged object moves within a very limited depth range over a series of images. That is to say, if the imaged object movement is confined to a particular distance range from the imaging system, then multiple occurrences of the same feature type may occur over a single epipolar line. If the movement of an imaged object in 3D space is slight, then the corresponding movement of reflected features along their respective epipolar lines is small. In such instances, it is possible to separate multiple appearances of a given feature type on a single epipolar line, where each feature type appears in a pre-defined restricted range along the epipolar line.

To illustrate, we now turn to FIG. 6B, showing the same schematic representation 500 as in FIG. 6A. Epipolar lines ρ, Ʉ, Ø, θ, φ, and β are shown and the image height is now larger, denoted $H_1$, to include multiple appearances of the same feature on a given epipolar line in the image. On epipolar line Ʉ, for instance, features 96 and 506 are two individual features that appear on the same epipolar line and are of identical type, namely (A). If each of these features is free to appear on any part of the epipolar line Ʉ in the image, then confusion may arise between the two features during feature identification. As explained, the correspondence between each of features 96 and 506 and the feature's unique appearance in the projected pattern would be subject to error. But in the current embodiment, the appearance of feature 96 is guaranteed to appear only on subsection 96A of epipolar line Ʉ, while the appearance of feature 506 is guaranteed to appear only on subsection 506A of the same epipolar line. In such a case, the distance between the two subsections, DɄ, is large enough so that no concern of confusion between same feature types exists. During the feature identification process, an (A) type feature found on section 506A of epipolar line Ʉ in a given image is definitively identified as feature 506, while an (A) type feature found on section 96A is definitively identified as feature 96. Regions 96A and 506A are two well-defined, spaced apart regions. Likewise, the appearance of features 98 and 504 upon epipolar line Ø is only within ranges 98A and 504A respectively. Finally, features 100 and 502 also only appear on respective ranges 100A and 502A along epipolar line θ. In all of the previous three cases, a large enough distance exists between the ranges along a single epipolar line upon which two identical feature types may fall. Therefore, identification of two separate features of the same type is possible.

One way of having more than a single appearance of the same feature type on an epipolar line is by increasing the image height to $H_{1'}$ from $H_1$. The increase of the image height results in multiple appearances of the same feature type along epipolar lines in the image. The multiple appearance of same feature types is due to the periodic cycle of the pattern, which repeats itself along the length of the enlarged $H_1$, or $H_{1'}$. Alternatively, if the resolution of the image sensor is increased and the pattern features are decreased in size, then feature types may repeat themselves along epipolar lines. As long as the depth measurement is limited to a certain range over which the imaged object moves, any given feature along the epipolar line only displaces a short distance for every frame. Thus, even two identical features may be differentiated on a single epipolar line, so long as the sections of the epipolar line upon which they shift are limited and spaced far enough apart. The division of the epipolar line into predefined sections is a function of the depth range limitation. Through such depth range limitations, more points are sampled in the image and resolution is further increased as the number of depth readings in the captured image is greater.

We now refer to FIG. 7, which is a simplified illustration of a captured image of a preferred light pattern projected in accordance with epipolar separation to ensure that same feature types fall on distinguishably separate epipolar lines. The figure illustrates the geometric principles that provide a significantly high number of identifiable features through projection of preferred patterns at angles to the epipolar field. The angling of the projected periodic pattern ensures that same feature types are captured on separate distinguishable epipolar lines. The features are preferably comprised of unique combinations of spatially arranged sample points, and the number of sampled points in the captured image is referred to as the image capacity or coverage factor.

The question that could be asked is: Why not construct a code having as many feature types as needed to cover the image frame, denoted by sensor height H, without the need for epipolar separation? The answer lies in the fact that single pattern imaging systems strive to have feature types as small as possible, thus providing higher sampling density per image. To this end, in spatially encoded methods and systems, it is highly desirable to encode the projected light with a minimal amount of feature types, since each feature type is represented by a spatial code of some finite area. That is to say, the less features in the code, the smaller pixel area needed to encode a feature, as each feature appears on the image sensor as light intensity formations over a certain number of square pixels. By limiting the number of feature types through a repeating code, the number of pixels needed to represent a given feature type is minimized. As such, the number of identifiable features in the 2D image is increased, and thus the number of corresponding point cloud points, or point cloud density, is increased as well. A higher number of point cloud points leads to higher resolution 3D images.

As such, it would not be effective or desirable to encode a large amount of feature types in order to obviate the epipolar line separation techniques employed in the present embodiments. Through the techniques of epipolar separation described in the embodiments, a rather small matrix code can provide "inflation" of the image capacity, as more uniquely identifiable features may be observed for each captured image frame.

FIG. 7 illustrates a schematic image of a projected coded pattern 104 comprised of a series of 10×2 matrices of feature types, wherein the projection is again at an angle to the epipolar field. Each feature of the pattern has square pixel size C×C. As such, the length of each periodic matrix in the pattern is XC=10C, while the height is YC=2C. The distance P represents the horizontal distance in pixels between distinguishable epipolar lines in the image. As seen, the projected pattern 104 is rotated at an angle 106 with respect to the epipolar field. It is shown that every other feature in the Y direction of the pattern, or in other words every reoccurrence of the same feature, falls on a distinguishable epipolar line. It is appreciated that the matrix may take on various sizes, and this size is only an example for illustration purposes. Using the principles known in geometry of similar triangles, in can be proven that the triangle with sides H-U-V and the triangle with sides YC-h-P are similar triangles, and thus the following general equation holds:

$$H/U = YC/P \text{ where } U = XYC^2/P$$

H is thus the number of pixels appearing on epipolar line 108. As the epipolar separation P is decreased, angle 106 becomes smaller. From the equation we see that, for a constant pattern area size, if only the epipolar line separation P decreases, then H grows larger.

For example, feature 110, an (A) type feature, occurs only once, as desired, over the epipolar line 108. Feature 112 represents the next occurrence of feature type (A) after feature 110, and represents the upper limit of the image height. If the distance P between distinguishable epipolar lines is decreased, angle 106 is decreased in turn, and the same coded pattern with the same number of features is thus rotated less from the epipolar field. Identical features are now separated by closer epipolar lines that are still distinguishable, and the effect of rotating the projected pattern to obtain epipolar separation becomes more apparent. Feature 110 repeats itself over an ever greater distance on epipolar line 108, thus expanding the value of H and thus the number of uniquely identifiable features, or resolution, in the image.

The lower limit of angle 106 occurs when epipolar lines are no longer distinguishable, that is to say, the same feature type falls on two adjacent epipolar lines that are too close to accurately be distinguished.

From the equation, we see that so long as the overall matrix size does not change any combination of X and Y dimensions of the matrix has no effect on the image coverage. For instance, if the Y component of the matrix code is increased and the X component decreased, say from a 10×2 rectangle, as shown, to a 5×4 square-like shape, we now have a matrix shape closer to a square rather than a long skinny rectangle. However, the overall matrix area (XY) remains the same. The angle 106 is decreased and the pattern is rotated less from the epipolar field to ensure epipolar separation on each distinguishable epipolar line. As seen from the equation H remains the same, and thus the image coverage is not increased.

Notably, the matrix structure is such that the length of periodicity in the X direction is much greater than that in the Y direction. Such a matrix code structure is referred to herein as preferred direction coding. It is advisable for X to be much larger then Y in terms of practical optic assembly, calibration, operational physical and sensitivity. For example, vibrations or other shaking of the imaging system can cause a very small rotation angle 106 to become too small for epipolar differentiation. Furthermore, a smaller angle of rotation as a result of non preferred direction encoded patterns requires decreasing the image field of view by a larger safety factor in order to ensure epipolar separation.

Reference is now made to FIG. 8, which is an illustration of the captured image of FIG. 6A with reflected light pattern 500 now projected at a smaller rotation angle 114 with respect to the direction of epipolar field. The distance between distinguishable epipolar lines is decreased to $d_f$. Features 116, 118, and 120, are identical feature types that repeat themselves every other feature in the y-direction of the pattern. These features now fall on epipolar lines 122A, 122B, and 122C. According to the equation described in FIG. 7, since the pattern has not changed, meaning X, Y, and C are constant but P decreases, H becomes larger. Therefore, $H_2$ is a larger vertical image height than $H_1$ of FIG. 6A, providing more sample points and thus higher resolution in the captured image. The imaging system can now sample more points in the captured image before encountering ambiguity, meaning without possibly encountering the same feature type along the same epipolar line. Alternatively, instead of increasing the image field of view, a pattern with smaller features may be projected using a high resolution sensor.

When angle 114 is decreased too far, however, undesirable system ambiguity occurs. When angle 114 becomes too close to 0 degrees, any slight movement or shaking in the calibrated projector/imaging apparatus may cause a distortion and obstruct clear epipolar line distinction. In addition, as the periodic matrix in the pattern decreases in the X direction and increases in the Y direction, such as the almost-square shape mentioned above, the projection angle needed to ensure that H is not decreased, requires that P decrease to a point which is too small to provide a safe horizontal distance for epipolar line distinction. As a result of the above geometric factors and additional factors to account for possibility of error, the code preferably utilizes a preferred directional code in the X direction. Although the present embodiment utilizes a rotated pattern to achieve the result of epipolar separation, other embodiments including, but not limited to, skewing the projected pattern exist.

Although in the previous embodiments the projected pattern is periodic, it is understood that in alternate embodiments other coding schemes are possible, including, but not limited to non-ordered and/or non-periodic coded patterns that may be projected to achieve epipolar separation. The previous embodiments have described spatial coding techniques using a uniquely structured spatially encoded pattern P1. Nonetheless, it is appreciated that further embodiments may include temporal coding, spectral coding, a combination thereof, or any other two dimensional coding scheme or combination thereof, including combinations involving spatial coding embodiments such as those described herein, that enable differentiation of a plurality of feature types along distinguishable epipolar lines.

Figure 9:
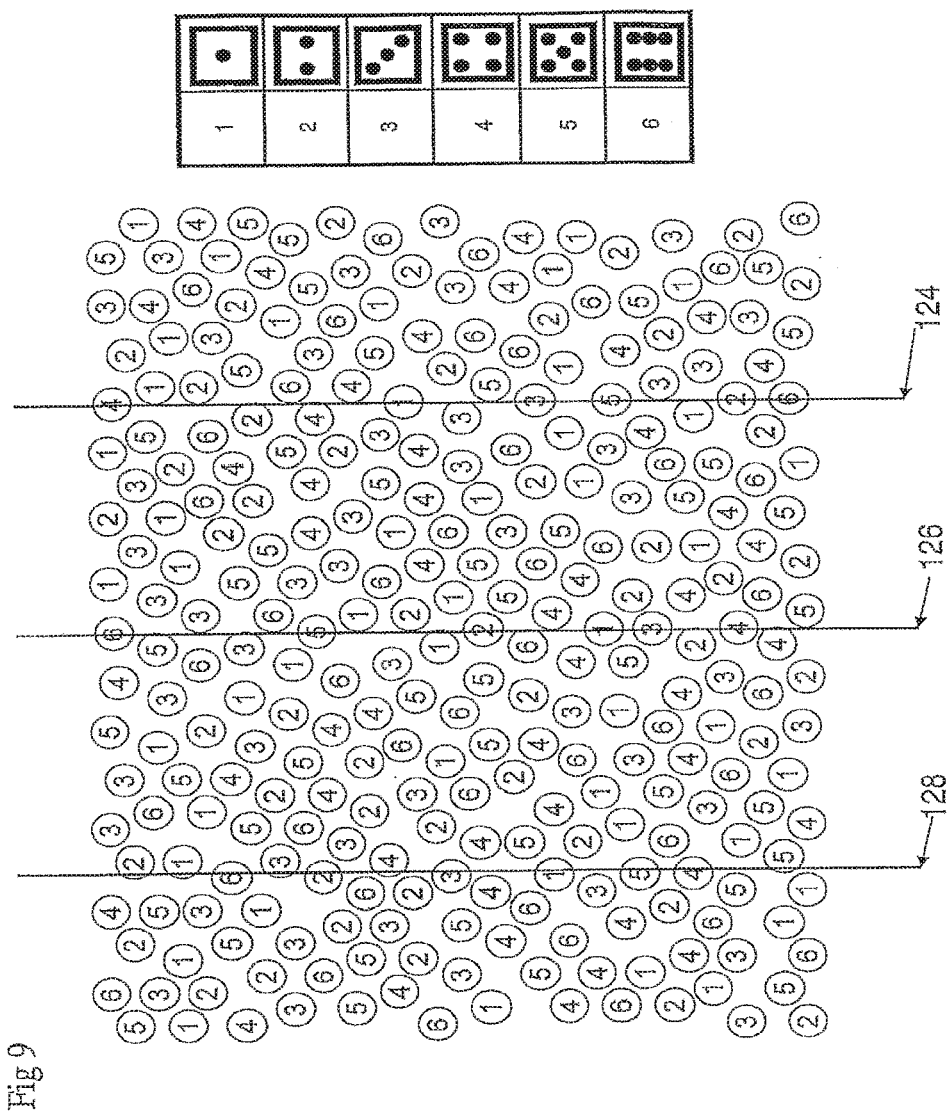
FIG. 9 is a simplified schematic diagram of a non ordered and non periodic bi dimensional spatial pattern that may be used in certain embodiments.

Reference is made to FIG. 9, which is schematic diagram of a non ordered and non periodic pattern. Each feature type of a bi-dimensional spatial formation in a non-periodic code is represented in the pattern as a number. It is appreciated that each feature type, numbers 1 to 6 in the figure, appears not more than once on any give epipolar line. Exemplary epipolar lines are 124, 126, and 128. An exemplary spatial coding shown is a pattern similar to dominoes. The spatial code may, of course, take on many forms, possibly similar or identical to the code seen in FIG. 3 and FIG. 10. Other structured light coding techniques may include bi-tonal, grey level, and/or multi-spectral techniques.

Figure 10:
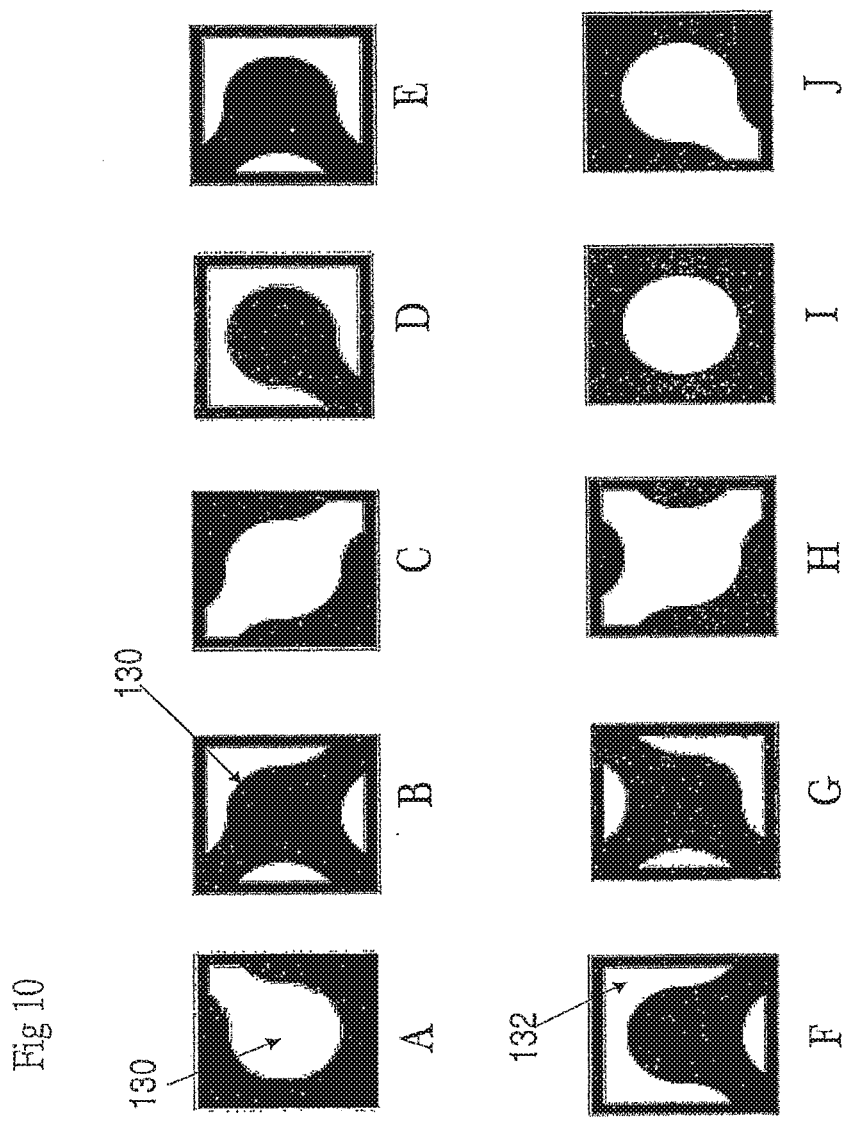
FIG. 10 shows illustrations of exemplary feature types that comprise preferred encoded pattern P1.

Reference is now made to FIG. 10, which are illustrations of exemplary feature types that comprise preferred encoded pattern P1. Features A-J are examples of binary spatially coded feature types. Each feature is comprised of a spatial combination or formation of five black and white points, made up of a black (local minimum) or white (local maximum) center point 130 and four black or white peripheral or "saddle" points 132. All possible combinations of the five black and white points lead to an alphabet of 32 unique characters or feature types. The exemplary feature types in FIG. 10 are arbitrarily named A-J, each corresponding to a different combination of a center point and four saddle points. A feature type having a white center point corresponds to a local maximum illumination intensity in the projected pattern, while a feature type having a black center point corresponds to a local minimum illumination intensity in the projected pattern. The peripheral points of each letter correspond to illumination intensities that are neither maximum nor minimum, where a white peripheral point is closer to maximum intensity than minimum intensity and a black peripheral point is closer to minimum intensity than maximum intensity. It is noted that other embodiments may use features having combinations of more or less saddle points. For instance, if each feature contained six saddle points, an alphabet now exists of 128 unique characters or feature types and thus a larger pattern period. Such encoded features would be suitable for applications of larger patterns with more sampling points, such as high-resolution mega-pixel imaging.

Figure 11:
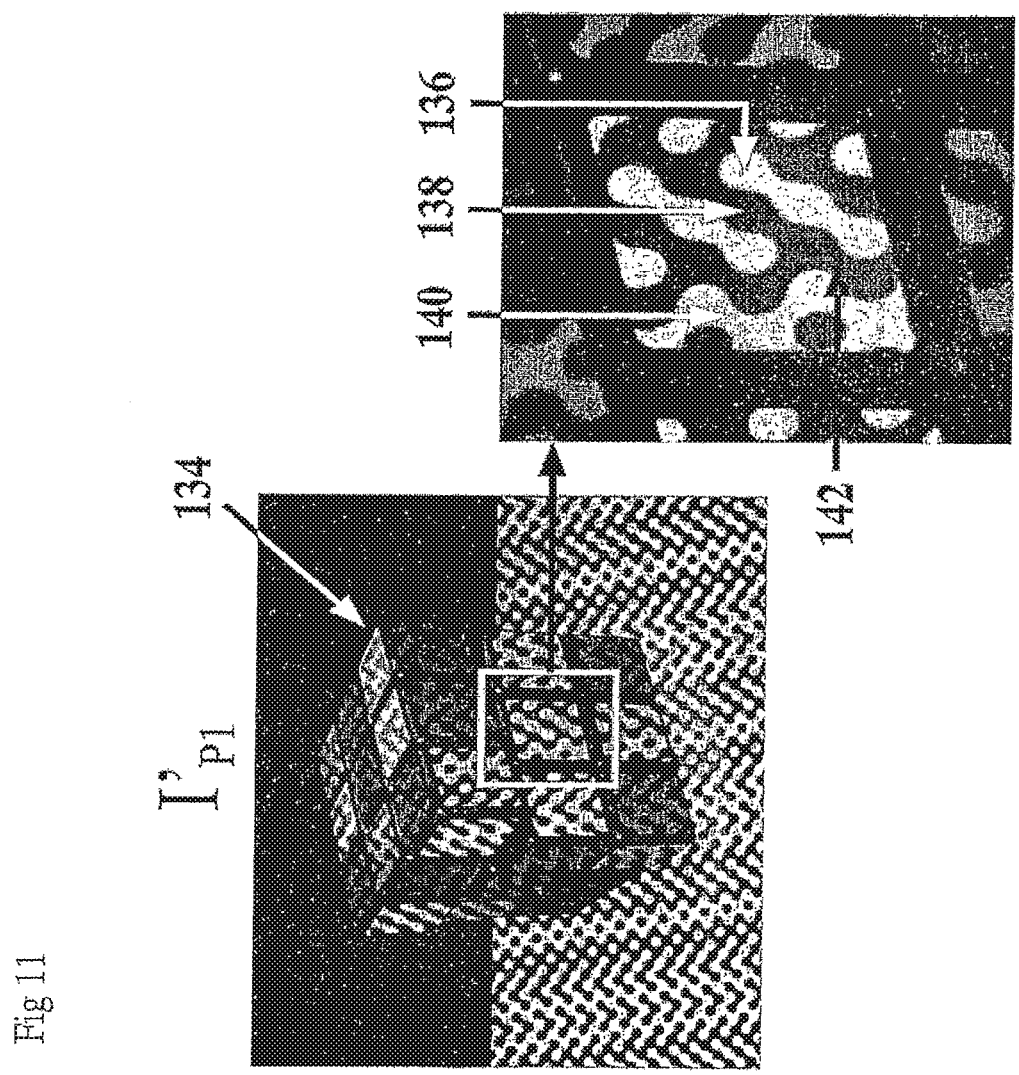
FIG. 11 is an illustration of the exemplary pattern P1 as seen an image I'$_{P1}$ after being reflected from an imaged cube.

To illustrate further, reference is made to FIG. 11, which is an illustration of the exemplary pattern P1 as seen in an image $I'_{P1}$ after being reflected from an imaged cube 134. The periodic pattern comprises the features types described in FIG. 10. A close-up of the image showing one part of the cube is shown at the bottom of the figure. White center point 136 represents a maximum intensity reflection within the immediate surrounding pixel area of the image. Black center point 138 represents a minimum intensity reflection within the immediate surrounding pixel area of the image. White saddle point 140 shows a reflection intensity that is closer to a maximum than a minimum. Black saddle point 142, is the opposite, and shows a reflection intensity that is closer to a minimum than a maximum.

When features of the projected pattern are reflected from an imaged object onto an image sensor, each of the five points of any given feature becomes a sample point in the captured image. These sample points are contained on adjacent sensor pixels upon which the reflected feature has been imaged. It is understood that whether a particular sample point is a maximum, minimum, or saddle is dependent on the projected light intensity on that point as well as the reflectance properties of the material of the imaged object at that point.

The maxima, minima, and saddle points are preferably extracted through identifying their derivatives in the image. This means that they are determined through local variations in illumination. For example, a white center point of a projected feature, representing a local maximum illumination intensity in the projected pattern, receives a low pixel(s) intensity or grey-value on the imaging sensor if reflected off of a dark surface. If such a center point were decoded independent of the center point's surrounding sample points, the decoding engine may mistakenly interpret the low intensity value as indicating a local minimum, or black center point. However, when analyzing the surrounding pixels of a white sample point reflected from a dark surface, the decoding engine will see pixel values of even lower intensity, and thus a correct identification of the sample point as a local maximum occurs.

Likewise, a black center point of a projected feature, representing a local minimum illumination intensity in the projected pattern, receives a high pixel(s) intensity on the imaging sensor if reflected off of a bright surface. Again, a direct intensity evaluation of such a sample point would falsely identify a feature containing a local maximum, or white center point. However, by measuring the changes in local intensity around such a point, the decoding engine will recognize pixel values of even higher values. As a result, a correct identification of the sample point as a local minimum occurs. Therefore, when analyzing an image of the reflection of a single projected pattern critical point detection is used. Critical point detection means that changes in local illumination intensity by known derivative analysis methods are used rather than direct intensity evaluation to ensure correct feature detection in the decoding process.

Furthermore, in the periodic repeating code of the previous embodiments, the relative horizontal distances between saddles and minima or maxima of features is constant. During the decoding process, the vector, or set of distances between elements or components of features is determined and a constant vector is expected. Such a vector enables verification of accurate feature readings. False readings that arise from noise and textural differences on the imaged object can be minimized through the verification process of distances between points of the feature. If, for instance, a distance between a saddle and a minimum is larger than the expected difference, then the decoding system may decide that an identified feature element is merely noise rather than a part of a feature.

Known values of neighboring saddles and maxima are further utilized for the feature validation process and error correction, possibly by the cross referencing of adjacent point grey values. For instance, in the identification and validation process, certain characters within the known alphabet may be eliminated if their spatial value arrangement contradicts those of known neighboring characters. Another method for decoding feature identity is by the integration of semi validated characters to known groups of characters. An example case is where one of four saddles is not clearly identified, but the other three have been validated. It is understood that many different implementations of character recognition are possible, including wavelength analysis or any other methods known in the art.

It is appreciated that the encoding scheme is not limited to a binary code, nor to any preferred optical implementations of binary code, such as bi-tonal, monochromatic, or bi-polar projection, and as in several examples given in previous embodiments above may be implemented in other ways, including but not limited to spectral coding, non periodic coding, and temporal coding.

Figure 12A:
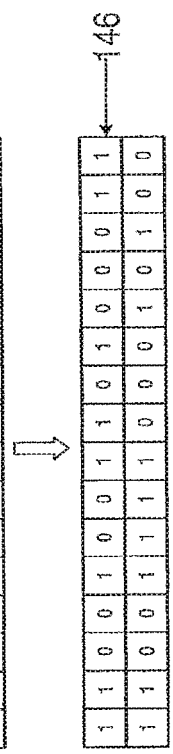
FIGS. 12A and 12B illustrate the construction process and the encoding scheme inherent in pattern P1.
Figure 12B:
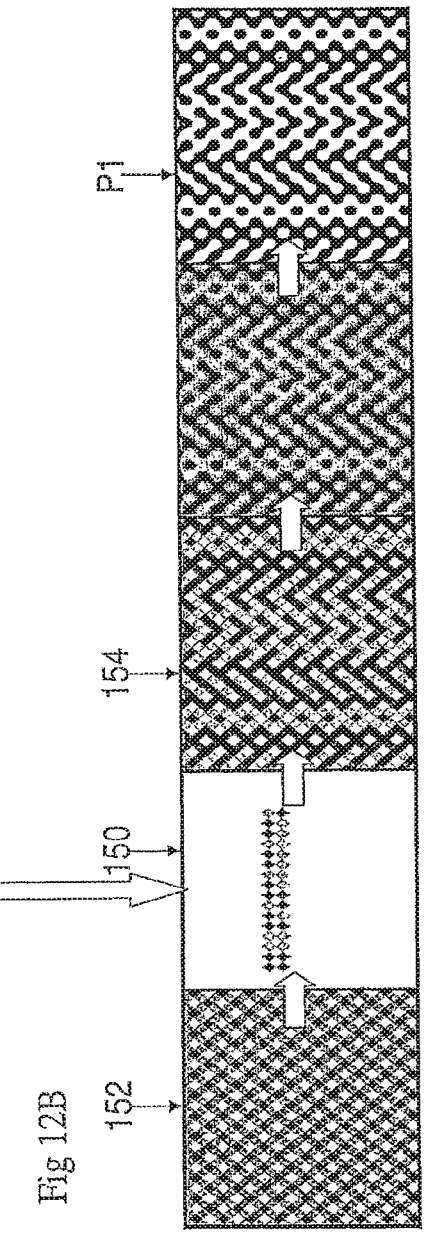

Reference is now made to FIGS. 12A and 12B, which illustrate the construction process and the encoding scheme inherent in pattern P1. First referring to FIG. 12A, the process begins with a Debruijn sequence 144. The sequence 144 is created over a character space $S\Sigma=\{0,1,2,3\}$. The series has a length of two, meaning that every sequence of two numbers appears at most once. Therefore, the length of the DeBruijn sequence is $|S|=|\Sigma|^2=4^2=16$.

Matrix 146 is generated from matrix 144 by replacing each number in matrix 144 by the matrix's binary representation, where each binary number is written column wise. Matrix 148 is obtained from matrix 146 by flipping even columns; in other words, binary values in the upper row of even columns of the matrix are moved to the bottom row and visa versa. The flipping of even columns in matrix 146 is performed to avoid a situation of code duplicity, meaning to ensure that no letter appears more than once in any given cycle of the matrix in the pattern.

We now turn to FIG. 12B. The matrix 148 of FIG. 12A is mapped into a two dimensional pattern of rhombi 150, having two colors of grey, each color representing a 1 or 0 in matrix 148. This two color grey pattern is repeatedly mapped onto a pattern 152 of black, white, and grey rhombi. The resulting pattern 154 is formed, having four colors of grey. Every grey rhombus of pattern 150 colors one of the grey rhombi in pattern 152 one of two shades of grey. The black and white rhombi remain unchanged. In the next two steps, the binarization of rhombus pattern 154 is carried out, possibly by Gaussian smoothing followed by obtaining what is referred to as a sharp intensity threshold, although other techniques are possible. The resulting pattern P1, as shown initially in FIG. 3, provides a bi-tonal sharpened pattern for projection that allows the epipolar separation techniques described above.

It is understood that the encoding described herein is a mere single way of constructing a viable two dimensional spatial formation-based light code having multiple feature types to be used in preferred embodiments of the present invention and other code types, such as Perfect Maps, M Arrays and pseudo random codes are possible.

Figure 12C:
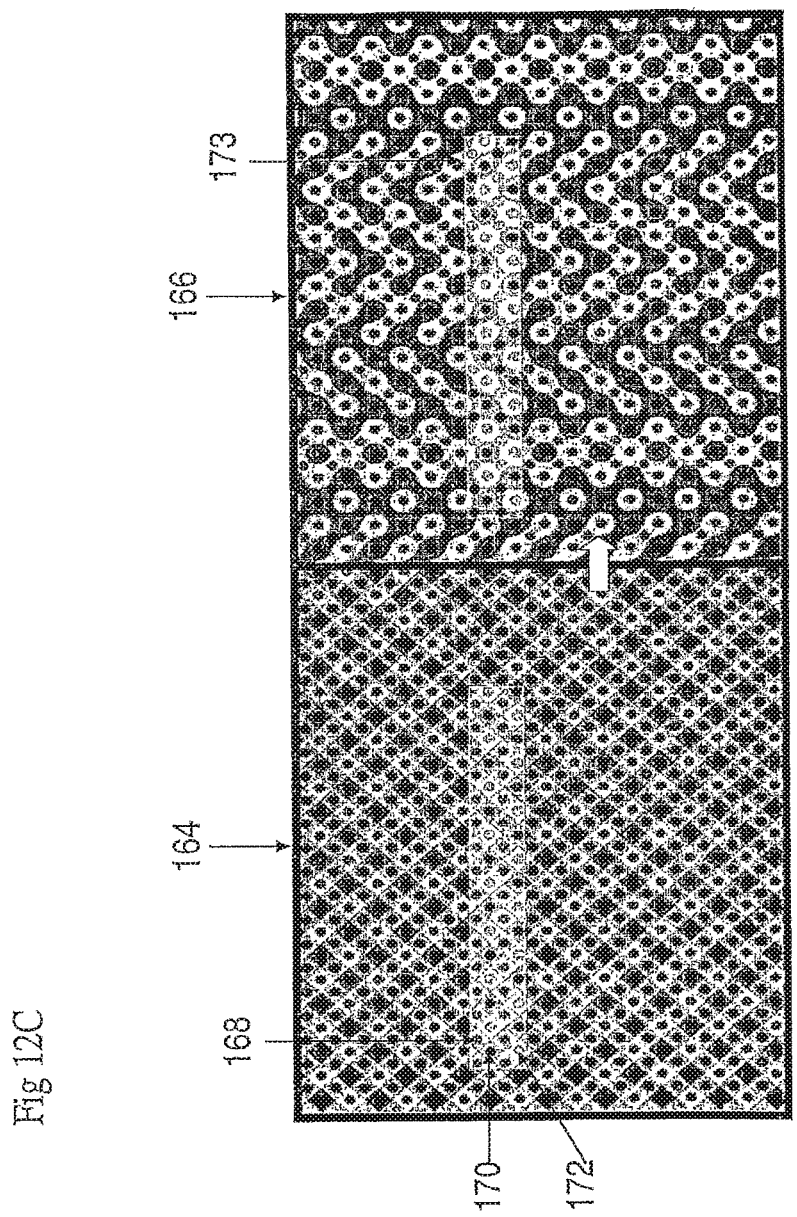
FIG. 12C contains simplified illustrations of the sample points in pattern P1 after being reflected from an imaged object and viewed as part of a captured image in an imaging apparatus.

Reference is made to FIG. 12C, which are simplified illustrations of the sample points in the pattern P1 after being reflected from an imaged object and viewed as part of a captured image in an imaging apparatus. Pattern 164 is a close up of pattern 154 of the previous figure. The thirty two binary values of matrix 150 are seen as thirty two saddle points 168. Each of these thirty two saddles points becomes a sample point. Each group of 4 saddle points has a black dot 170 or white dot 172 in the center. The black and white dots are black and white rhombi in pattern 154, and become sample points as well. Altogether, there are 64 sample points in every cycle of the code in the pattern. These points are shown in the brightened area 173. Pattern 166 is a close up of pattern P1. In pattern 166, the sample points are seen after the pattern is processed with Gaussian smoothing and sharp intensity threshold.

Reference is made to FIG. 13A, which illustrates a preferred projection and imaging method that enables epipolar separation techniques described above. Once again, the encoded light pattern P1 of previous embodiments is shown. The encoded light pattern is seen here, as in FIG. 3, rotated a certain angle in relation to the epipolar line 174 in the captured image, thus placing same feature types of the code on separate epipolar lines. The angle of rotation is described by the following equation.

$$\sin^{-1}(P/YC)$$

By selecting the angle of rotation, the epipolar separation techniques described above may be carried out. Calibration methods known in the art are used to determine the exact location of the epipolar lines in the captured image. Furthermore, to ensure that no two identical features of the code repeat themselves on a given epipolar line, the projected pattern height $H_P$ is limited in the projector apparatus, as exemplified by the brightened area 175 in the pattern. As a result, each diagonal column for every period is cut by a different epipolar line. Each epipolar line in the captured image therefore contains one and only one feature of each type. If the measured depth range is limited, then as discussed above in FIG. 6B, more than one of the same feature type can appear on each epipolar line in the image. The image height H in pixels can be described by the equation in FIG. 7 above. Since the aspect ratio of the shaded area is 4/3, the total surface area in terms of sampled pixels is defined by the following equation:

$$A=H^2(4/3)=X^2Y^2C^4/P^2(4/3)$$

Reference is made to FIG. 13B1. For certain 3D imaging applications, a larger number of sample points is needed to obtain the desired resolution. For such a purpose, a variant coding scheme of the pattern P1 in above embodiments, named P2 herein, may be utilized. The P2 pattern is shown in FIG. 13B1. As in P1, P2 is a binary spatially coded periodic pattern containing feature types comprised of spatial combinations of five black and white elements or points. Likewise, as in P1, the black (local minimum) or white (local maximum) center points are surrounded by 4 saddle points. In pattern P2, however, two geometrical variants of each letter are contained over each cycle of the code and thus the population of letters is doubled from 32 to 64. That is to say, each letter has one variation Y1 in which the center point is shifted towards the left and falls closer to the left saddle points and another variation X1 in which the center point is shifted towards the right and falls closer to the right saddle point. The alternating maxima and minima do not fall one on top of the other in the vertical direction as in the coded pattern P1, but rather each maximum is shifted slightly to the right or left of the minima directly above and below. Similarly, each minimum is shifted slightly to the right or left of the maxima directly above and below. Such a pattern creates a "zig-zag" type effect, where alternating rows are shifted either slightly to the right or to the left. In all, in a given cycle, there are 32 black minimum, 32 white minimum, and 64 saddles that in total comprise 128 sample points.

Notably, the relative horizontal distances between points of each feature in the image, as discussed above, now allow for a vector that represents an encoding. That is to say, in addition to the five points of the feature which allow for a $2^5=32$ feature code, the varying horizontal distances between points of a given feature allow for additional feature types to be present in each pattern, thus adding to the number of sample points possible for a given image. Various combinations of horizontal distances of the same five feature points are possible.

We now turn to FIG. 13B2. Pattern P2 is constructed in a similar way as described above in FIG. 12A, 12B using a Debruijn sequence. A binary matrix based on a slightly modified Debruijn sequence is mapped into a two dimensional pattern of rhombi 282 having two colors of grey. This two color grey rhombi pattern is repeatedly mapped onto a pattern 284 of black, white, and grey rhombi. The resulting pattern 286 is formed, having four colors of grey. Every grey rhombus of pattern 282 colors one of the grey rhombi in pattern 284 one of two shades of grey. The black and white rhombi remain unchanged. In the next two steps, the binarization of rhombus pattern 286 is carried out, possibly by Gaussian smoothing followed by obtaining what is referred to as a sharp intensity threshold, although other techniques are possible. The resulting pattern P2, as shown initially in FIG. 13B1, provides a bi-tonal sharpened pattern for projection that allows the epipolar separation techniques described above.

Graphical processing known in the art is carried out on the rhombus array to obtain the "zig-zag" pattern that allows for two shifted variants of each letter as described above.

Again, the rotation of the grid pattern ensures that every two identical features that appear in an alternating fashion on each diagonal column do not fall on the same epipolar line.

The process of decoding is characterized by comparing relative horizontal distances between the various sample points, meaning either a minimum, maximum or saddle point. As described above, the decoding process attempts to identify locations of maxima, minima and saddle points. The horizontal distances between such points serve to validate the existence of a feature at that location in the 2D image. In the present embodiment, these horizontal distances may be utilized for identification of features in such a zig-zag pattern. For example, by determining relative horizontal distances between an identified maximum and the maximum's associated saddle points, the identity of the letter comprising such an array of points may be determined.

Figure 13C:
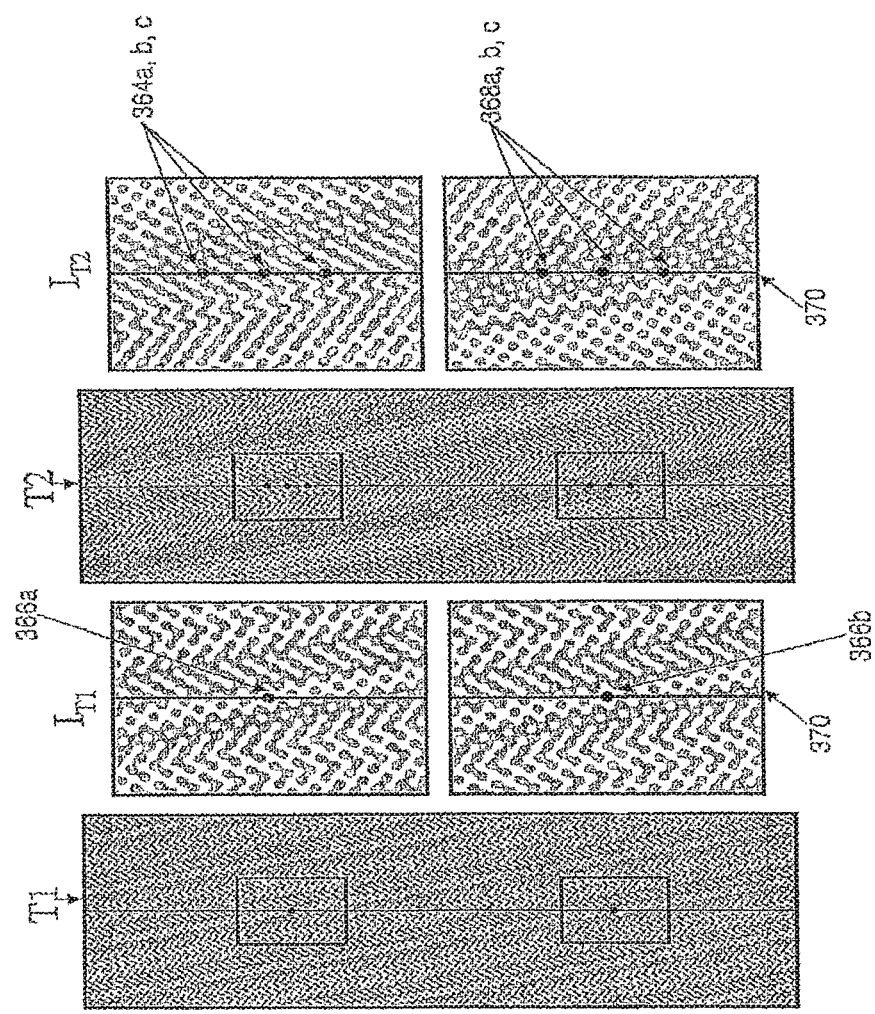
FIG. 13C illustrates two preferred patterns, T1 and T2, for a temporal encoding embodiment.
Figure 13D:
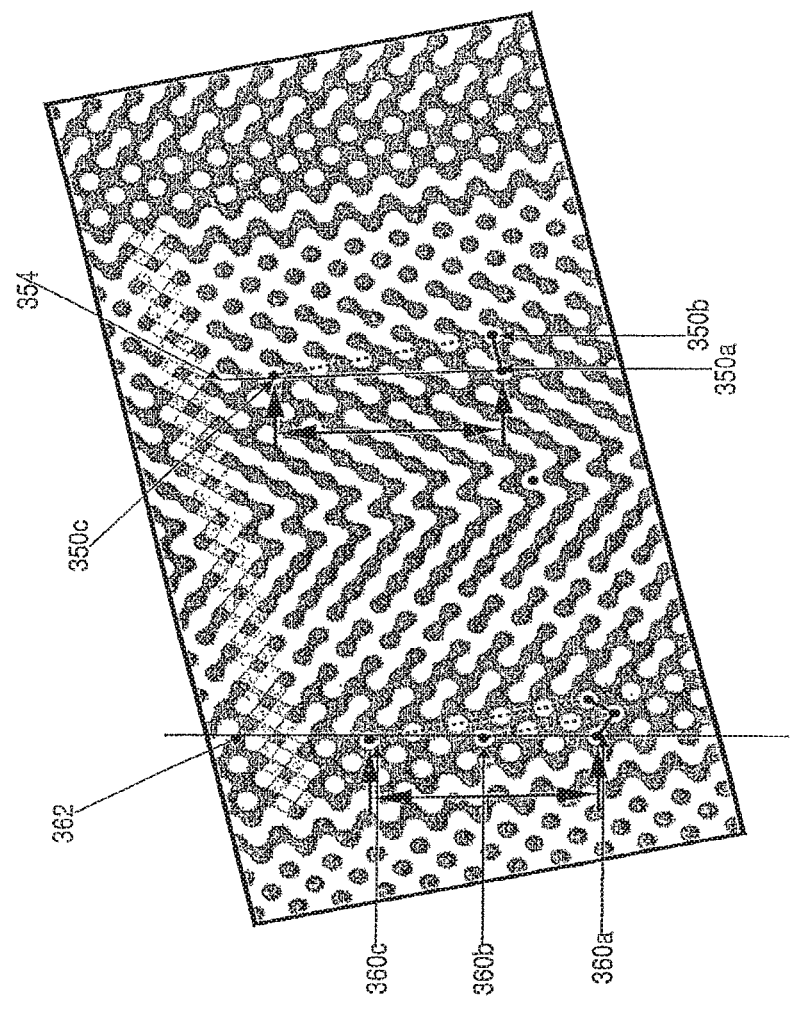
FIG. 13D illustrates a close-up of preferred pattern T2 for a temporal encoding embodiment.

Reference is made to FIGS. 13C and 13D. In FIG. 13C, two patterns T1 and T2 are presented. T1 is simply the pattern P1 in previous embodiments doubled in height. Pattern T1, like P1, contains 32 features and has a periodic cycle of 16. A captured image containing projected pattern T1 is shown as $I_{T1}$ and allows for two cycles of the pattern in the vertical direction. Thus, each feature appears twice on a given epipolar line in image $I_{T1}$. Noticeably, these features are at a distance from each other that is equal to the height of pattern P1.

T2, being equal in height to pattern T1, is a periodic spatially encoded pattern having unique bi-dimensional formations different than T1. The pattern T2 contains 32 types of features. Each feature type appears twice consecutively in the cycle (other than 4 unique feature types that appear once in each cycle). Each pair of adjacent identical feature types shares common saddles. For example, in FIG. 13D, features 350a and 350b are of the same type and appear adjacent to each other. Each feature is comprised of an extremum and four saddles. Two of the four saddles for each feature are common to both features. Therefore, each pair of adjacent features contains two extremas and six saddle points. Each sequence of two identical features repeats itself every 32 lines in the pattern.

As a result of such a repetition within the pattern T2 cycle, when the pattern is projected at a rotation to the angle of the imaging sensor, feature types reappear within close proximity on the same epipolar line in the resultant obtained image. Referring to FIG. 13D, such an example is seen on epipolar line 354 where identical features 350a and 350c appear on the line in close proximity. As seen in the figure, identical features 350a and 350b are adjacent to one another in the cycle. Therefore, the rotation places like feature types in close proximity on the epipolar line. Likewise, identical features 360a, 360b, and 360c appear in a group of three as seen in the cycle. These three features thus appear along epipolar line 362 in close proximity as shown. The location range of each feature type along the epipolar line is thus known.

Returning to FIG. 13C, we see that an advantage of enlarged pattern T1 is the enlarged number of sample points that may be imaged and correlated to depth points in space. However, the appearance of like feature types on the same epipolar line presumably causes ambiguity in the decoding process as discussed above. For instance, identical features 366a and 366b are on the same epipolar line 370 in $I_{T1}$. To resolve such ambiguity, a second pattern T2 may be projected intermittently with T1. Since T2 has a cycle twice the length of T1, then in an image $I_{T2}$ having the same height as image $I_{T1}$, an identical feature group 364 or 368 does not repeat itself over the length of the image. Each feature group only appears once along the length of the image $I_{T2}$.

Now, when patterns T1 and T2 are aligned in the projector apparatus and projected temporally, a comparison can be made between observed features within a range along parallel epipolar lines in successive images. The matching of features from a first image of $I_{T1}$ to sister features in a second image of $I_{T2}$ can allow for feature verification in the first image. As an example, feature 366a is seen in a particular range along a given epipolar line 370 in a first image of reflected pattern $I_{T1}$. Likewise, feature 366b appears along that same epipolar line in the first image $I_{T1}$, albeit at a distance from 366a. Such a situation may lead to ambiguity in $I_{T1}$.

A second image $I_{T2}$ having reflected pattern T2 captured in succession to the first image contains identical feature set 364a, 364b, and 364c on the same epipolar line, 370, as feature 366a appeared in image $I_{T1}$. Also, in a different region of that same epipolar line in image $I_{T2}$ appears identical feature set 368a, 368b, and 368c. Since these feature sets are distinct on the epipolar line, each set can be respectively compared to features 366a and 366b. That is to say, by correlating feature 366a from $I_{T2}$ with features set 364a, 364b, 364c in $I_{T2}$ and feature 366b from $I_{T1}$ with features set 368a, 368b, 368c in $I_{T2}$, ambiguity can be annulled. This is because each of features 366a and 366b in the first image is matched to a unique feature set in the second image.

The process of projection and decoding is as follows. T1 and T2 are projected alternately, synchronized with the camera. The images are decoded separately at first. The decoding of $I_{T1}$ is carried out as described in above embodiments, although each feature carries two image coordinates as it appears twice on the epipolar line. $I_{T2}$ likewise is decoded in the same manner as above embodiments and like features are found vertical to each other along the same epipolar line. Therefore, if no movement in the imaged objects occurred between frames, each feature within the image sequence $I_{T1}$, $I_{T2}$, $I_{T1}$ can be verified by correlating between the two images. If $I_{T1}$ and $I_{T1}$ are identical, then the imaged scene is static for the imaging time frame. $I_{T2}$ acts as a resolving pattern, as each feature at a specific location in image $I_{T2}$ is different than the feature at the corresponding location in image $I_{T1}$. Since multiple feature types of the same type reappear on $I_{T2}$ in close proximity, even if movement occurs between frames, the matching process can still identify associated features between the two images. In essence, the above process combines principles from both temporal and spatial encoding methods.

In temporal coding techniques, wherein more than one pattern is projected on the object for each captured image, it is understood that limitations may have to be placed on the speed of motion of the object being imaged.

Figure 14:
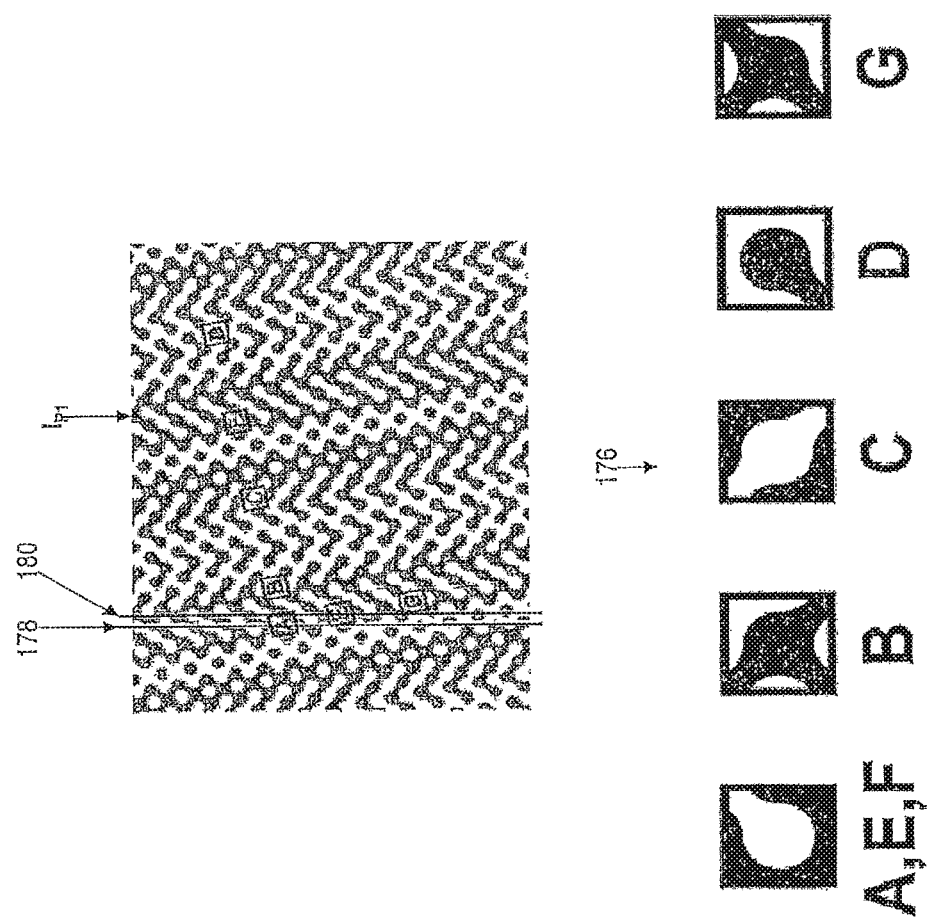
FIG. 14 shows exemplary characters or feature types along with image I$_{P1}$ of exemplary pattern P1.

Reference is made to FIG. 14, which shows image $I_{P1}$ and exemplary characters or feature types of pattern P1. Characters 176 represent features encoded over every period of the pattern, the nature of such features being described above in FIG. 10. It is noted that the assignment of letters to feature types in the current figure is independent of FIG. 10. The length of each period of the pattern P1 is 16 and the height is 2. That is to say, same feature types belong to either the same diagonal column, for instance identical features A and E, or to columns modulo 16, for instance identical features A and F. Modulo 16 means that same features are distanced periodically every 16 diagonal columns. Features from diagonal columns that are not modulo 16, however, are always of different types, such as features A, B, C, and D. On every diagonal column only two different feature types appear in an alternating fashion; one feature having a black center value and one with a white center value, for example A and G. As explained, features A, E and F are individual features appearing in the pattern that are of the same type. For purposes of clarity, these individual features are only referred to as feature type (A) in FIG. 3 and other figures where P1 is shown, while in the current figure, each separate feature is assigned a unique letter, A, E and F respectively.

Again, the rotation of the grid pattern ensures that every two identical features that appear in an alternating fashion on each diagonal column do not fall on the same epipolar line. As an example, features A and E are two individual features in the pattern that are of the same type. Feature A falls on epipolar line 178. Feature E, identical to feature A, is found four features below A on the same diagonal line. On this diagonal line, the A/E feature type occurs every other feature. Feature E falls on epipolar line 180, horizontally differentiable from 178. We see that each feature in the image can be expressed in terms of feature type and the feature's associated epipolar line.

The above embodiments discuss the projection of a single pattern onto an imaged object. The projection of a second pattern can provide further valuable information in determining the third dimension or depth. In particular, dual projection together with dual imaging may significantly increase the accuracy and reliability of feature type identification as well as provide new ways of reaching extremely high resolution in depth readings. Moreover, in certain embodiments, texture information may be extracted from the information obtained from the dual projection methods discussed herein.

Dual projection methods may include both temporal methods and/or spectral methods. Temporal methods are such where two or more patterns are projected over separate time intervals. Spectral methods are such where two or more patterns are projected with differing wavelengths of light. Temporal methods may utilize a spatial light modulator such as an LCD, DLP, or DMD. Spectral methods may, for example, be carried out by an optical multiplexer.

In the embodiments below, in the case of spectral-separation implementations, spectral separation is preferably small so as to allow for direct comparison of reflection intensities. That is to say, two identical patterns projected onto an imaged object at different but adjacent wavelengths will reflect with substantially identical reflection intensities. So for instance, in a first image $I'_{P1}$ a high intensity or white spot is projected onto a particular bright surface at a certain wavelength and is mostly reflected. In a second inverse image $P'_{-P1}$ a low intensity or black spot is projected onto the same bright surface at an adjacent wavelength and is mostly absorbed. Since the black spot in $I'_{P1}$ is projected at an adjacent wavelength, the black spot behaves in an opposite manner to the projected white spot in $I'_{P1}$ for the given surface and is mostly absorbed. Likewise, white spots projected at the two adjacent wavelengths in the images both reflect in almost identical manners. Black spots projected at the two adjacent wavelengths in the images both absorb in almost identical manners.

Figure 15:
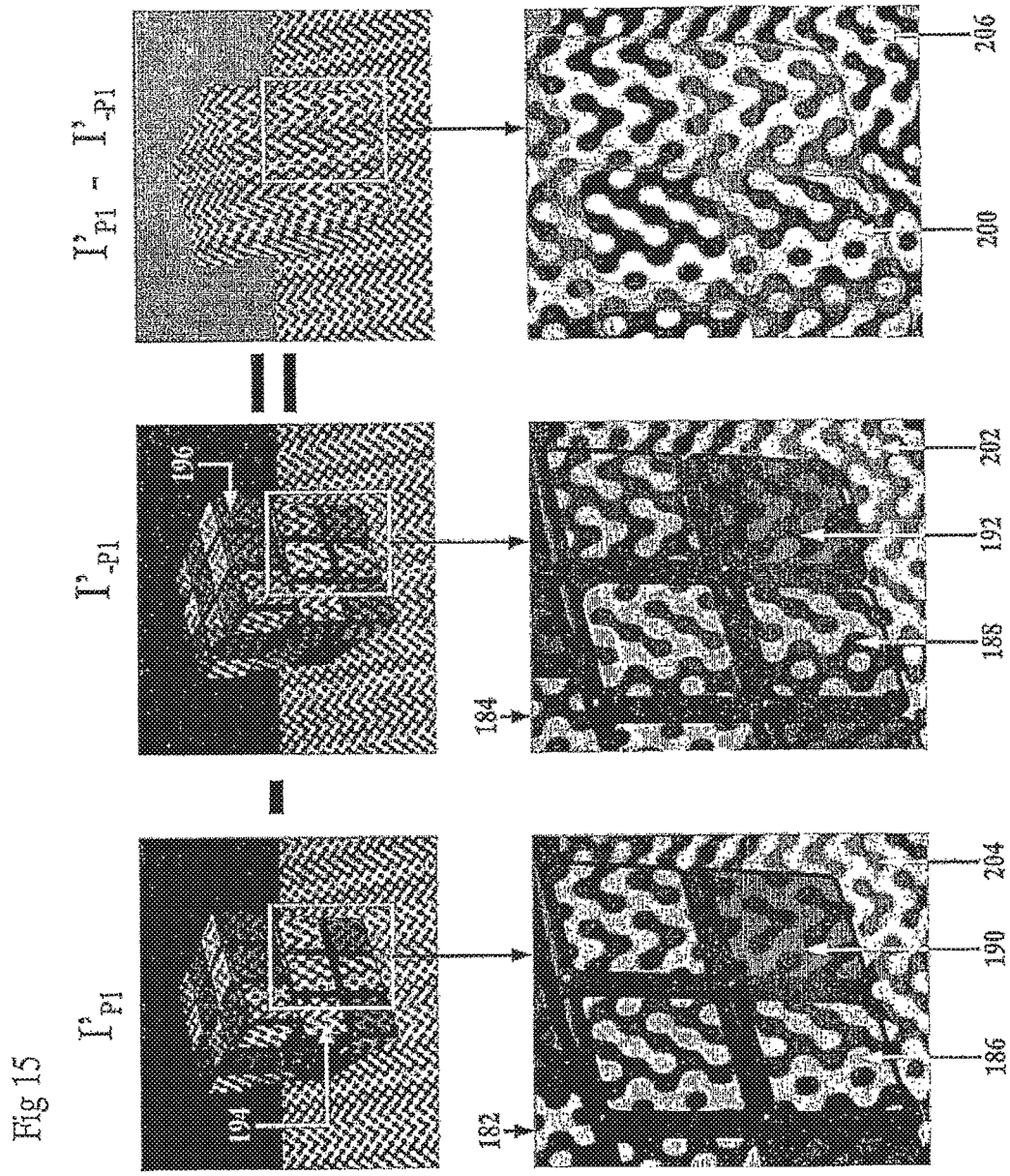
FIG. 15 is an illustration of a preferred dual projection and dual imaging embodiment of the present invention involving P1 and −P1.

Reference is made to FIG. 15, which is an illustration of a preferred dual projection and dual imaging embodiment of the present invention. $I'_{P1}$ is an image of a Rubik's Cube having pattern P1 of the previous embodiments, as explained in detail in FIGS. 3 and 11, projected upon the cube. Image $I'_{-P1}$ is a second image of the cube having the negative of the pattern $P_1$ projected thereupon. Finally, the image $I'_{P1}-I'_{-P1}$ is the resultant image obtained from the subtraction of $I'_{-P1}$ from $I'_{P1}$. Close-ups 182 and 184 are the respective pattern reflections from the bottom right four squares of the cube in image $I'_{P1}$ and $I_{P1}$. In both images $I'_{P1}$ and $I'_{-P1}$, an imaged white point is a result of a projection and thereafter reflection of a maximum light intensity on that surface location of the imaged cube. Likewise, an imaged black point is a result of a projection and thereafter reflection of a minimum light intensity on that surface location of the imaged cube. So, if in $I'_{P1}$, a reflected white point is seen at a particular surface location on the cube, then in $I'_{-P1}$ a reflected black point is observed at the same surface location on the cube. For instance, white maximum point 186 seen in image $I'_{P1}$ is seen as black point 188 in image $I'_{-P1}$. Likewise, white saddle point 190 in image $I'_{P1}$ is replaced by black saddle point 192 in image $I'_{P1}$.

As the Rubik's Cube contains squares of varying colors, the reflected pattern shows high contrast when reflected from squares of bright colors, such as 194, and less contrast when reflected from squares of darker colors, such as 196. This is a result of the fact that the energy of projected white spots, or light intensity maxima, is reflected from bright surfaces to a much larger extent than the energy's reflection from dark surfaces, where much of the energy is absorbed. A projected white spot, reflected from a bright colored surface appears white in the image, signifying an area of the imaged object with high intensity reflection. In contrast, when a projected white spot is reflected from a dark colored surface, the reflected white spot appears much closer to black in the image, signifying an area of the imaged object with low intensity reflection. In either case, however, a projected white spot will always reflect from any given imaged object surface point at a higher intensity than a projected black spot on that same point.

Therefore, no matter what the imaged surface reflectance characteristics are, an imaged black point will always have a reflection intensity lower than an imaged white point at the same location on the imaged object surface. Thus, the subtraction of a black point intensity value 188 at a particular location in image $I'_{-P1}$ from a white point intensity value 186 at the same location in image $I'_{P1}$ will always yield a positive intensity value 200. Likewise, the subtraction of a white point 202 in image $I'_{-P1}$ from a black point 204 in image $I'_{P1}$, both at the same image location, will always yield a negative intensity value 206. As such, a value of each pixel in the resultant image is signed, either positive or negative. For visualization purposes, as display screens and prints cannot understand negative pixel values, a normalized scale may be used to represent both positive and negative resultant intensity values.

By projecting a pattern and the pattern negative on an object and subtracting the image of the reflected negative pattern from the image of the reflected original pattern, maxima and minima locations in image $I'_{P1}$ may be determined directly by a measure of the grey-level or intensity of the same image locations in resultant image $I'_{P1}-I'_{P1}$. All positive intensity values in the $I'_{P1}-I'_{P1}$ image indicate a white spot while all negative intensity values in the $I'_{P1}-I'_{P1}$ image indicate a black spot. Again, since negative intensity values may not be understood by display screens, a normalized scale may be used for image display. This direct measure of maxima and minima with such a dual projection is unlike the single pattern projection case described above in FIG. 11. In the case of single pattern projection, the additional analysis of local intensity values of surrounding points to the maxima and/or minima is preferred to ensure a higher level of correct feature type identifications. Therefore, the subtraction method of the present embodiment allows for a more robust pattern recognition analysis and thus a more reliable and powerful engine for derivation of 3D spatial coordinates from identified features in the captured 2D image.

Furthermore, the dynamic range of the intensity values in the $I'_{P1}-I_{-P1}$ image is doubled by the subtraction of the two patterns. This gives rise to a more accentuated pattern and thus aids in feature type recognition. Another advantage is the cancellation of the effect of ambient light on the resultant image $I'_{P1}-I'_{-P1}$. The resultant image shows an accentuated pattern with less interference of imaged object texture.

It is understood that the two images may be taken temporally or at the same time through use of spectral differentiation. Likewise, the two patterns may be projected with spectral or polarity separation, at the same time or temporally, or both patterns may have the same wavelength or polarity but the projections are separated in time. So long as the spectral separation is close, the reflection intensities of the two reflected patterns will be virtually exact negatives at any given imaged object surface location.

Figure 16:
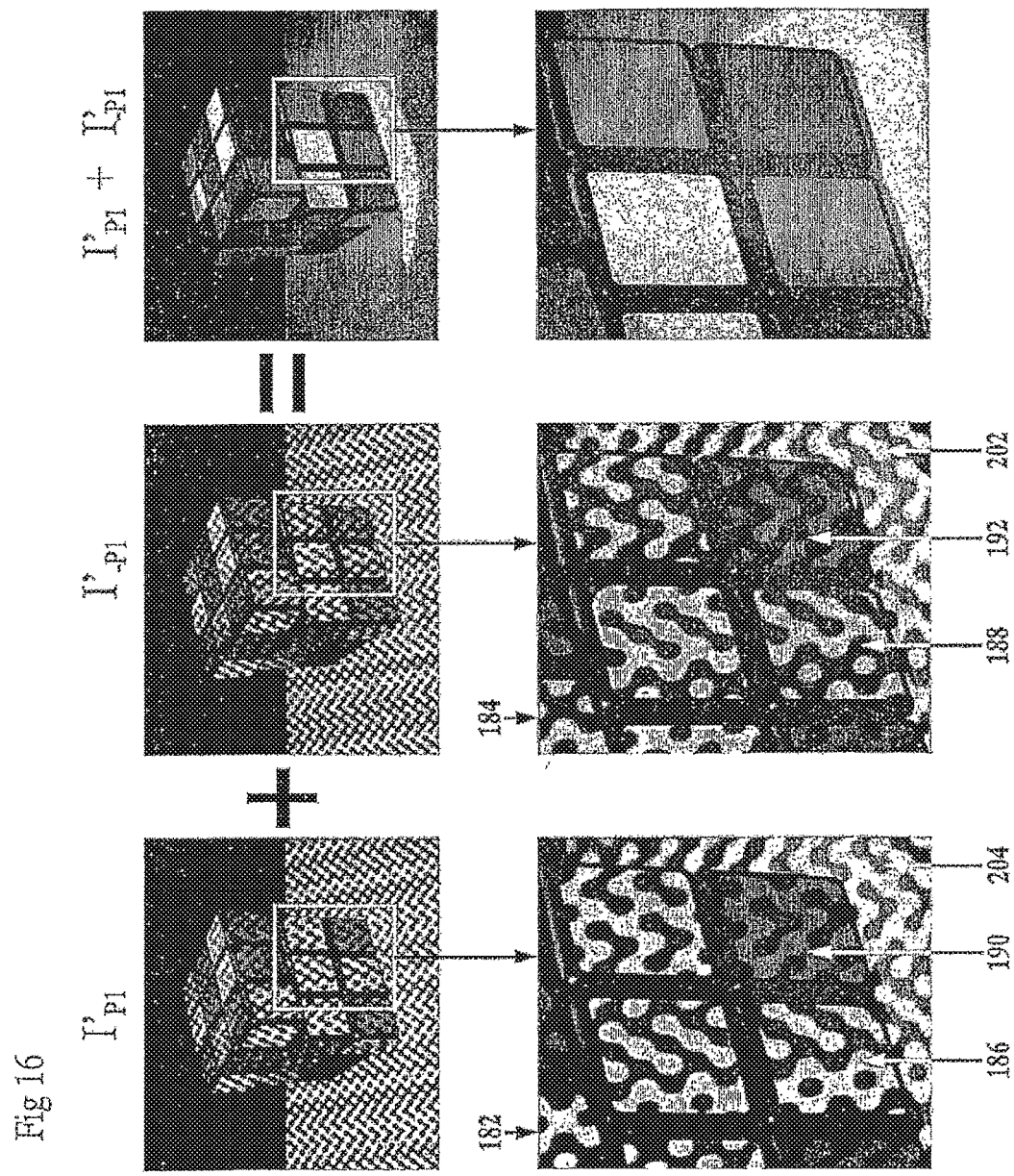
FIG. 16 is an illustration of the addition of the two images, P$_1$ and −P$_1$.

Reference is made to FIG. 16, which is an illustration of the addition of the two images, $I'_{P1}$ and $I'_{P1}$. The addition of the two images with opposite pattern illumination intensities projected thereupon leads to a cancellation of the pattern in the $I'_{P1}+I'_{P1}$ image. This is because the addition of any two reflection intensities for any given identical location in the two images leads to a resultant image showing the reflection of maximum light intensity from all points on the object. The variations in reflectance intensity are thus only a function of the texture of the imaged object. That is to say, the changing texture of the imaged object affects the reflection intensities with which a white point is reflected from the various points of the imaged object. The resultant image separates the texture of the depth imaged object from the imaged pattern observed in images $I'_{P1}$ and $I'_{P1}$.

Figure 17:
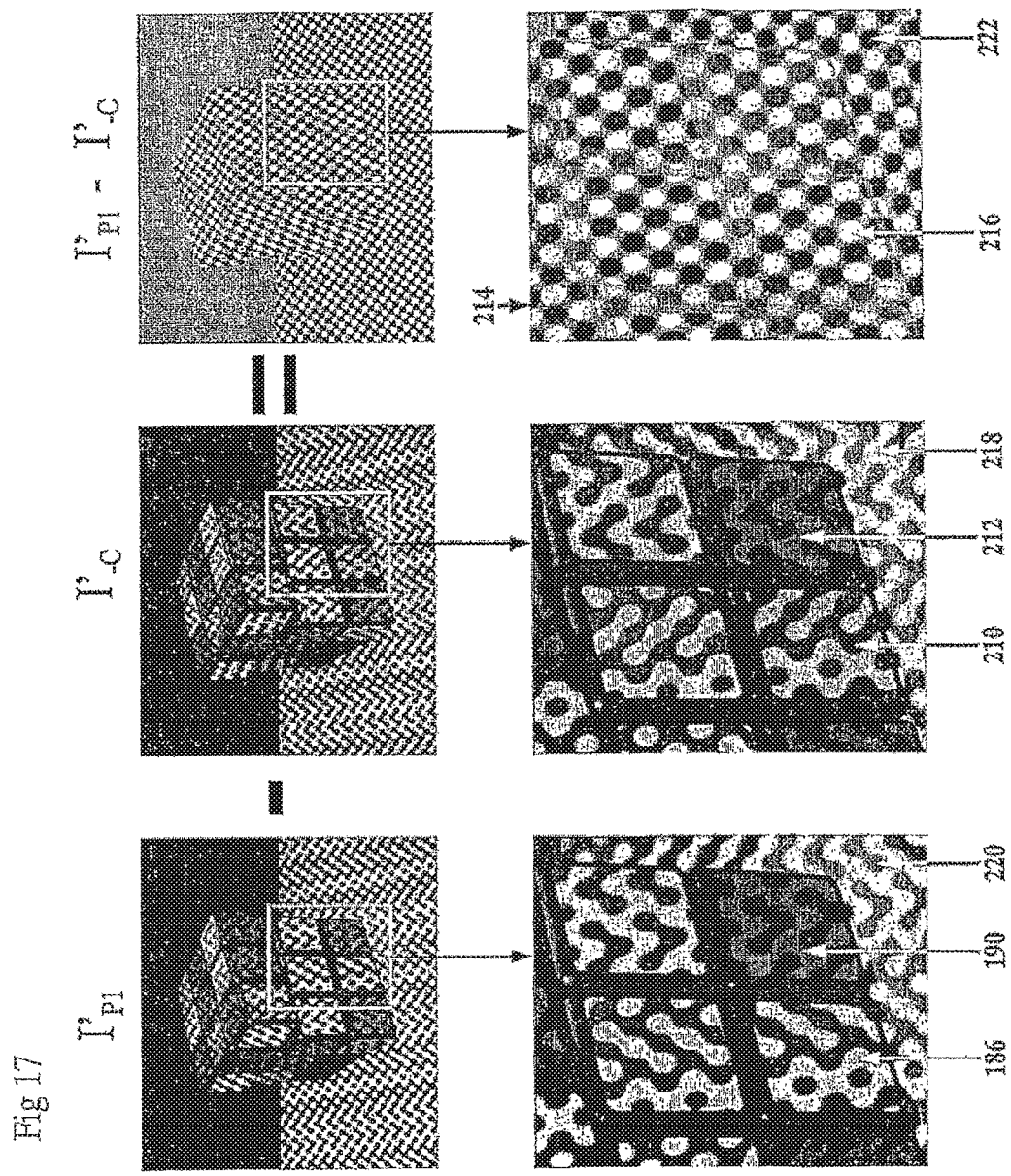
FIG. 17 is a preferred embodiment of a dual projection and dual imaging method of the present invention.

Reference is now made to FIG. 17, which is a preferred embodiment of a dual projection and dual imaging method of the present invention. $I'_{P1}$, as in previous figures, is an image of a Rubik's Cube having the pattern P1 projected upon the cube. Image $I'_{-C}$ is a second image of the cube having the same pattern as in $I'_{P1}$ projected thereupon only the maxima and minima are switched. That is to say, a maximum 186 in image $I'_{P1}$ is seen as minimum 210 in image $I'_{-C}$. However, a saddle point, for instance white saddle 190 in image $I'_{P1}$ remains white saddle point 212 in image $I'_{-C}$. Thus, a maximum is replaced by a minimum and visa versa, but the saddle points remain unchanged in both images. Finally, image $I'_{P1}-I'_{-C}$ is the resultant image from a subtraction of image $I'_{-C}$ from image $I'_{P1}$.

As seen in close up 214, what remains in the image $I'_{P1}-I'_{-C}$, are the maxima and minima, sometimes referred to as the carriers of the code. Again, for any given location on the image sensor, a reflected local intensity maximum point in image $I'_{P1}$ is replaced by a reflected local intensity minimum point in image $I'_{-C}$. The local intensity maximum appears as a white spot in the image, while the local intensity minimum appears as a black spot. The saddles are identical in both images. So, for instance, when the intensity value of location 210 in image $I'_{-C1}$ is subtracted from the intensity value of the same location 186 in image $I'_{P1}$, white spot intensity value 216 is obtained in the resultant image $I'_{P1}-I'_{-C}$. Similarly, when the intensity value of location 218 in image $I'_{-C}$ is subtracted from the intensity value of the same location 220 in image $I'_{P1}$ black spot intensity value 222 is obtained in the resultant image $I'_{P1}-I'_{-C}$. In contrast, when saddle point 212 in image $I'_{-C}$ is subtracted from the saddle point 190 of the same intensity and same image location, the identity of the saddle points as white or black disappears. On the other hand, the locations of the saddle points in the $I'_{P1}$ image are now sharpened and accentuated by the subtraction. The subtraction of the two images thus neutralizes the saddle values in the image but clearly delineates their locations. Moreover, the subtraction of the two images leads to a cancellation of ambient light.

The resulting image $I'_{P1}-I'_{-C}$ can now easily be scanned for maxima, minima, and saddle point locations. As explained above, in FIG. 10, the maxima and minima in the imaged pattern represent the center points of reflected features in the pattern. As the resultant image shows only the saddles' location, but not value, the search for maxima and minima is thus simplified, and becomes faster and more error-proof. These maxima and minima then indicate the existence of a feature and the feature's epipolar line location in the image may be determined. What remains is to determine feature type by identification of the saddle points. This may be done by either analysis of $I'_{P1}$ as in the single pattern case, or as described next.

Figure 18:
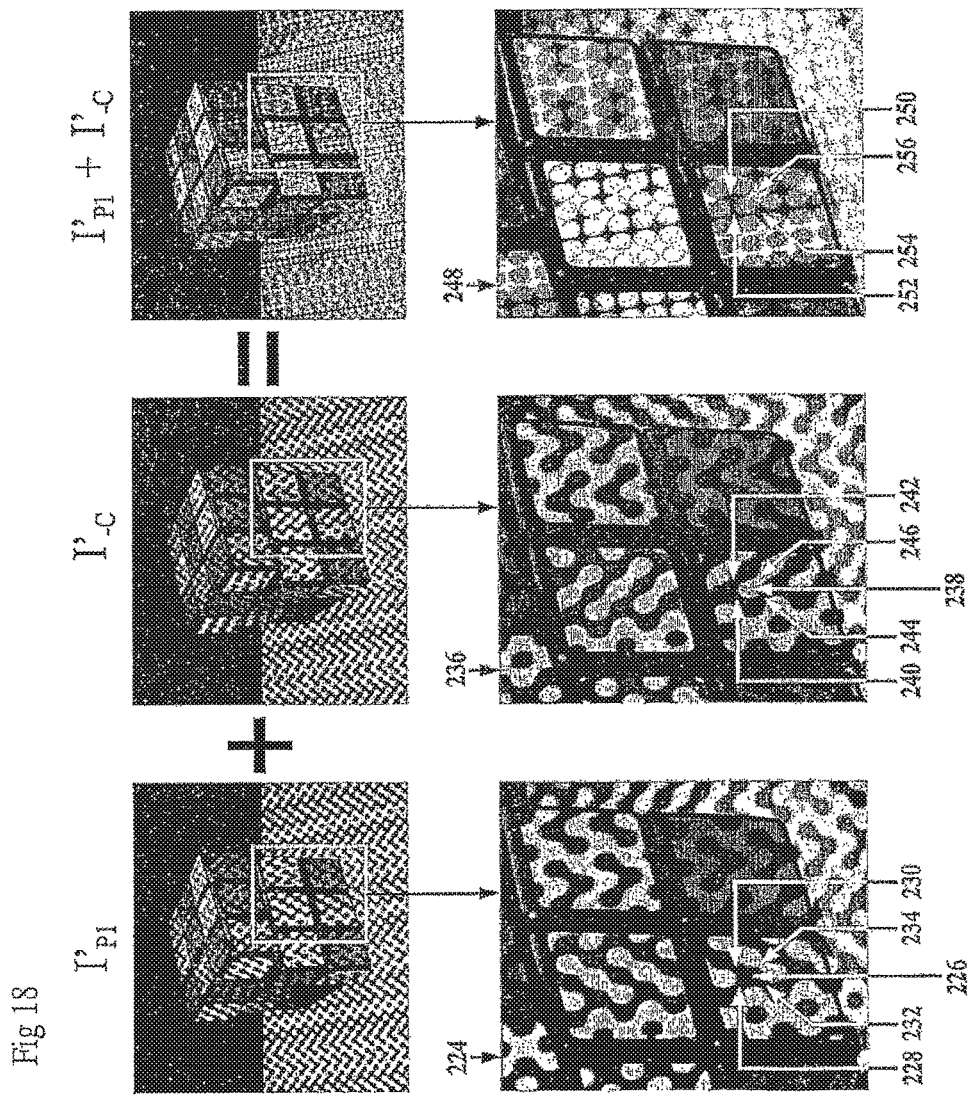
FIG. 18 shows the addition of the two imaged patterns of FIG. 17.

Reference is made to FIG. 18, which shows the addition of the two imaged patterns of FIG. 17, $I'_{P1}$ and $I'_{-C}$. The addition of the two images leads to a resultant image that shows the reflection of maximum light intensity for all carrier locations. In other words, all former carrier positions become white in the resultant image. Only the saddle points remain. The addition of the two images leads to the addition of two opposite carrier reflection intensities at identical locations in the two images. In contrast, the saddles are identical in both images, so the addition of the two images leads to an accentuation of the saddle points.

For instance, in close-up 224 of the $I'_{P1}$ image, a black feature with center point 226 is shown. The feature's two upper saddles 228 and 230 are black. The bottom left saddle 232 is also black while the bottom right saddle 234 is white. In close up 236 of the same place on the Rubik's Cube in the $I'_{-C}$ image, the same feature now has white center point 238 instead of black. The saddles 240-246 remain the same. Therefore, the resultant image close-up 248 shows the four saddles 250-256. Since all carriers become white in the resultant image $I'_{P1}+I'_{-C}$, the saddles may be clearly identified without confusion with local maxima and minima. FIGS. 17 and 18 show that the separation of the carriers from the saddle points allows for a more robust decoding process as the detection of carriers and saddles is simplified. Image $I'_{P1}-I'_{-C}$ provides the carrier and saddle detection and location information while image $I'_{P1}+I'_{-C}$ provides the saddle identity information.

Figure 19:
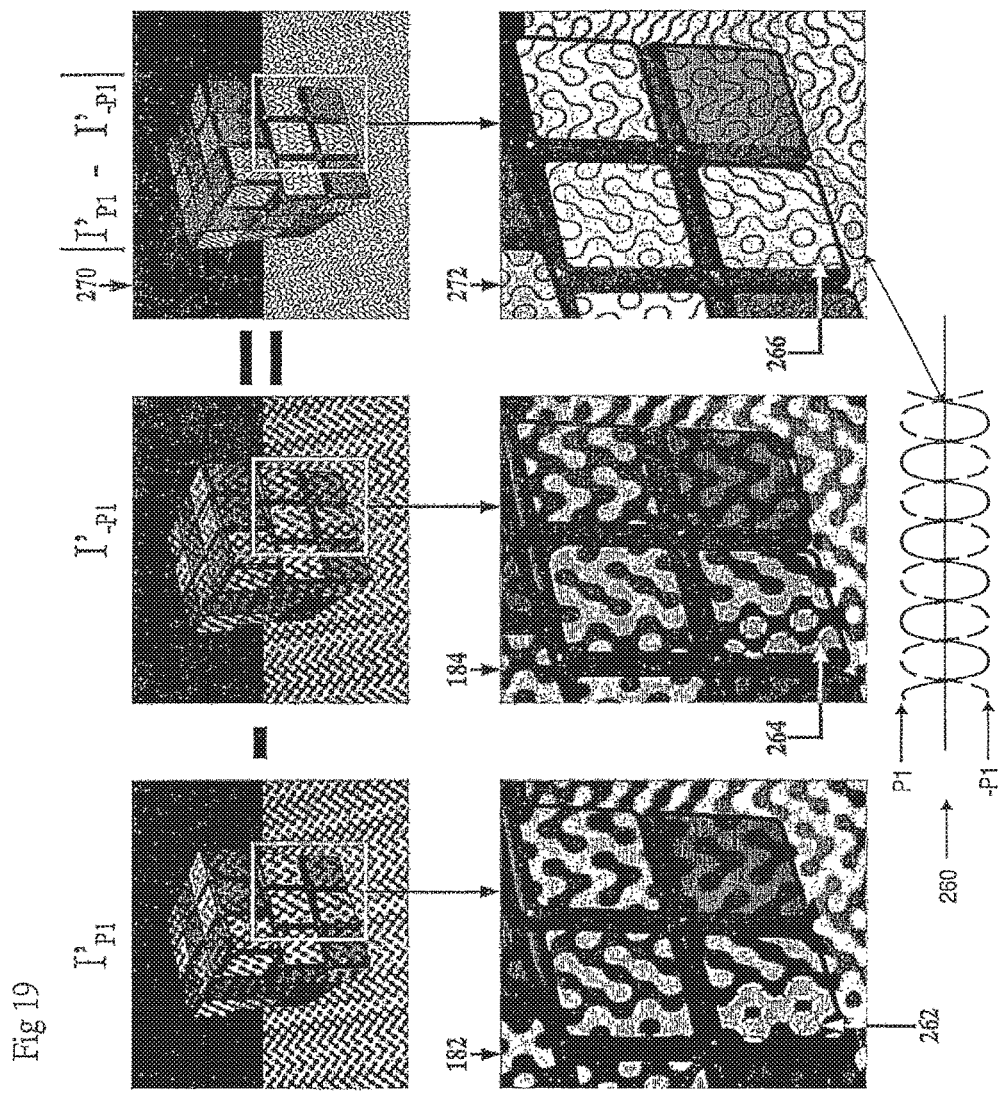
FIG. 19 shows an illustration of the resultant image obtained from the absolute value of the subtraction of image −P$_1$ from image P$_1$.

Reference is made to FIG. 19, which is an illustration of the resultant image obtained from the absolute value of the subtraction of image $I'_{-P1}$ from image $I'_{P1}$. The resultant image 270 is an outline of the pattern. Since the two images are inverses of each other, as discussed above in FIGS. 15 and 16, the individual patterns can be expressed as two opposite sinusoidal curves. Graph 260 is a cross section of the sinusoidal curves that comprise each of the two inverse patterns. Each local maximum and white saddle location in the $I'_{P1}$ image is replaced, respectively, by a local minimum location and black saddle in the $I'_{-P1}$ image. Conversely, each local minimum and black saddle location in the $I'_{P1}$ image is replaced, respectively, by a local maximum location and white saddle in the $I'_{-P1}$ image. The absolute subtraction of any two extrema or saddles from identical locations in the two images leads to a bright intensity spot in the resultant image $|I'_{P1}-I'_{-P1}|$. Therefore, any maximum, minimum or saddle point is bright in the image $|I'_{P1}-I'_{P1}|$. This is seen in close up 272 of the resultant image.

The dashed curved lines 262 and 264 indicate the border areas between black and white spots of the respective images $I'_{P1}$ and $I'_{-P1}$. On the sinusoidal graph, these dashed curved lines are represented by the meeting point, or the 0 point, between the respective graphs of images $I'_{P1}$ and $I'_{-P1}$. Where these points meet, the result of the absolute subtraction $|I'_{P1}-I'_{-P1}|$ is 0. These meeting points occur in a two dimensional plane in the resultant image, creating the black outline 266 of the pattern. The black outline represents a minimum in the image 270 and provides a sub-pixel resolution of a continuity of highly identifiable curves in the resultant image. Points along this pattern outline can be associated with spatial coordinates through various triangulation techniques.

Figure 20:
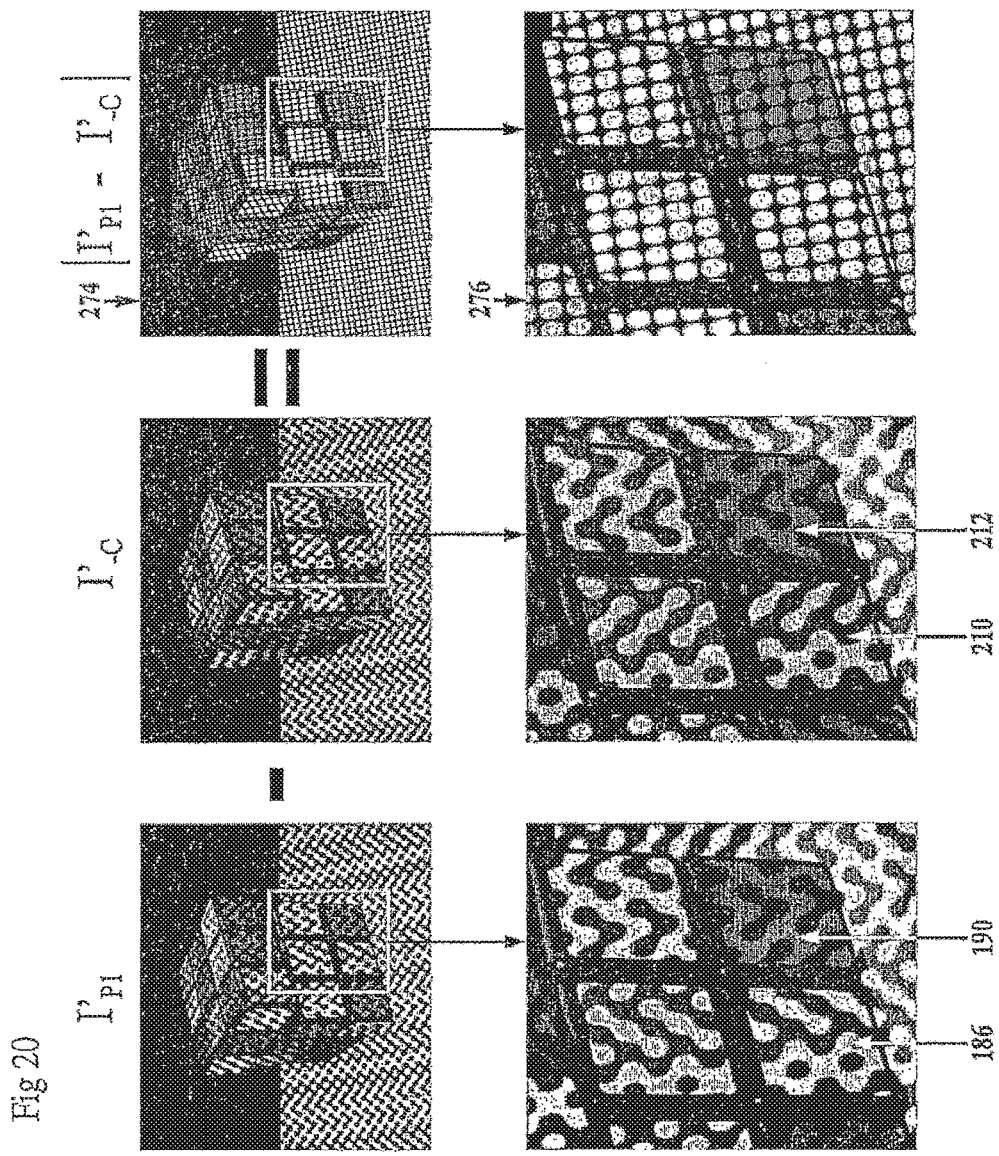
FIG. 20 is an illustration of the resultant image obtained from the absolute value of the subtraction of image −C from image P P$_1$.

Reference is made to FIG. 20, which is an illustration of the resultant image obtained from the absolute value of the subtraction of image $I'_{-C}$ from image $I'_{P1}$. As discussed in FIGS. 17 and 18 above, the $I'_{-C}$ image of the cube has the same pattern as in $I'_{P1}$ projected thereupon only the maxima and minima are switched. That is to say, a maximum 186 in image $I'_{P1}$ is seen as minimum 210 in image $I'_{-C}$. White saddle point 190 in image $I'_{P1}$, however, remains white saddle point 212 in image $I'_{-C}$. Thus, a maximum is replaced by a minimum and visa versa, but the saddle points remain unchanged in both images.

The absolute value of the subtraction of image re from image $I'_{P1}$ yields image 274. The absolute subtraction of either a black or white carrier in image $I'_{-C}$ from either a black or white carrier in image $I'_{P1}$ leads to all white carriers, seen in close up image 276. The black crossings represent the borderline areas between black and white carriers in the $I'_{P1}$ and $I'_{-C}$ images. The borderline areas are the areas where the white carrier begins to turn black and visa versa. At the precise borderline, the pixels are neither black nor white, as the value is precisely between a maximum and a minimum. The absolute subtraction of these pixels leads to 0 value, or a black or minimum point in image 274. The resulting image has less ambient light and allows for clearer decoding and accurate localization of extrema.

Figure 21:
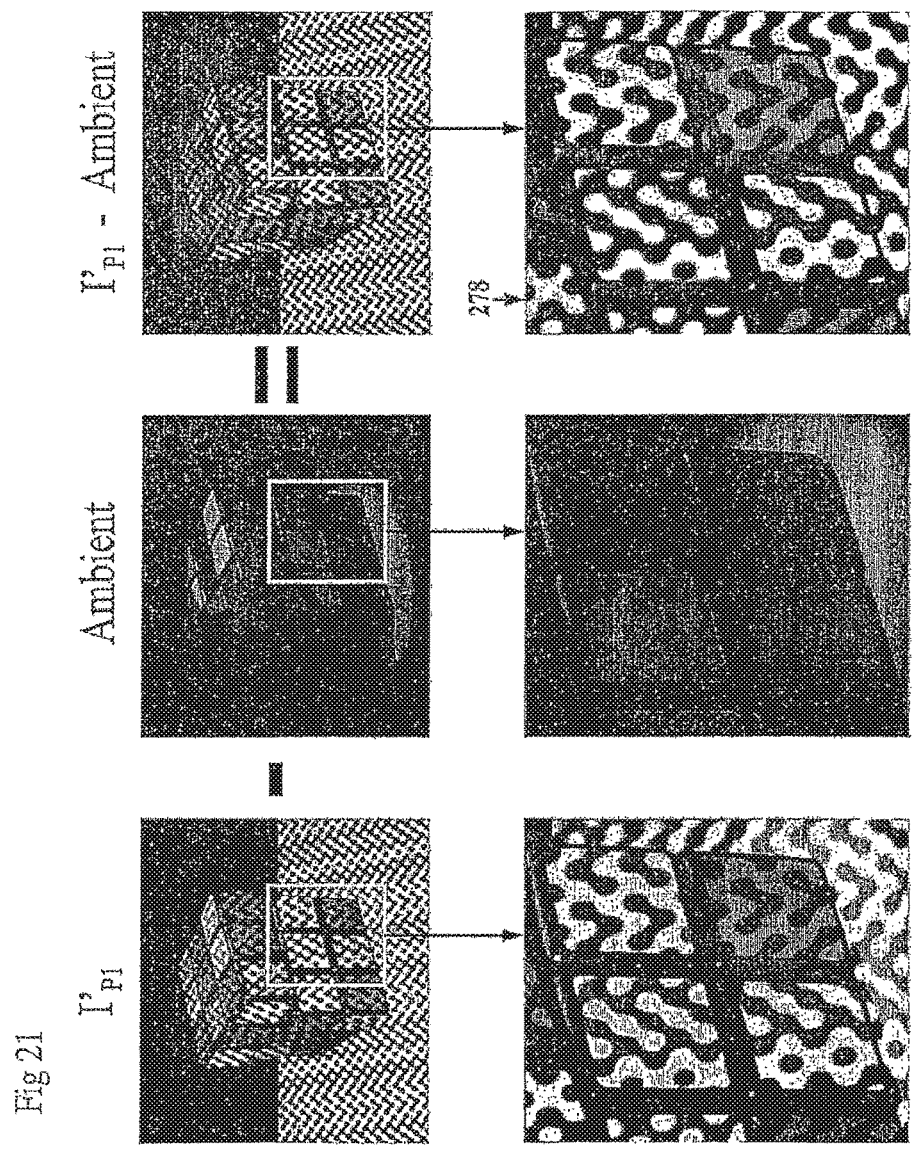
FIG. 21 is an illustration of a particular embodiment of dual pattern projection and dual pattern imaging.

Reference is made to FIG. 21, which is an illustration of a particular embodiment of dual pattern projection and dual pattern imaging. The first image is I'$_{P1}$, and the second is an image of the cube with ambient light illuminating the image. The subtraction of the image of the cube with ambient light from the image of the cube I'$_{P1}$ having the pattern P1 projected thereupon, provides a resultant image substantially free of ambient light. As a result, the pattern in the resultant image is accentuated and thus more readily decoded. This is seen in close up of resultant image 278 where the black and white points of the image are clearer than seen in the original I'$_{P1}$ image.

Figure 22:
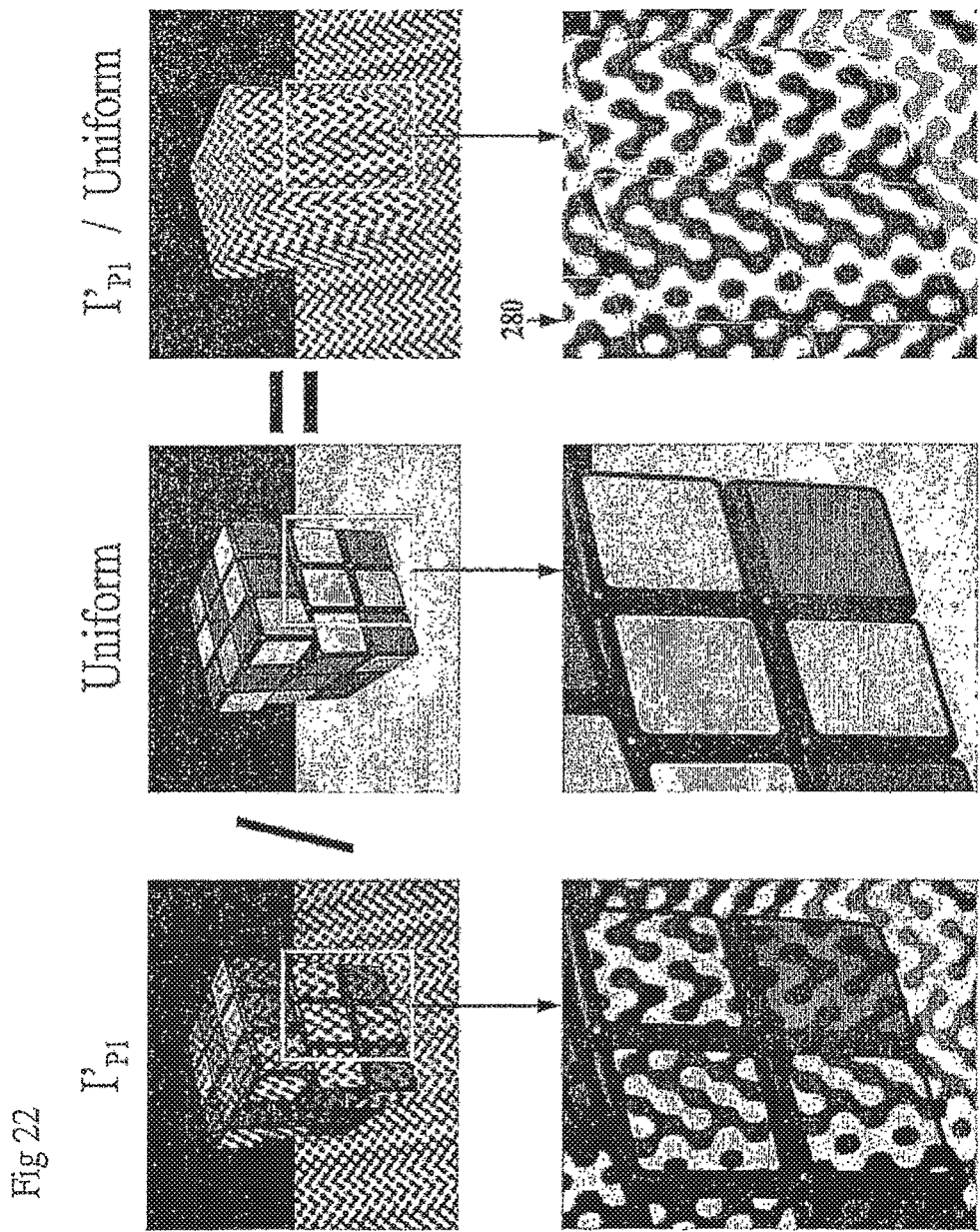
FIG. 22 is an illustration of a particular embodiment of dual projection using uniform light.

Reference is made to FIG. 22, which is an illustration of a particular embodiment of dual pattern projection and dual pattern imaging. The first image is I'$_{P1}$, and the second is an image of the cube with uniform or relatively uniform light illuminating the image. The division of the image of the cube I'$_{P1}$ by the image of the cube with uniform light projected thereupon, provides a resultant image substantially free of object texture. As a result, the pattern in the resultant image is accentuated and thus more readily decoded. This is seen in close up of resultant image 280 where the black and white points of the image are clearer than seen in the original I'$_{P1}$ image.

In all of the dual projection and imaging embodiments of FIGS. 15-22, the alignment, or relative spatial position, between the imaged object in both images is limited somewhat. The degree to which movement between imaged frames is limited is typically a function of the imaging strategy and the speed of the imaging device. Both temporal and spectral imaging devices may be used with the previous embodiments to capture dual images.

For instance, the simplest implementation of temporal imaging of the dual patterns in the previous embodiments is through two "snapshots" of the imaging device over two time intervals. One advanced method of temporal dual imaging, supported by modern camera boards, is non-uniform-exposure timing. Modern camera sensors enable control over the exposure time of the camera sensor. So, for example, it is possible to provide pairs of interval exposure times placed close to each other, rather than uniformly spaced in time. For instance, image I1 may be taken at t=0 milliseconds, image I2 at t=5 milliseconds, image I3 at 100 milliseconds, image I4 at 105 milliseconds, and so on. As a result, a series of images is obtained at an average rate of 20 images per second. However, pairs of images are provided that are taken at consecutive time intervals rather than spaced apart in time. As a result, if the movement occurring between the first and second time interval is slight enough, or alternatively if the imaging device is fast enough, comparison between the dual images may be carried out as in previous embodiments.

The above strategy of two consecutive images at adjacent time intervals is dependent on fast projection speeds. The imaging apparatus sensor should, ideally, not be exposed at any time beyond the projection time, as this would lead to ambient light disruptions in the imaged pattern. Other sensor designs to increase imaging speed for the embodiments of the present invention include certain CMOS per-pixel-based computation sensors. These specially designed sensors carry out computations immediately at each pixel location upon the pixel receiving light intensity. This is in contrast to computing pixel values subsequent to the emptying of the sensor to computation modules.

Furthermore, the above dual imaging strategy may be implemented to obtain texture images in parallel to the captured depth information. In preferred embodiments, the pattern is projected every other image frame. In the remaining image frames, uniform illumination is projected onto the object and the object is imaged. Assuming minimal relative motion between the two frames, it is possible to apply the texture information obtained while projecting uniform light onto the object to depth information captured in the images containing the projected pattern.

It is understood that spectral methods of capturing two patterns are also possible. Such implementations may include the use of multiple CCDs.

Reflectance characteristics of certain high texture surfaces may lead to feature identification error in single imaging device systems. Therefore, in order to ensure that correct 3D spatial coordinates are derived, an additional imaging device may be added to the system. The additional imaging apparatus allows for what is referred to as stereo depth decoding, in addition to the single image decoding methods described previously herein.

For example, a dual imaging system using methods and apparatuses of certain embodiments may be conveniently mounted on a moving vehicle in an urban environment to capture the geometric constructs in three dimensions of buildings, landmarks and other objects both stationary and moving in an urban scene.

Figure 23:
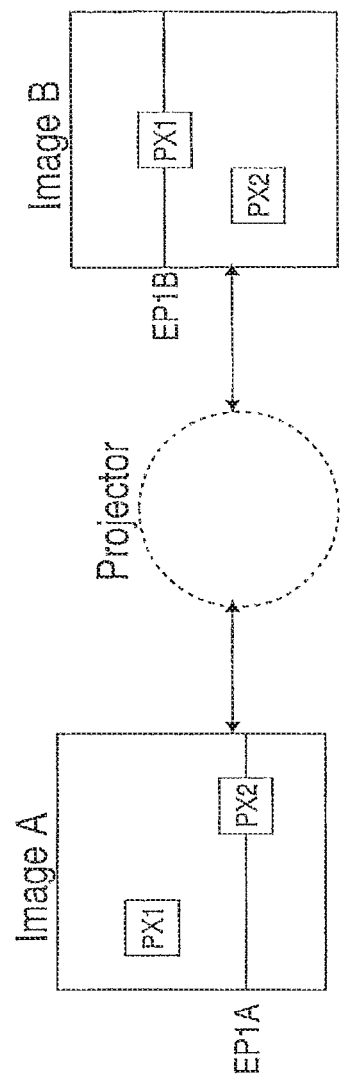
FIG. 23 is a simplified illustration showing how an epipolar field between two images is related.

To further understand stereo depth decoding using the methods and apparatuses of preferred embodiments, we refer to FIG. 23. In stereo-based depth imaging and decoding systems, two imaging devices placed near to each other capture a given scene, preferably simultaneously. The two images, denoted as image A and image B, are nearly the same. However, since the two images are taken from slightly different angles, imaged objects appear at slightly different pixel locations in the two images. Given a fixed distance between the imaging devices for every frame, any object that ever appears on a certain pixel location in image A must appear on a specific epipolar line in image B. Likewise, any object that ever appears on a certain pixel location in image B appears on a specific epipolar line in image A. The distance of the imaged object appearing at a certain pixel location in one image affects where along the corresponding epipolar line the object appears in the second image.

Now, when a projector is added in between the two imaging devices, or cameras, a structured light pattern such as discussed above may be projected onto the imaged urban objects. In each of the two images, reflected pattern features appear together with the texture of imaged objects, such as seen in FIG. 11. A given pixel in either image may contain part of a reflected feature and thus any randomly chosen square pixel area of the image may contain features or parts of features in addition to the imaged object texture. The features, or parts of features, together with the imaged object texture comprise the totality of information on any given pixel. The information appearing at a square pixel location in image A, will always appear on a unique set of coordinates (a specific set of epipolar lines) in image B. Likewise any information appearing at a square pixel location in image B, will always appear on a unique set of epipolar lines in image A. Further, if epipolar separation techniques associated with the pattern structure and projection are utilized, feature types appear only once on each epipolar line. Therefore, each small area along epipolar lines in each image is unique and the features provide non-repeating "artificial texture" for each image. The set of points comprising epipolar fields between images is determined generally through stereo calibration or stereo rig calibration techniques known in the art.

The epipolar line in image B, EP1B, comprises the totality of points upon which the information contained on pixel area PX1 in image A may be found in image B. Likewise, the epipolar line in image A, EP1A, comprises the totality of points upon which the information contained on pixel area PX2 in image B may be found in image A. The relationship between pixel locations in image A to pixel locations in image B is referred to as an epipolar field.

Figure 24:
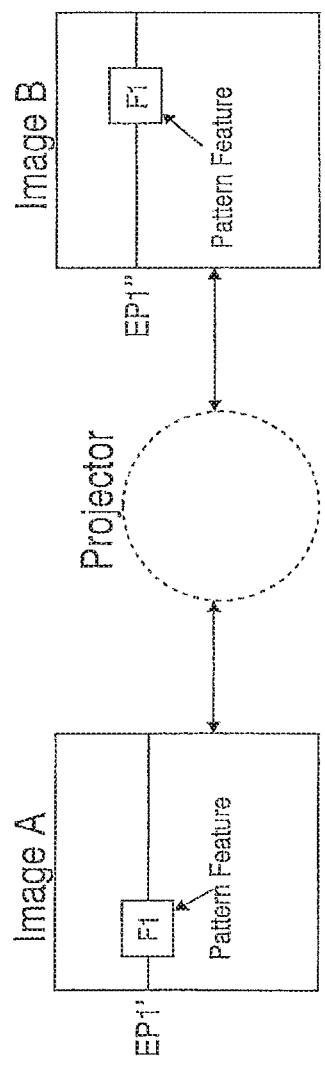
FIG. 24 is a simplified illustration showing how separate epipolar fields exist for respective imaging apparatuses and a projector in a particular embodiment.

Referring to FIG. 24, two additional epipolar fields exist. These fields are: 1) the epipolar field between the projector and image A and 2) the epipolar field between the projector and image B. These fields behave as described in previous embodiments above and are not expanded on further here. Noticeably, in light of the above discussion, feature F1 may appear in Image A at pixel area PX1 in addition to the texture of an imaged object. In such a case, both feature F1 and the imaged object appear at the same point on EP1" in image B.

Stereo correspondence can then be carried out as follows. A particular group or "window" of pixels is chosen at a certain location in either image, say image A. A similar group of pixels to that chosen in image A will only be found along a certain set of epipolar lines in image B. Image B is scanned along these epipolar lines for a matching group of pixels. When a matching pixel set is found, the location in image B is noted. We now know matching pixel windows and their corresponding locations in each of image A and B. The distance between the two imaging apparatuses is known, along with the angles of projection and image capture for each camera/image apparatus. Triangulation methods can now be used to determine the 3D spatial coordinates of the objects imaged on those pixel locations in each image. This process is continued for each pixel group location to obtain a 3D point cloud of the imaged object(s) for each frame.

In stereo depth decoding of two images containing a reflected pattern, the features are not decoded as in the single image case. Rather, the pattern features act as a very dense and high contrast "artificial texture". "Windows" of pixels are compared between the two images to find matching pixel areas. Furthermore, since feature types do not repeat themselves along the epipolar lines when using projection techniques of the present embodiments, each small "window" of pixels is unique along respective epipolar lines. Again, these windows may not include full pattern features, but only parts of features. In either case, the features act as unique "artificial texture" along the epipolar line on top of the texture of the imaged objects.

Surfaces that are likely to lead to feature identification error in single imaging systems include, for example, high textured surfaces, transparent and semitransparent surfaces and dark surfaces. This is because features of the encoded light projected onto high-textured surfaces are likely to become deformed and thus not decodable as a result of reflectance from the high-textured surface. Although reflected features may not be decipherable, they still add unique texture along epipolar lines to the already textured image. The comparison between two captured 2D images is made easier as unique "windows" can be matched to each other. The addition of the reflected pattern aids in the stereo matching process. In non-textured or low textured surfaces, such as walls or grass, features may be extracted from one image, as described in previous embodiments.

The additional imaging device thus, firstly, provides "another opportunity" to derive the depth coordinates of a given scene of a given image frame. In total, 3D coordinates of a given scene using the configuration of the present embodiment are computed three times. Once in each image separately through reflected feature decoding and a third time from the comparison of correspondences between the first and second image.

The system geometric constraints that are to be imposed to enable the stereo depth decoding in addition to single image decoding are as follows: A suitable displacement, sometimes termed baseline, is set between a first imaging device and the projector and between a second imaging device and the projector. The two imaging devices are ideally on opposite sides of the projector, each at 180 degrees from the projector. Thus, the two baselines are parallel to each other and the three optical centers (projector and two imaging devices) are on a single line or almost single line. The order of projectors and imaging devices may vary. The epipolar separation techniques, however, impose the constraint that all projectors and imaging devices be situated in a substantially straight line in relation to each other. The projected pattern is projected at a suitable tilt angle, as described in above embodiments, to ensure epipolar separation both along epipolar fields between each imaging device and the projector as well as the epipolar fields between the two imaging devices.

Practically, it may further be desirable to position the projector closer to one of the imaging devices, say the first imaging device. The smaller distance between the first imaging device and the projector is particularly suited for decoding of features reflected from close objects. The medium displacement between the second imaging device and the projector is particularly suited for decoding of features reflected from objects still farther away. Finally, the large displacement between the first and second imaging device is suitable for stereo matching of imaged distant objects. Since the projector has limited energy, the projected pattern may often not reach distant objects. In such a case, the task of extracting depth is carried out through stereo matching without reflected features, what is referred to as passive stereo matching. Therefore, the largest baseline is reserved for the task of stereo matching.

Figure 25:
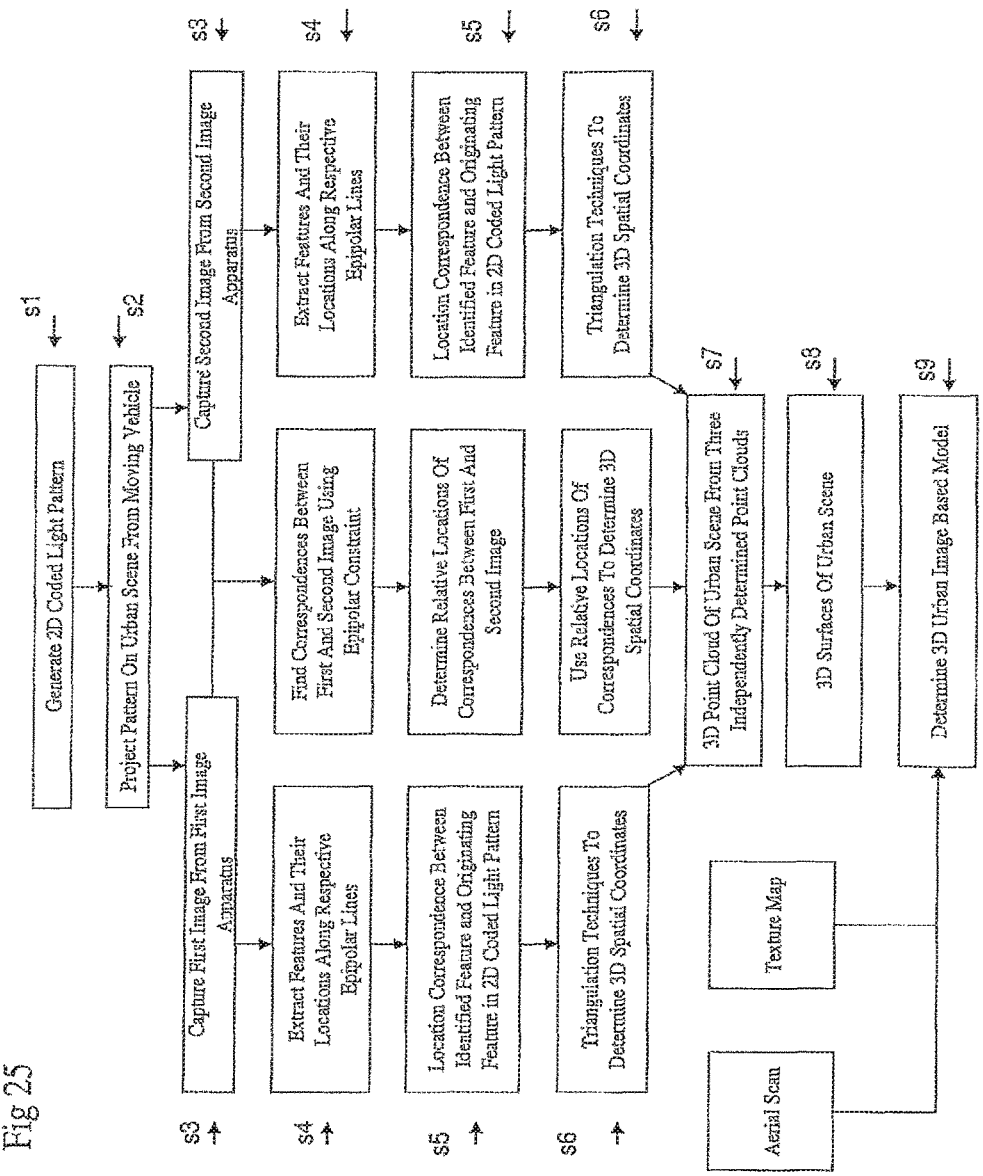
FIG. 25 is a simplified flow chart of a particular embodiment of the present invention showing the steps in the process of generating a 3D map of an urban region.

Reference is now made to FIG. 25, which is a simplified flow chart showing the steps in the process of generating a 3-D map of an urban region. In the example of FIG. 25, the urban region is not limited to a single "scheme" or landscape. Instead, multiple 3D images are captured from different locations and different angles, for example, by mounting a projector and/or image apparatus on a moving vehicle and capturing images when the moving vehicle is at different locations.

The flow chart shows the example of a projector and two imaging apparatuses, however, other configurations with more projectors and imaging apparatuses are possible. The reason for use of at least two image apparatuses in the current embodiment is, as explained above, to enable stereoscopic depth measurement in addition to the active triangulation methods described until now using a single imaging apparatus.

The process is as follows: First, in step s1, a two dimensional coded light pattern is generated as in previous embodiments. This two dimensional pattern should be structured so that the epipolar separation techniques discussed above are capable of being implemented. The pattern P1 in previous embodiments is especially suited for urban modeling as the pattern is scalable and can be made rather large for urban objects. Second, in step s2, the pattern is projected onto objects in urban scenes from a projector(s) mounted on a moving vehicle. These urban objects may include buildings, cars, greenery, street signs, people, or any other object. Projection techniques are as discussed above to ensure epipolar separation.

In step s3, images are captured from each of the two imaging apparatuses which are located at preferably slightly different angles to the scene. The images are preferably captured simultaneously and show a combination of the original texture and the pattern. In step s4, each of the two captured images is analyzed independently, as in previous embodiments, according to features and their locations along respective epipolar lines. In addition, in step s4, a comparison using stereo correspondence as discussed above is carried out between the two images. In this comparison, similar pixel areas in both images are identified. As discussed, similar pixel areas indicate where the same imaged location appears in each of the images. A given pixel area in one image is searched for along certain epipolar lines in the other image and a correspondence is found.

Now, correspondences between features in each image and the original pattern are found out in step s5, as described in embodiments above. In addition, in step 5, relative locations between corresponding pixel "windows" in the two images is computed. From correspondences, 3D spatial coordinates are found using triangulation, seen step s6.

As discussed above, the comparison between images allows for the derivation of 3D coordinates from rich texture surfaces, dark surfaces, locally unsmooth surfaces, transparent surfaces, shiny surfaces, etc, that under single pattern conditions could likely be identified erroneously or not at all. Taken together, the three 3D coordinate mappings of the imaged objects allow for the construction of a 3D point cloud of the imaged scene, seen as step s7. This point cloud may be further processed to obtain a mesh or 3D surface, seen as step s8. The 3D surfaces may then be further processed together with texture data from additional cameras or CCDs. Aerial data of the urban scene may also be added. Such texture and aerial data may complement the depth 3D depth map obtained through steps s1-s8.

Steps s4 through s9 are typically carried out by an image processing device or devices of various kinds known in the art. Texture data may be obtained in a number of ways. One way is by adding an additional CCD. Another is by adding a tunable filter to a single "switchable" CCD, such that at certain time intervals the CCD captures pattern and thus depth information, and at other intervals the CCD captures texture information. Still another method is by simply adding a textured-dedicated camera to work in parallel to the depth capturing system.

As stated, the single pattern method employed in preferred embodiments allows for relative motion between the imaging/projector system and imaged urban objects. Therefore, the method and apparatus are particularly suited for an implementation where the imaging apparatus is mounted on a ground-vehicle moving at various speeds throughout an urban environment.

To obtain dynamic scene modeling in three dimensions, steps s2 through s8 are repeated and a sequence of three dimensional images obtained. Processing of data from moving objects may occur in real time through appropriate processing software and hardware to derive surfaces and shapes from the 3D point clouds of the objects and their movement in 3D space over time.

As the present embodiment in FIG. 25 may be implemented through projection of a single pattern structured light code, the speed of image capture is typically only limited by the speed of the imaging apparatus in which the pattern is implemented and thus a rapid 3D modeling of city landscape is possible. The above embodiment of urban scene modeling is not limiting, and other embodiments utilizing the methods and apparatuses for stereo decoding are possible.

Stereo matching, either passive or active, provides a much more dense sampling of the imaged scene. This is because the content of any given pixel of a first image provides a disparity measurement in relation to the same content appearance in a second image. This disparity measurement means a depth value for each given pixel. So if the CCD sensor contains X pixels, X depth coordinates are derived.

In contrast, in decoding of single images as explained above, each feature that is decoded has a certain spatial area on the sensor. Let's say typically 10 square pixels, so a decoded 2D image from which 3D spatial coordinates are triangulated has X/10 depth coordinates. So a stereo matching implementation has 10 times more depth coordinates, and thus denser sampling.

Moreover, in stereo matching, sub-pixel resolution is possible by performing the matching process between two up-sampled versions of the two compared images. For example, each 4×4 block of pixels is up-sampled by a factor of 4 to a size 16×16 pixel blocks in each of two images. A certain up-sampled block is chosen in a first image. Then a similar block to this up-sampled block of pixels is searched for in the second image. The correspondence between pixels is now in terms of up-sampled pixels. So if a disparity of say 21 pixels is found between the two images, this is equal to 21/4=5.25 original pixels. The remaining quarter pixel is the sub-pixel resolution in terms of original image resolution.

The method and apparatus of motion based three dimensional image capture and depth measurement of the present embodiments has particular application to the medical imaging field. Surface images that determine the shape and dimensions of an anatomical surface part in three dimensions may be computed in real time for modeling of both stationary and moving surface anatomy. The 3D point clouds, determined through the embodiments above, may be further processed to obtain surfaces and shapes of the objects and their movement in 3D space over time. These surfaces and shapes are referred to as triangulation meshes.

Such 3D modeling data may be particularly useful for various medical applications including, but not limited to, external three dimensional imaging for tumor analysis, skin growth analysis, bone structure analysis, dental surgery applications, maxillofacial and other osteotomic surgeries, skin cancer and melanoma diagnosis, prosthetic applications, rehabilitation purposes, sports medicine applications and plastic surgery and other aesthetic medical procedures.

In the fields of reconstructive, plastic and dental surgery, to name a few, biomechanical modeling may utilize dynamic 3D modeling of anthropometric data in surgery planning and post surgery review. The expected aesthetic result of surgery is important to a patient and the imaging system of the current embodiments allows for soft tissue predication in three dimensions. Post surgery review of anatomical changes, such as breast implants and reductions, dermal fillers, face and neck lifts, can be carried out through use of the 3D imaging system of the current embodiments.

For rehabilitation applications skeleton modeling of the anatomical part, such as discussed in U.S. Pat. No. 6,133,921, may be carried out based on analysis of the 3D point cloud. Motion analysis of the skeleton model may then be performed. In the area of dental applications, 3D maxillary modeling and other facial bone analysis is possible. Other applications include measurement of tumor shape and size, reconstructive surgery planning and diagnosis, dental and plastic surgery, prosthetics, rehabilitation and skin cancer analysis.

Figure 26:
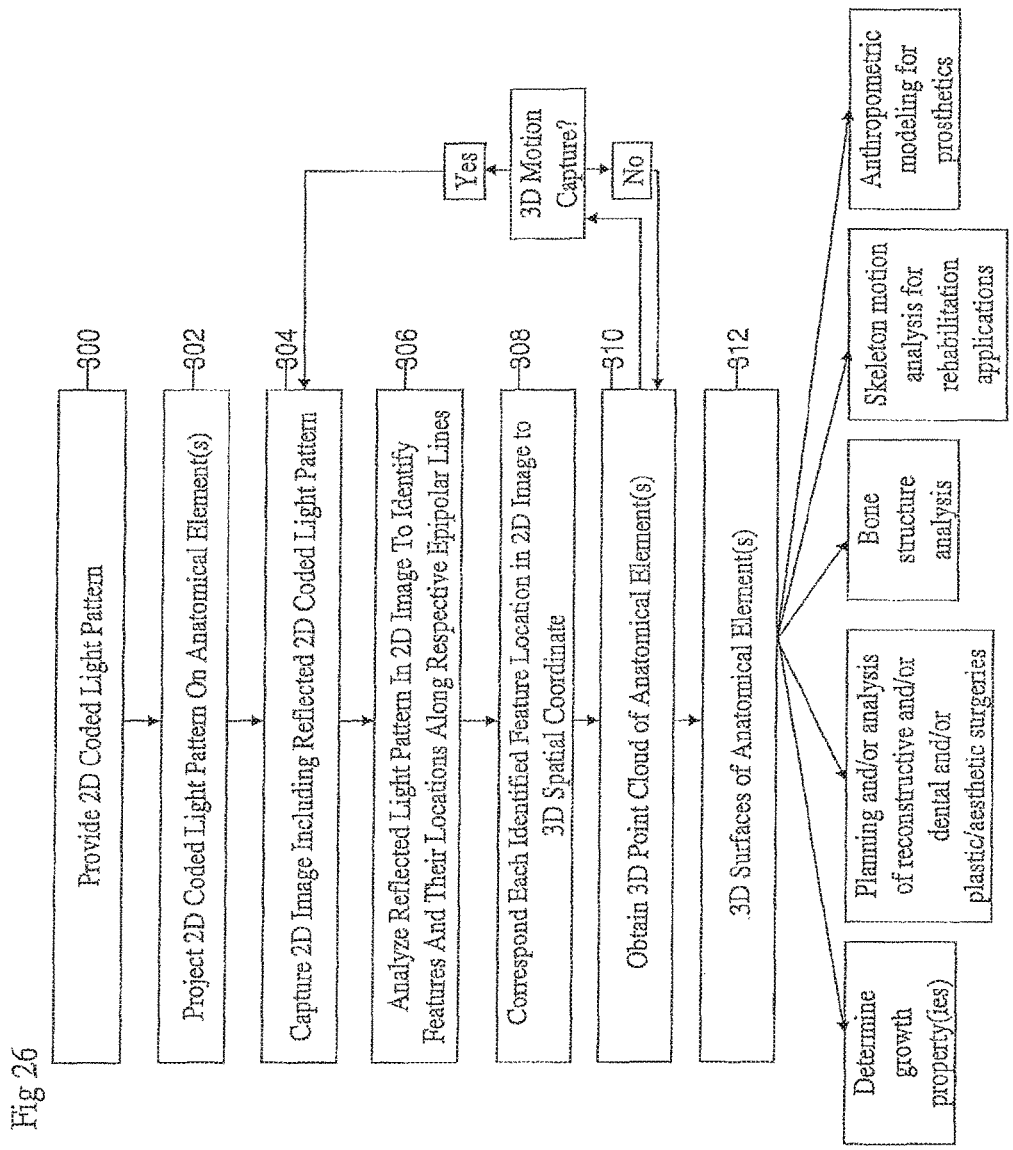
FIG. 26 is simplified flow chart of a particular embodiment of the present invention showing the steps in the process of 3D imaging of an anatomical part.

Reference is now made to FIG. 26, which is a simplified flow chart showing the steps in the process of dimensional image capture of surface anatomy according to the present embodiments. In step 300, a two dimensional coded light pattern is generated. Next, in step 302, the generated pattern is projected onto an external anatomical part. As skin surfaces are naturally low texture surfaces, the structured light pattern of the current embodiments is naturally suited for skin surface imaging. In step 304, a 2D image of the anatomical part and the reflected pattern is captured by an imaging device. In step 306, the captured image is sent to a processor for extracting the reflected feature types and their locations along respective epipolar lines in the captured image. The locations of the features along their epipolar lines are then associated with 3D coordinates on the imaged anatomical part from which the features were reflected, step 308. This process of correspondence between feature locations along epipolar lines and 3D spatial coordinates determines the anatomical shape. The process is carried out through triangulation techniques, as discussed above. For each identified feature in the 2D image, a corresponding 3D coordinate is thus derived indicating the point in space at which that feature reflected off of the anatomy part. Through a compilation of all such 3D coordinates, a 3D point cloud is derived that gives a three dimensional map of the imaged anatomical part(s), step 310. If the anatomical part is moving, then steps 304 through 310 are repeated and a sequence of three dimensional coordinates in space is obtained. This sequence comprises a point cloud data set over time from which a skeleton in motion may be generated, step 312.

In preferred embodiments, this stationary or dynamic skeleton model is further processed and preferably output to a 2D or 3D screen for viewing. As mentioned, the three dimensional coordinates may be processed in real time for either stationary or moving anatomy. Through post processing, for example, the point cloud and/or skeleton model is transformed into a 3D surface representing the dimensions of the imaged anatomical part. The 3D imaged surface, both in motion or stationary, can be used in the applications shown at the bottom of the figure and discussed above.

In an alternative embodiment, particularly in prosthetic or rehabilitation applications, the anatomical part may be covered with clothing or other material. Furthermore, the above embodiments may be implemented together with additional imaging devices, in particular one or more texture based imaging devices, to obtain textural information together with the depth information. Examples of such implementations include RGBZ, splats, color voxels and textured mesh. Typically, these implementations involve the addition of a textured-dedicated camera to work in parallel to the depth capturing system. This texture based information may allow for additional diagnosis of ailments associated with skin color as well as increased visibility by avoiding occlusions. Moreover, such an additional texture-based camera allows for the reconstruction of high-contrast, high-textured, non-smooth surfaces such as hair.

Furthermore, other embodiments may preferably utilize a second imaging device as discussed above. Stereo active triangulation techniques offer several advantages. Less occlusions occur in the obtained 3D image, as the object or anatomical element is now imaged from more than one viewpoint. For high-contrast, high textured surfaces mentioned above, such as body parts covered by hair, freckles, melanoma, stereo imaging is preferred as discussed above.

Finally, higher resolution is obtained with stereo matching as discussed above as well. As the human body is generally a low textured surface, the single image decoding and 3D spatial coordinate derivation is utilized for most applications requiring geometric shape of stationary or moving body parts.

Many medical applications require 3D motion capture for anatomy motion analysis. Furthermore, the human body is not static even at rest. As a result, dense sampling is necessary for each frame.

Still further applications of motion based three dimensional image capture and depth measurement of the present embodiments are in the automotive arena. One important application is a 3D backup camera for motor vehicles. The ability to measure depth of potential obstacles in the path of a vehicle in reverse and warn the driver in time is a critical safety need. For any given identified object in the path of a reversing vehicle, it is desired to determine the classification of the object such as size, precise location, object-vehicle relative velocity and, importantly, whether the object is animate or inanimate.

Figure 27:
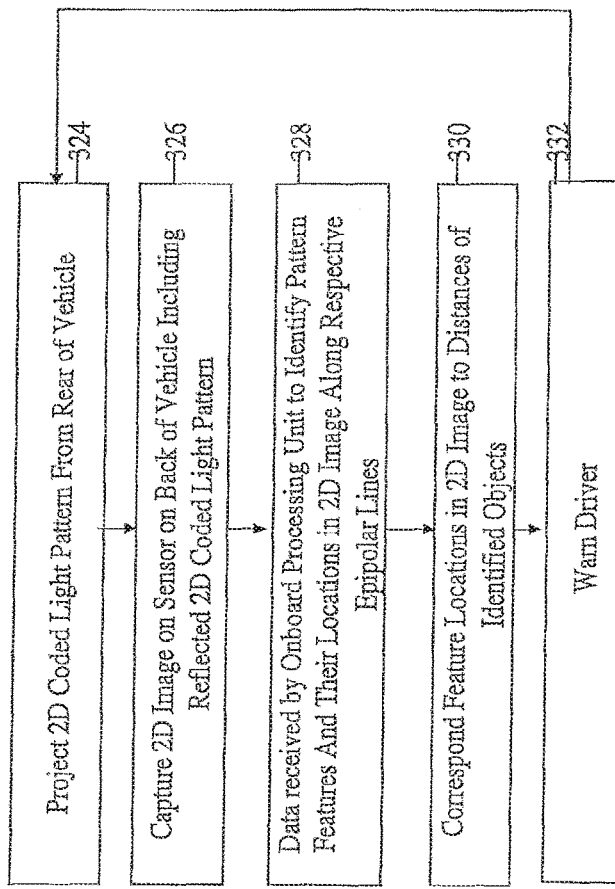
FIG. 27 is a typical flow chart of a particular embodiment of the present invention showing the steps in the process of determining distances of obstacles in the path of a reversing motor vehicle.

A typical flow chart for the automotive application is shown in FIG. 27. As mentioned above, at least one projector and at least one sensor apparatus are installed on the rear side of the vehicle. The projector projects the 2D coded light pattern, step 324, possibly using IR light from a laser LED projector. The pattern is reflected from both stationary and moving objects in a defined lateral and depth range behind the vehicle. The sensor then captures the reflected pattern and texture information, seen as step 326. This data is then processed, step 328, by an onboard processing unit to identify features and their locations in 2D image along respective epipolar lines. These locations of features are then corresponded to distances of identified objects, step 332. These distances are then used to warn driver either audibly or visually, on a display screen on the dashboard for instance. This process is repeated continuously over time to provide continuous real time information to the driver.

Preferred embodiments utilize narrowband monochromatic imaging which is simpler and cheaper than capturing color images. Monochromatic imaging allows the projection of low cost invisible IR light.

It is expected that during the life of this patent many relevant devices and systems will be developed and the scope of the terms herein is intended to include all such new technologies a priori.

The terms "light pattern", "light code", and "light code pattern", are used herein to refer to any light encoding technique, including, but not limited to, structured light, coded light and other equivalents known in the art.

The term "epipolar co-linear" simply means that two independent features appear on the same epipolar line in a given 2D image.

The term "reflection point distance: image point location relation" refers to a one to one relationship between each point in the captured 2D image and a point in 3D space. This relationship can be provided in, for instance, non-volatile memory such as flash memory.

The term "feature-type-inhomogeneous plurality" refers to a set of features wherein each feature is unique.

The object(s) imaged by the method and apparatus described herein can be alternatively referred to as the "target scene" or "calibration scene" in the case of calibration.

In addition to other image capture apparatuses, a 2D array of photodetectors may be used as well.

The term "insensitive to epipolar line ordering" is equivalent to saying "insensitive to scene distance".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A device for creating a 3D video stream providing 3D motion capture of an object, said device comprising:
    a projector and a sensor having a fixed position in relation to each other;
        said projector being configured to project a coded light pattern comprising a repeating structure of a plurality of unique feature types arranged such that each feature type appears at most once along any one of a plurality of distinguishable first epipolar lines; and
        said sensor being configured to capture a series of images of reflections, upon the object, of a portion of the coded light pattern, the reflections being oriented at a non-zero angle in relation to second epipolar lines of an epipolar field in each captured image associated with the fixed relative position between said projector and said sensor, and
    a processor configured to:
        i. identify, within the reflections captured in the images, reflections of the feature types projected by said projector;
        ii. calculate distances to points on the object based on the identified reflections;
        iii. generate points of a series of point clouds using the calculated distances; and
        iv. create a video stream providing 3D motion capture of the object based on the generated point clouds
    wherein said projector is configured to:
        i. project the coded light pattern at an angle to the fixed relative position between said projector and said sensor, and
        ii. project the coded light pattern such that:
            a. each one of the first epipolar lines has a known location in each captured image and is associated with the fixed relative position between the projector and the sensor, and
            b. a distance between the second epipolar lines is less than YC, where C is a size of a feature type in each captured image in the shortest dimension of the repeating structure, and Y is a number of feature types in the shortest dimension of the repeating structure.

2. The device according to claim 1, wherein the repeating structure of the plurality of feature types embodies a coding matrix.

3. The device according to claim 1, wherein the repeating structure of the plurality of feature types is a tile.

4. The device according to claim 1 wherein the repeating structure of the plurality of feature types is a periodic repeating structure.

5. The device according to claim 1, wherein each one of the plurality of unique feature types is characterized by a unique combination of spatial formations.

6. The device according to claim 1, wherein the projector is configured, such that when the projector projects the coded light pattern, an orientation of the coded light pattern with respect to the epipolar field is limited by a limiting epipolar separation factor.

7. The device according to claim 1, wherein the device has a predefined operating range, and in each captured image, two or more repetitions of a feature type appear on a distinguishable epipolar line, but within any given section of an epipolar line which corresponds to an operating range of the device, any feature type appears at most once.

8. The device according to claim 7, further comprising a processor that is configured to extract depth information based on a location in a given section of the second epipolar lines of a given feature type on the second epipolar lines.

9. The device according to claim 1, wherein Y equals 1.

10. The device according to claim 1, wherein the projector is configured such that when the projector projects, a projected structured light pattern is at an angle $\theta$ relative to an epipolar field, where $\theta = \sin^{-1}(P/YC)$, P denotes a distance by which distinguishable epipolar lines are separated, C is the size in the shortest dimension of the repeating structure of a feature type in each captured image, and Y is the number of feature types in the shortest dimension of the repeating structure.

11. The device according to claim 1, wherein the coded light pattern is embodied in a patterning element.

12. The device according to claim 11, wherein the patterning element is a transparency mask, a diffractive optical element or an array of light emitting elements arranged to provide the plurality of unique feature types.

13. The device according to claim 11, wherein the projector and the patterning element are configured such that a light source is configured to illuminate the patterning element, and when the light source illuminates the patterning element, the patterning element manipulates light from the light source to provide the projected coded light pattern, and wherein the patterning element is orientated with respect to the sensor such that when the projector projects the coded light pattern, the projected coded light pattern is at an angle relative to an epipolar field associated with a spatial relation between the projector and the sensor that is used to capture each image.

14. A method for creating a 3D video stream providing 3D motion capture of an object, said method comprising:
    projecting, using a projector, a coded light pattern comprising a repeating structure of a plurality of unique feature types arranged such that each feature type appears at most once along any one of a plurality of distinguishable first epipolar lines;
    capturing, using a sensor having a fixed position in relation to the projector, a series of images of reflected reflections, upon the object, of a portion of the coded light pattern, the reflections being oriented at a non-zero angle in relation to second epipolar lines of an epipolar field in each captured image associated with the fixed relative position between said projector and said sensor, using a processor functionally associated with the sensor to:
- i. identify, within the reflections captured in the images, reflections of the feature types projected by said projector;
- ii. calculate distances to points on the object based on the identified reflections;
- iii. generate points of a series of point clouds using the calculated distances; and
- iv. create a video stream providing 3D motion capture of the object based on the generated point clouds wherein
- the coded light pattern is projected at an angle to the fixed relative position between said projector and said sensor, and
- each one of the first epipolar lines has a known location in each captured image and is associated with the fixed relative position between the projector and the sensor, and
- a distance between the second epipolar lines is less than YC, where C is a size of a feature type in each captured image in the shortest dimension of the repeating structure, and Y is a number of feature types in the shortest dimension of the repeating structure.

15. The method according to claim 14, wherein the repeating structure of the plurality of feature types embodies a coding matrix.

16. The method according to claim 14, wherein the repeating structure of the plurality of feature types is a tile.

17. The method according to claim 14, wherein the repeating structure of the plurality of feature types is a periodic repeating structure.

18. The method according to claim 14, wherein each one of the plurality of unique feature types is characterized by a unique combination of spatial formations.

19. The method according to claim 14, wherein a patterning element used in the projection is orientated with respect to the sensor at an angle, and wherein a distance between the distinguishable first epipolar lines is associated with an orientation of the patterning element relative to the sensor.

20. The method according to claim 19, wherein the orientation of the patterning element relative to the sensor is limited by a limiting epipolar separation factor.

21. The method according to claim 14, further comprising obtaining an operating range of the sensor, and along any given section of an epipolar line which corresponds to a range that is less than or equal to the operating range, any feature type appears at most once, and wherein two or more repetitions of a feature type appear along an epipolar line section that corresponds to a range that is greater than the operating range.

22. The method according to claim 14, wherein Y equals 1.

23. The method according to claim 14, wherein when the projector projects the coded light pattern, the projected coded light pattern is at an angle $\theta$ relative to the epipolar field, where $\theta = \sin^{-1}(P/YC)$, P denotes the distance by which the distinguishable second epipolar lines are separated, C is the size in the shortest dimension of the repeating structure of a feature type in each captured image, and Y is the number of feature types in the shortest dimension of the repeating structure.

* * * * *